US012497281B1

(12) United States Patent
DeRaedt et al.

(10) Patent No.: US 12,497,281 B1
(45) Date of Patent: Dec. 16, 2025

(54) SYSTEM FOR CONTROLLABLY CONNECTING A BEVERAGE DISPENSING PACKAGE TO A SUPPLY LINE

(71) Applicant: Bar Evolution LLC, Henderson, NV (US)

(72) Inventors: Peter DeRaedt, Henderson, NV (US); Bernd Witzany, Munich (DE)

(73) Assignee: Bar Evolution LLC, Las Vegas, NV (US)

( * ) Notice: Subject to any disclaimer, the term of this patent is extended or adjusted under 35 U.S.C. 154(b) by 1 day.

(21) Appl. No.: 18/505,490

(22) Filed: Nov. 9, 2023

Related U.S. Application Data

(60) Provisional application No. 63/424,536, filed on Nov. 11, 2022.

(51) Int. Cl.
*B67D 1/08* (2006.01)

(52) U.S. Cl.
CPC ......... *B67D 1/0845* (2013.01); *B67D 1/0848* (2013.01); *B67D 2001/0811* (2013.01)

(58) Field of Classification Search
USPC ............................................................ 222/23
See application file for complete search history.

(56) References Cited

U.S. PATENT DOCUMENTS 2,864,534 A 12/1958 Wrenn
3,759,422 A 9/1973 Matheney
3,904,079 A 9/1975 Kross
4,496,081 A 1/1985 Farrey
4,687,120 A 8/1987 McMillin
(Continued)

FOREIGN PATENT DOCUMENTS

EP 1295844 A1 3/2003
WO WO-9958443 A1 * 11/1999 ............ B67D 7/344
(Continued)

OTHER PUBLICATIONS

Webpage: http://www.bevmo.com/fireball-whisky-firebox-2-1-75-2-pk-1-751tr-.html; downloaded from internet on Oct. 4, 2016; 2 pages.

*Primary Examiner* — Paul R Durand
*Assistant Examiner* — Michael J. Melaragno
(74) *Attorney, Agent, or Firm* — Endurance Law Group PLC; James R. Yee

(57) ABSTRACT

A system containing a beverage dispensing package to a supply line, with associated supply line information, is provided. The beverage dispensing package has a package tag, having associated package information, affixed thereto. The package includes a connector assembly, a controller, a reader associated with the connector assembly, and a locking mechanism. The connector assembly has a recess and an outlet and is configured to receive the beverage dispensing package. The reader is coupled to the controller and is configured to read the package information associated with the beverage dispensing package. The locking mechanism is coupled to the connector assembly and the controller. The controller is configured to compare the package information and the pack liquid parameter, and control the locking mechanism to prevent or allow the beverage dispensing package to be connected to the outlet as a function of the comparison of the package information.

23 Claims, 55 Drawing Sheets

(56) References Cited

U.S. PATENT DOCUMENTS

| | | | | |
|---|---|---|---|---|
| 4,784,297 | A * | 11/1988 | Katz | B67D 3/00 222/161 |
| 4,856,676 | A * | 8/1989 | Emody | B67D 1/12 285/305 |
| 4,898,303 | A | 2/1990 | Large et al. | |
| 4,913,316 | A | 4/1990 | Richter | |
| 5,344,051 | A | 9/1994 | Brown | |
| 5,750,216 | A | 5/1998 | Horino et al. | |
| 6,202,878 | B1 | 3/2001 | Cook | |
| 7,197,377 | B2 | 3/2007 | Knepler | |
| 7,918,368 | B2 | 4/2011 | Crisp et al. | |
| 8,340,815 | B2 | 12/2012 | Peters et al. | |
| 8,442,674 | B2 | 5/2013 | Tilton et al. | |
| 8,515,574 | B2 | 8/2013 | Studor et al. | |
| 8,565,916 | B2 | 10/2013 | Zhang et al. | |
| 8,676,376 | B2 | 3/2014 | Quartarone et al. | |
| 8,739,840 | B2 | 6/2014 | Mattos et al. | |
| 8,894,599 | B2 | 11/2014 | Kataria | |
| 8,952,784 | B2 | 2/2015 | Katerberg et al. | |
| 9,056,759 | B2 | 6/2015 | Hourmand et al. | |
| D781,632 | S | 3/2017 | Kaytas et al. | |
| 10,121,132 | B2 | 11/2018 | Salvucci et al. | |
| 10,384,925 | B2 | 8/2019 | Cuppari et al. | |
| 10,562,757 | B2 | 2/2020 | Biasi et al. | |
| 10,689,239 | B1 * | 6/2020 | Siegel | B67D 1/0021 |
| 10,859,072 | B2 | 12/2020 | Beavis et al. | |
| 11,053,113 | B2 | 7/2021 | Tomforde et al. | |
| 11,192,772 | B1 | 12/2021 | DeRaedt et al. | |
| 11,427,462 | B2 | 8/2022 | Biasi et al. | |
| 11,655,806 | B2 | 5/2023 | Beavis et al. | |
| 2008/0173705 | A1 * | 7/2008 | Girard | B67D 1/0031 222/64 |
| 2008/0314927 | A1 | 12/2008 | Martin | |
| 2009/0069930 | A1 | 3/2009 | Peters et al. | |
| 2009/0069932 | A1 | 3/2009 | Rudick | |
| 2009/0069947 | A1 * | 3/2009 | Newman | B67D 1/0878 222/144.5 |
| 2009/0277516 | A1 | 11/2009 | Winkler et al. | |
| 2009/0289796 | A1 * | 11/2009 | Blumberg, Jr. | H01Q 1/50 340/572.1 |
| 2012/0035761 | A1 | 2/2012 | Tilton et al. | |
| 2013/0062366 | A1 * | 3/2013 | Tansey | B67D 1/0809 222/101 |
| 2013/0292407 | A1 * | 11/2013 | Beavis | F04B 13/00 222/23 |
| 2013/0306676 | A1 * | 11/2013 | Fishel | B67D 3/0067 222/105 |
| 2014/0107835 | A1 | 4/2014 | Biasi et al. | |
| 2014/0109526 | A1 | 4/2014 | Taylor et al. | |
| 2015/0046877 | A1 | 2/2015 | Cuppari et al. | |
| 2015/0082243 | A1 | 3/2015 | Taylor et al. | |
| 2016/0090288 | A1 | 3/2016 | Givens, Jr. et al. | |
| 2017/0011221 | A1 * | 1/2017 | Green | G06Q 30/06 |
| 2017/0076266 | A1 | 3/2017 | Salvucci et al. | |
| 2017/0096323 | A1 * | 4/2017 | DeRaedt | B67D 3/0019 |
| 2017/0217648 | A1 * | 8/2017 | Ait Bouziad | B65D 85/8049 |
| 2018/0044158 | A1 * | 2/2018 | Jersey | B67D 1/0857 |
| 2018/0070760 | A1 | 3/2018 | Herbert et al. | |
| 2019/0071298 | A1 | 3/2019 | Tomforde et al. | |
| 2019/0146641 | A1 * | 5/2019 | Deo | G07F 9/00 222/23 |
| 2020/0109042 | A1 * | 4/2020 | Jacobsen | B67D 3/0012 |
| 2020/0146500 | A1 * | 5/2020 | Cafaro | C12C 11/11 |
| 2021/0125142 | A1 * | 4/2021 | Bloom | G06Q 20/203 |
| 2021/0354975 | A1 * | 11/2021 | Burton | B67D 1/0801 |
| 2022/0051188 | A1 * | 2/2022 | Stoodley | G06F 16/22 |
| 2022/0388829 | A1 * | 12/2022 | Beavis | G01F 1/34 |
| 2023/0110597 | A1 * | 4/2023 | Beavis | F04B 49/065 222/52 |

FOREIGN PATENT DOCUMENTS

| | | | | |
|---|---|---|---|---|
| WO | WO-03097497 | A1 * | 11/2003 | B67D 1/0085 |
| WO | WO-2009017390 | A1 * | 2/2009 | F16L 37/35 |
| WO | WO-2011084603 | A1 * | 7/2011 | B67D 1/0031 |

* cited by examiner

FIG. 9A
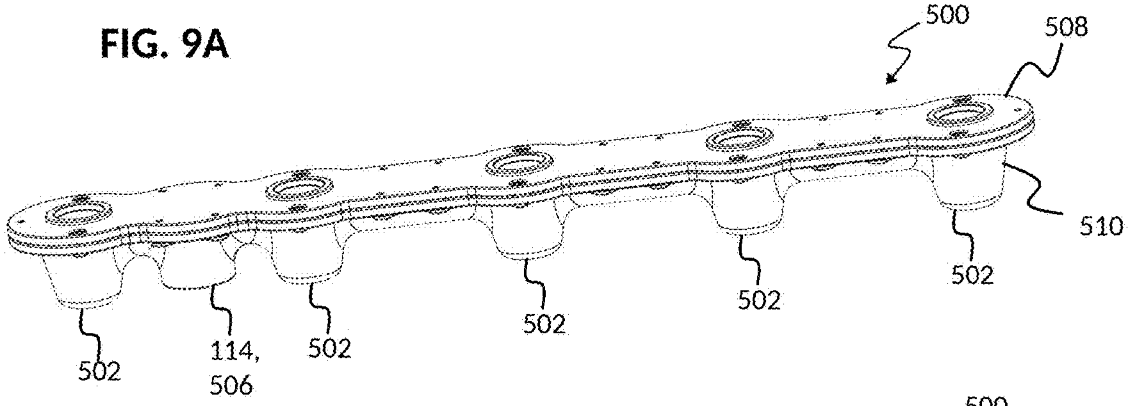
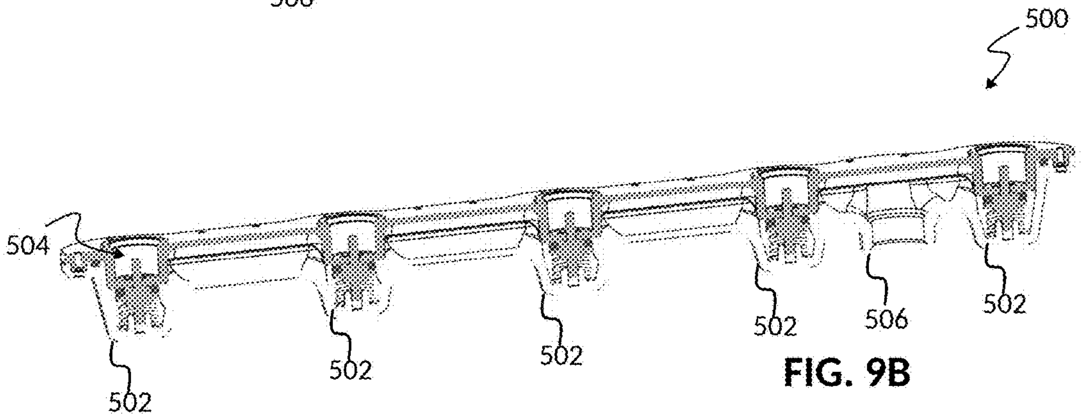
FIG. 9B
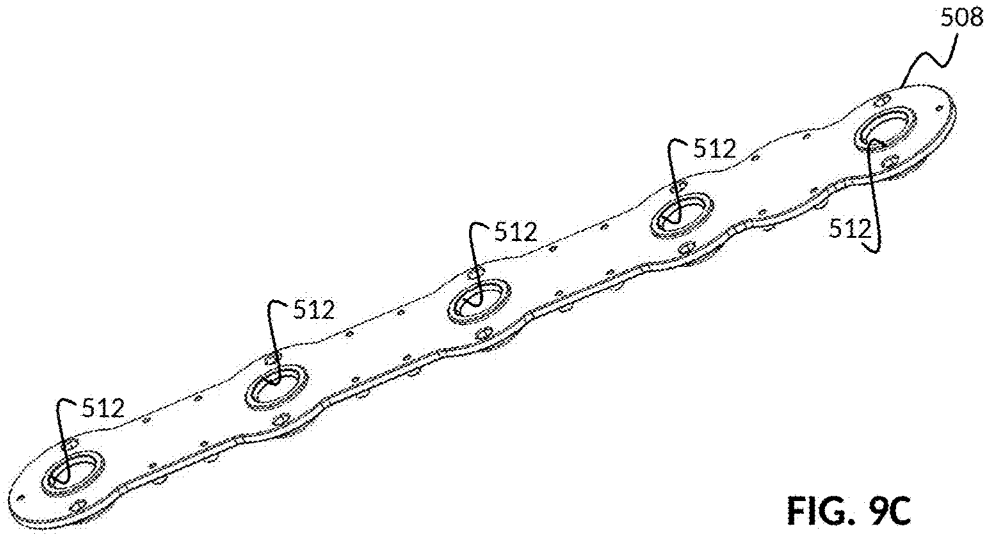
FIG. 9C

SYSTEM FOR CONTROLLABLY CONNECTING A BEVERAGE DISPENSING PACKAGE TO A SUPPLY LINE

CROSS REFERENCE TO RELATED APPLICATIONS

This application claims priority to U.S. Provisional Patent Application 63/424,536 (BAREVOL-P0006P) filed on Nov. 11, 2022, the entire disclosure of which is hereby incorporated by reference and relied upon.

FIELD OF THE INVENTION

The present disclosure relates generally to beverage dispensing solutions, and more specifically, to a system for controllably connecting a beverage dispensing package to a supply.

BACKGROUND OF THE INVENTION

Regulations vary from country to country on how distilled spirits can be distributed, not only the volume but also packaging, labeling, filling, etc. In the United States, the Department of Treasury Alcohol & Tobacco Tax & Trade Bureau (TTB) regulates the bottle sizes for distilled spirits. Further, the Internal Revenue Code of 1986 authorizes regulations on the kind and size of containers for distilled spirits. According to the TTB, the purpose of the regulations establishing uniform standards of fill for alcoholic beverages is "to prevent a proliferation of bottle sizes and shapes which would inevitably result in consumer confusion and deception with regard to the quantity and net contents of the alcohol beverage package." In addition, the "uniformity in bottle sizes required by these standards also facilitates the proper calculation of Federal excise tax." A key issue related to these concepts is the potential loss of water and the resulting increase in alcohol concentration or "proof" which may be affected by the packaging.

The maximum volume of packaging of spirits may be limited in some jurisdictions. For example, in the United States, the maximum volume of packaging in which spirits can be shipped or distributed is currently 1.8 liters. This limitation has a significant impact for places where spirits are distributed or consumed in large quantities such as clubs, large events, bars, conferences, etc.

The current way to address this regulatory restriction is to create pump rooms filled with racks in which bottles are turned upside down and collectors channel the liquid through tubes to pumps and ultimately, to the dispensing device(s). This multiplies the capacity of a specific distilled spirit by the number of bottles used. However, this method requires significant real estate to support the bars in the property. It further has an impact on labor, space, weight, time and also the disposal process that generates a lot of waste. As a result, this solution creates significant inefficiencies.

Such packages may be used in a beverage dispensing system. The beverage dispensing system may be a manual system in which an operator manually dispenses the contents of a package into a glass or cup or other container for mixing a drink. Alternatively, the beverage dispensing system may be a system that automatically dispenses the product in a container and/or automatically mixes or dispenses a drink based on a stored recipe.

In different types of system, if a package with the wrong type of contents are connected to a supply, the supply line to which it is connected may become contaminated and the supple line or system shut down for cleaning and/or repair.

It is therefore, desirable, to provide a system for the management of beverage dispensing packages, e.g., installment and/or removal and/or replacement of a beverage dispensing packages within a beverage dispensing system.

The present disclosure is aimed at solving one or more of the problems identified above.

BRIEF SUMMARY OF THE INVENTION

In one aspect of the present invention, a system for controllably connecting a beverage dispensing package containing a liquid product to a supply line is provided. The beverage dispensing package contains a liquid product and has a package tag. The package tag is associated with package information associated with the beverage dispensing package. The supply line has associated supply line information. The system includes a connector assembly, a connector, a controller, a reader. The connector assembly has a recess and an outlet and is configured to receive the beverage dispensing package. The outlet of the connector assembly is connected to the supply line. The connector assembly is further configured to controllably connect the beverage dispensing package to the outlet. The reader is coupled to the controller and is configured to read the package information associated with the package tag of the beverage dispensing package. The locking mechanism is coupled to the connector assembly and the controller and is configured to compare the package information and the supply line information and control the locking mechanism to prevent or allow the beverage dispensing package to be connected to the outlet as a function of the comparison of the package information and the supply line information.

BRIEF DESCRIPTION OF THE SEVERAL VIEWS OF THE DRAWINGS

These and other features and advantages of the present invention will become more readily appreciated when considered in connection with the following detailed description and appended drawings.

FIG. 9A is a view of a valve assembly for use with the MBC assembly of FIG. 5A, according to an embodiment of the present invention.

FIG. 9B is a cut-away view of the valve assembly of FIG. 9A.

FIG. 9C is a perspective view of a top portion of the valve assembly of FIG. 9A.

DETAILED DESCRIPTION OF THE INVENTION

Figure 1A:
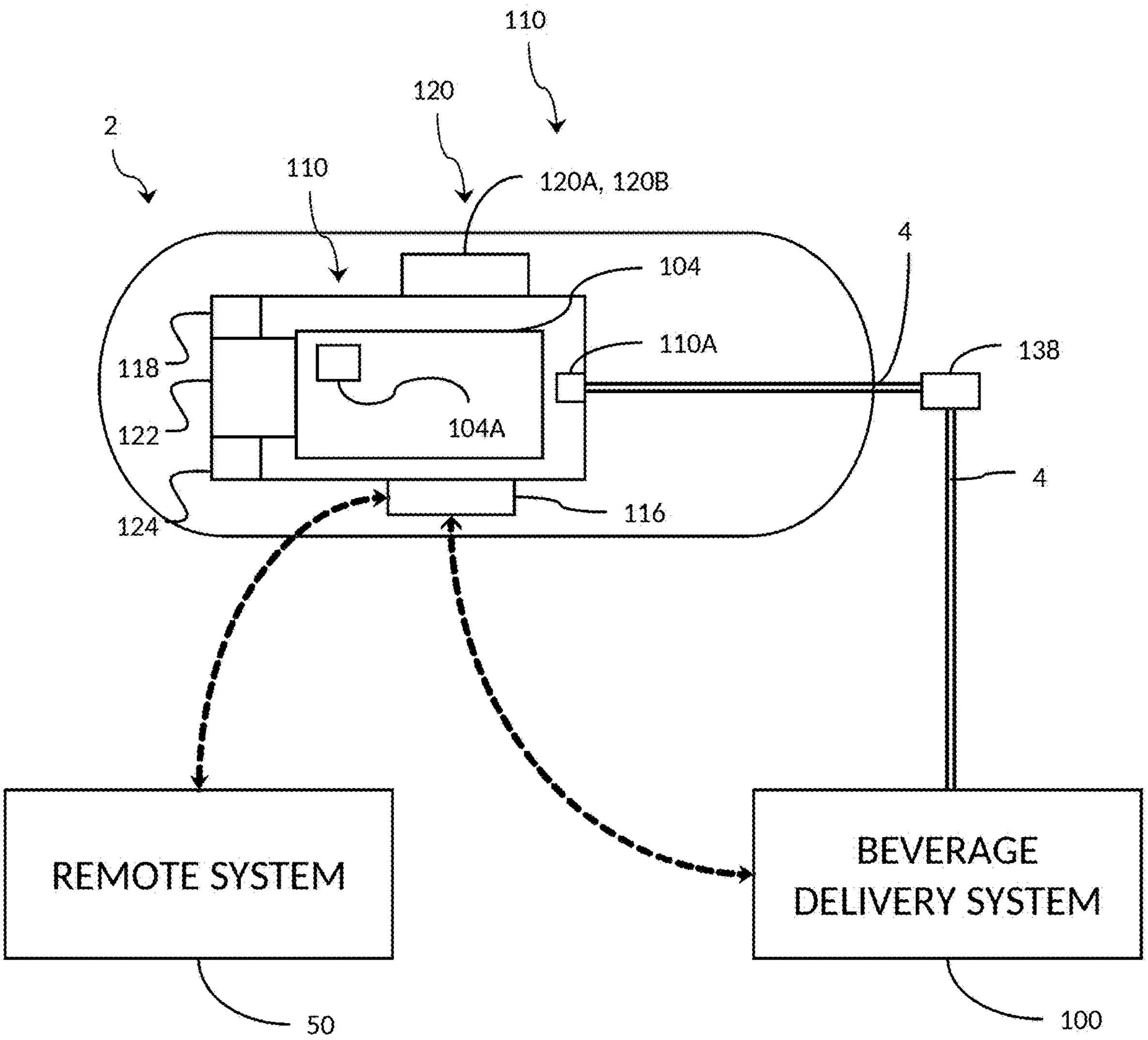
FIG. 1A is a graphic representation of a system for controllably connecting a container to a supply line, according to a first embodiment of the present invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment of example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

With reference to the drawings and in operation, the present invention provides a system 2 for controllably connecting a beverage dispensing package or box 104 to a supply line 4. The beverage dispensing package 104 contains a liquid product (see below) and having a package tag 6 affixed thereto. The package tag 6 is associated with package information associated with the beverage dispensing package 104. In one aspect of the present invention, the package information includes one or more of the following: type of liquid, brand name, alcohol content, sugar level, production date, dill date, packing date, batch number, manufacturer, total content volume, number of individual containers within the beverage dispensing package, a unique package identifier, packing company, distributor and other relevant information.

With specific reference to FIGS. 1A-1F, the supply line 4 has associated supply line information. In one aspect of the present invention, the system 2 includes a connector assembly 110, a controller, a first reader 118, and a locking mechanism 116.

The system 2 may be utilized to controllably connect the beverage dispensing package 104 to the supply line 4 in a beverage dispensing system 100. In one embodiment, the beverage dispensing system 100 is a bartender station (or is included therein) at a bar. Alternatively, the beverage dispensing system 100 may be used with, or incorporated within, any suitable location such as a kitchen, a bar, a reception area, or may be a portable station that may be used to serve alcoholic beverages in any suitable location. The beverage dispending system 100 may be configured to support and manage the creation, licensing, promotion and/or deliver of beverages, e.g., alcohol-base and/or alcohol-free cocktails and related services. One such system is disclosed in U.S. Pat. No. 11,192,772, issued on Dec. 7, 2021, which is herein incorporated by reference.

The system 2 may include, and be managed by, a remote system 50. The connector assemblies 110 in the system 2 communicate with the remote system 50. In one aspect, the remote system 50 is composed of one or more cloud-based servers 52. Each cloud-base server 52 may include one or more processor(s) 54, a memory device 56 and may be connected to a database 58. The database 58 stores and maintains various records for use by the system 2. The database 58 may be comprised of one or more databases distributed and/or maintained by the one or more servers 52. The system memory device 56 stores one or more pieces of software or system execution program(s) which are used by the server(s) and/or other devices for controlling operation of the system 2, servers 52 and/or other devices of, or associated with, the system 2. The system execution program(s) comprise algorithms, which when run by the various devices, implement respective functions and/or engines of the system 2. As discussed above, in the illustrated embodiment, the memory device 56 stores a system execution program including computer instructions.

The system 2 may include a plurality of connector assemblies 110. Each connector assembly 110 connected to a respective supply line 4. The remote system 2 manages the connector assemblies 110 the product being supplied therethrough the respective supply lines 4. The database 58 is coupled to the connector assemblies 110 (see below) and stores data records related to the product packaging, the product lines and the assigned connector assembly 110 to that product line or supply line 4. It further stores the product packaging details including its fill level, all data pertaining to the connector assemblies 110, the users that have been authorized to use each of the connector assemblies 110.

As discussed in more detail below, the system 2 may be used or configured to address quality control issues that currently exists in connecting various products to the beverage dispensing system 100. The system 2 prevents unauthorized removal of products from the connector assemblies 110 that are, for example, not empty. The system 2 may also prevent unauthorized insertion and removal of products. The connector assembly 110 prevent insertion or attachment of the wrong product into a product supply line that is associated with another product. The management solution provides a fool proof solution for any operator using a connector assembly 110. The connector assembly 110 may be used alone or in combination with other connector assembly 110 to create a compact flexible supply solution. As will be discussed in more detail below, the connector assembly 110 includes a wireless connection that can be controlled via any means including cellular phone, tablet etc. This self-reporting self-monitoring connector system significantly augments operational and regulatory efficiencies.

It should be further noted that the remote system 50 and the beverage dispensing system 100 may be integrated into a single system, and/or may be independent systems.

In the illustrated embodiment, the connector assembly 110 has a recess 402C (see below) and an outlet (or main outlet) 110A. The connector assembly 110 is configured to receive the beverage dispensing package 104 in the recess 402C. The outlet 110A of the connector assembly 110 is connected to the supply line 4. As discussed in more detail below, the connector assembly 110 is further configured to controllably connect the beverage dispensing package 104 to the outlet 110A which is connected to the supply line 4.

In one aspect of the present invention, the beverage dispensing package 104 is a multi-bag beverage dispensing package 104 (see below). As discussed in more depth below, the beverage dispensing package 104 may be configured to accommodate two or more containers or bags 106 containing the liquid product. In one embodiment (see below), each container or bag 106 may have a fitment 108 which are connected to the outlet 110A of the connector assembly 110 via a valve assembly 112 (see below).

The connector assembly 110 of the system 2 further includes a controller 116, a first reader 118 and a locking mechanism 120 associated with the connector assembly 110. In one embodiment, each connector assembly 110 has an associated controller 116. As discussed in further detail below, the controller 116 includes a processor (not shown) and other components (see below) for controlling features and function of the connector assembly 110. The controller 116 is capable of communicating to other computer devices via Wi-Fi, Bluetooth, and Ethernet, to deliver several different functionalities. Each controller 116 has a unique identifier or address that is unique and identifies the connector assembly 110 with which the controller 116 is associated.

The first reader 118 is associated with the connector assembly 110 and is coupled to the controller 116. The first reader 118 is configured to read the package information associated with the package tag 104A of the beverage dispensing package 104. In one embodiment, the package tag 104A is a barcode and the first reader 118 is a barcode reader. The package information may be embodied within the bar code or the bar code may be associated with, or an identifier associated with, the package information stored in the database 58. Alternatively, the package tag 104A may be a radio frequency identification device (RFID) and the first reader 118 is a RFID reader. It should be noted that the package tag 104A may be any type of device or indicia that may be identified by the first reader 118.

The locking mechanism 120 is coupled to the connector assembly 110 and the controller 116. The controller 116 is configured to compare the package information and the supply line information, and, control the locking mechanism 120 to prevent or allow the beverage dispensing package 104 to be connected to the outlet 110A as a function of the comparison of the package information and the supply line information. In one embodiment, the locking mechanism 120 includes a manual locking mechanism 450 (see below). In another embodiment the locking mechanism 120 includes one or more electric locking solenoids 120A (see FIG. 1A and FIG. 5H). The electric locking solenoids 120A, 120B are coupled to, and controlled by, the controller 116.

Figure 1B:
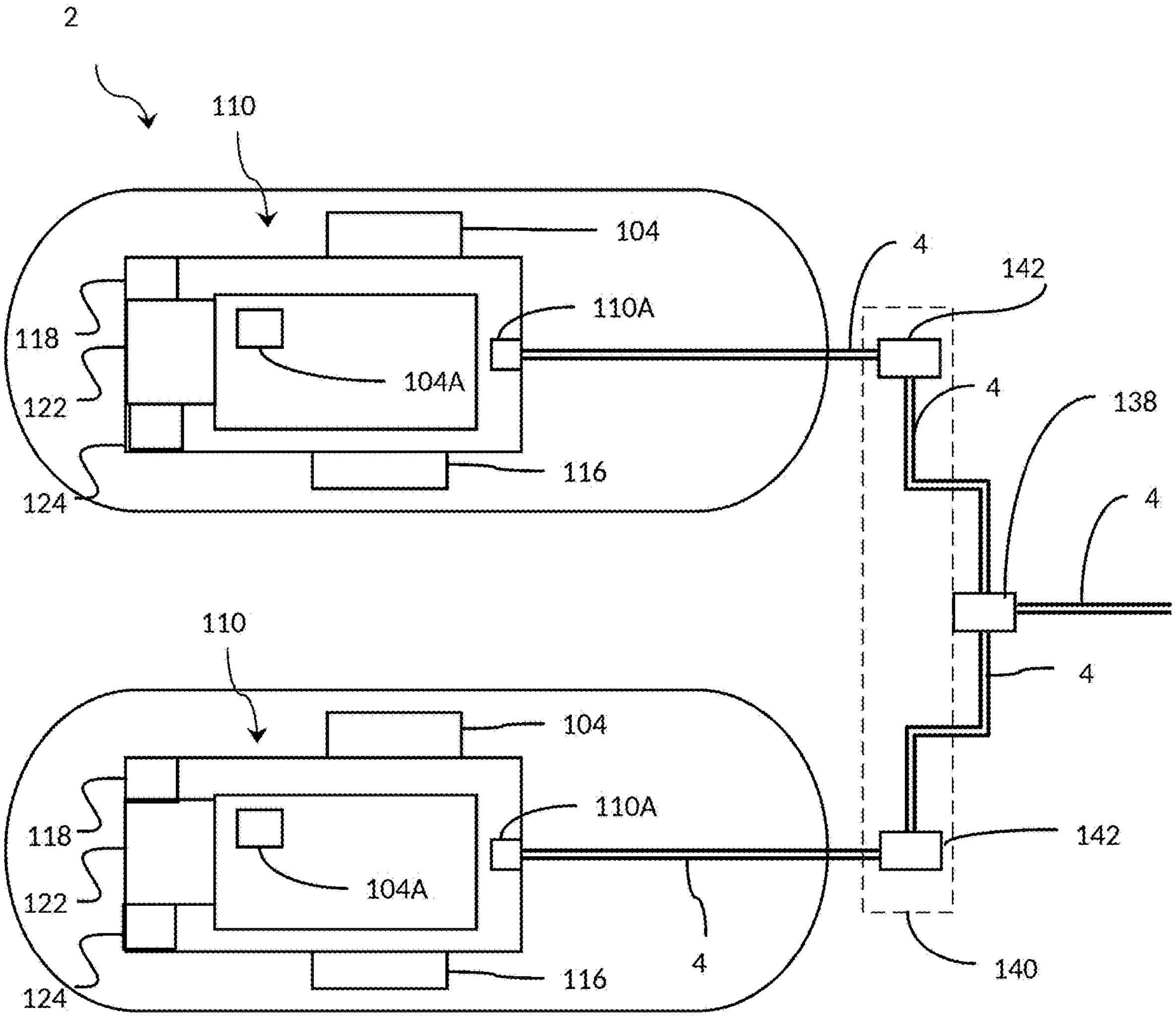
FIG. 1B is a graphic representation of a system for controllably connecting a container to a supply line, according to an embodiment of the present invention.
Figure 1C:
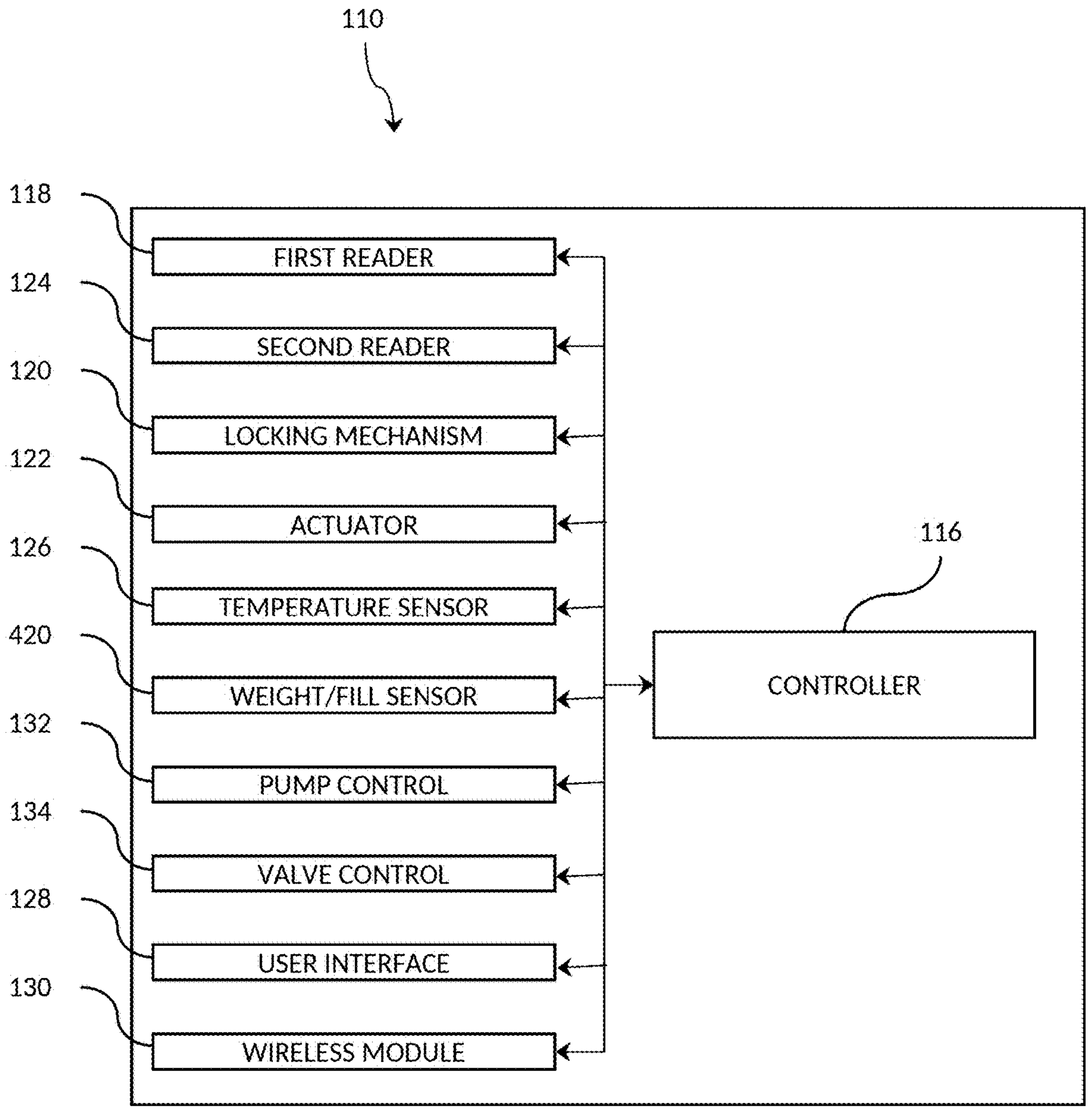
FIG. 1C is a functional block diagram of a connector assembly of the system of FIG. 1A or 1B, according to an embodiment of the present invention.
Figure 1D:
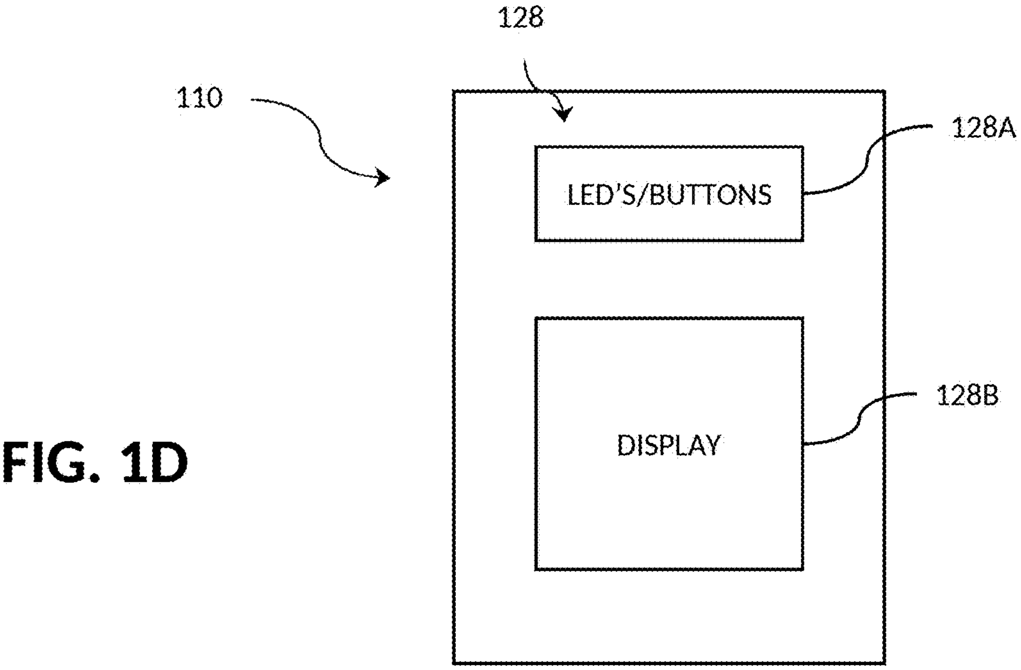
FIG. 1D is a graphical representation of a front view of the connector assembly of FIG. 1C.
Figure 1E:
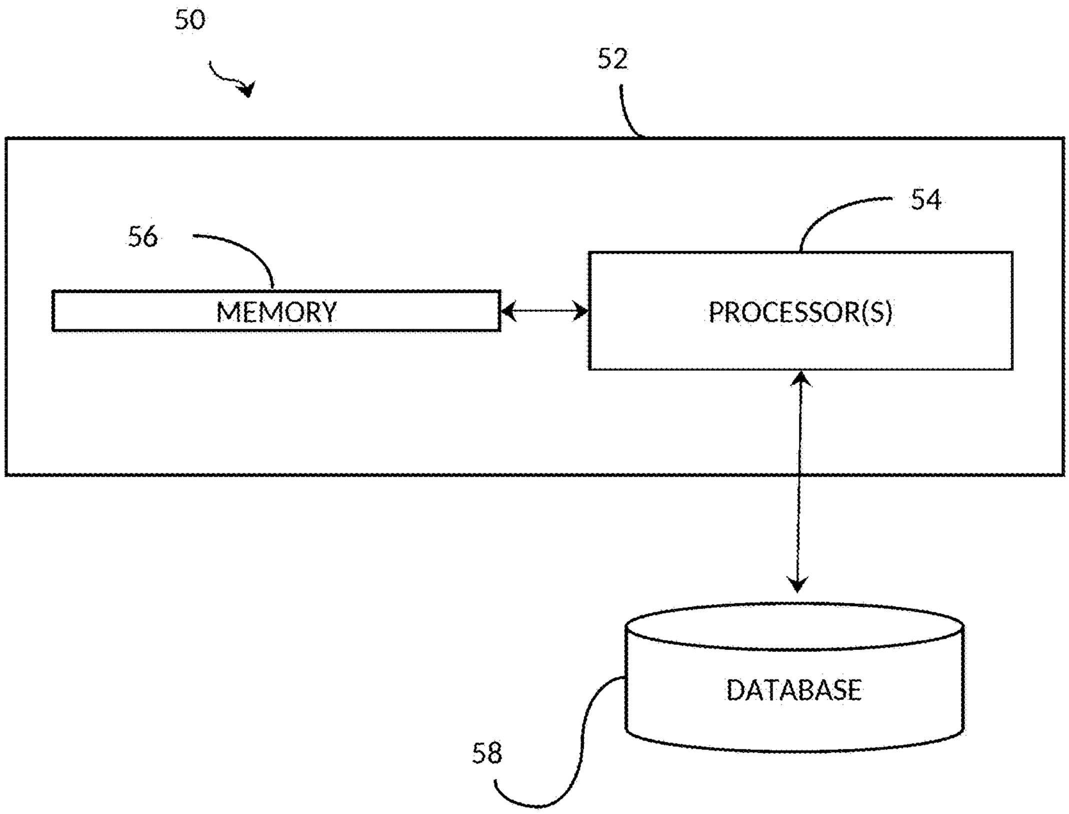
FIG. 1E is a block diagram of a remote system for managing the connector assembly of FIG. 1C.
Figure 1F:
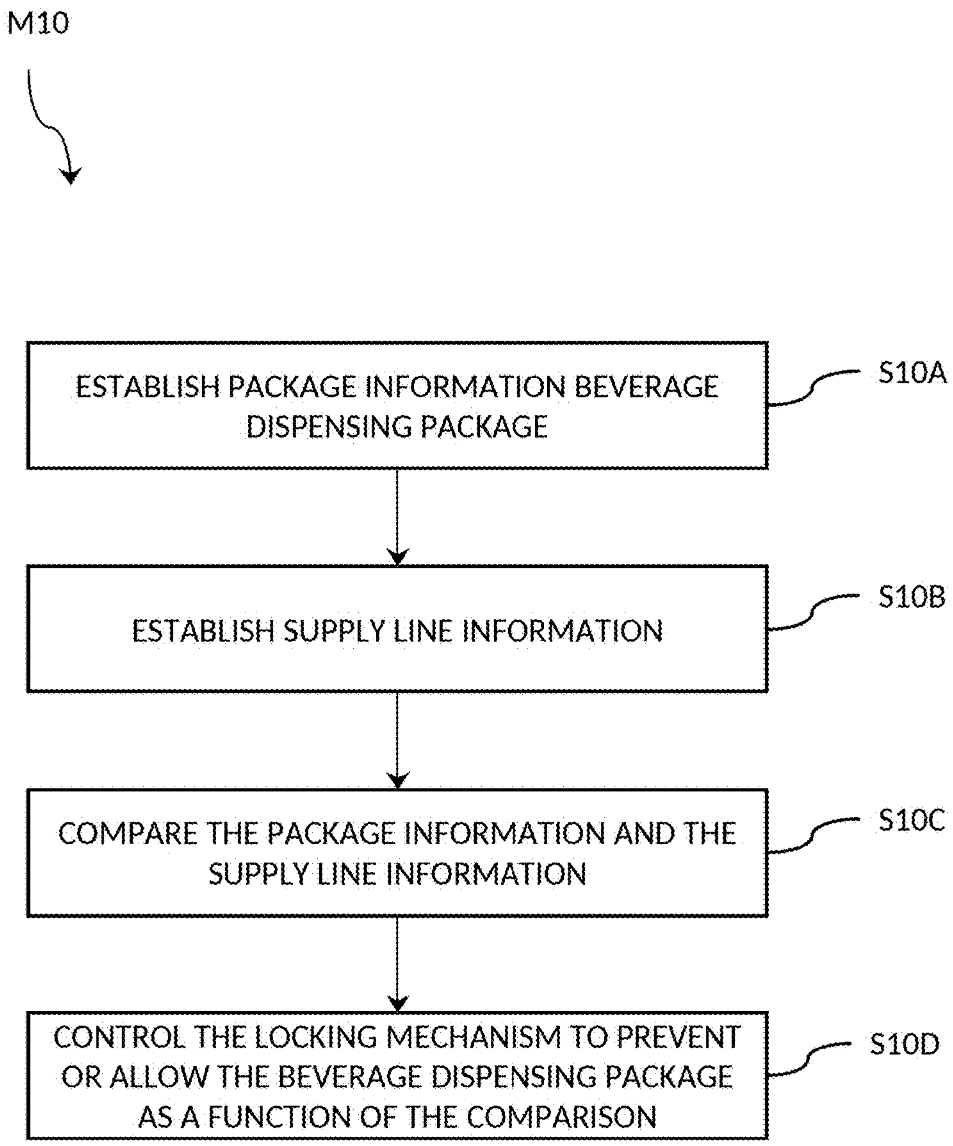
FIG. 1F is a flow diagram of a first method associated with the system of FIG. 1A.

With specific reference to FIG. 1F, in one aspect of the present invention, a method M10 associated with the system 2 is shown. In a first step S10A, the package information associated with the beverage dispensing package 104 is established. For example, in one embodiment the package information may be established by the first reader 118. The first reader 118 may read the package information directly embedded in the package tag 104A. Alternatively, the controller 116 may read an identifier embedded in the package tag 104A and obtain the package information stored in the database 58 associated with the identifier.

In a second step S10B, the controller 116 establishes supply line information associated with the supply line 4 to which the connector assembly 110 is contacted. In one embodiment, the supply information is stored within the database and associated therewith. Alternatively, the connector assembly 110 may include a reader (not shown) that is configured to read a tag (not shown) that is affixed to the supply line 4. The tag affixed to the supply line 4, which may be, for example, a bar code or a RFID tag, may have the supply line information embedded therein, or a may include an identifier associated with the supply line 4 and the supply line information retrieved by the controller 116 as a function of the identifier.

In a third step S10C, the established package information is compared with the supply line information. The supply line information defines the type of beverage dispensing package that must be installed in the connector assembly 110. For example, in a simple embodiment, the type of liquid defined in the package information must match the type of liquid in the supply line information. Alternatively, additional information in the package information, e.g., the brand name, must match.

In a fourth step S10D, if the established package information matches the supply line information, then the controller 116 controls the locking mechanism 120 to allow the beverage dispensing package 104 to be connected to the supply line 4. If the established package information does not match the supply line information, then the controller 116 controls the locking mechanism 120 to prevent the beverage dispensing package 104 from being connected to the supply line 4.

As discussed in more detail below, in one aspect of the present invention, the connector assembly 110 includes an actuator 120. The actuator 120 is moveable between an open position and an engaged position. The beverage dispensing package 104 may be removed or inserted into the recess when the actuator 120 is in the open position. When the actuator 120 is in the engaged position, the beverage dispensing package 104 is locked within the recess 402C and connected to the outlet 110A and the supply line 4.

In a first embodiment, the actuator 120 is a manual actuator that includes a handle assembly 444 (see below) that may be manually operated to move the actuator 120 from the open position to the engaged position and from the engaged position to the open position. The beverage dispensing package 104 may include one or more fitments 108 (see below). As the actuator 120 is moved from the open position to the engaged position, the controller assembly 110 grabs the fitments 108 and connects the fitments 108 with the outlet 114 of the valve assembly 112 (see below).

The locking mechanism 120 may include at least one electronic solenoid 120A, 120B coupled to the actuator 120 for preventing movement to or from the engaged position.

The electronic solenoids 120A, 120B under control of the controller 116 lock the actuator 122 in the engaged or the open position. With reference to FIGS. 5H-5K, in one embodiment the locking mechanism 120 includes first and second electronic solenoids 120A, 120B mounted within the housing 402. The first electronic solenoid 120A is configured to engage with an aperture 444-1 associated with the handle assembly 444 to controllably lock and release the actuator 120 in the open position. The second electronic solenoid 120B is configured to engage with an aperture 444-2 associated with the handle assembly 444 to controllably lock and release the actuator 120 in the engaged position.

Figure 5A:
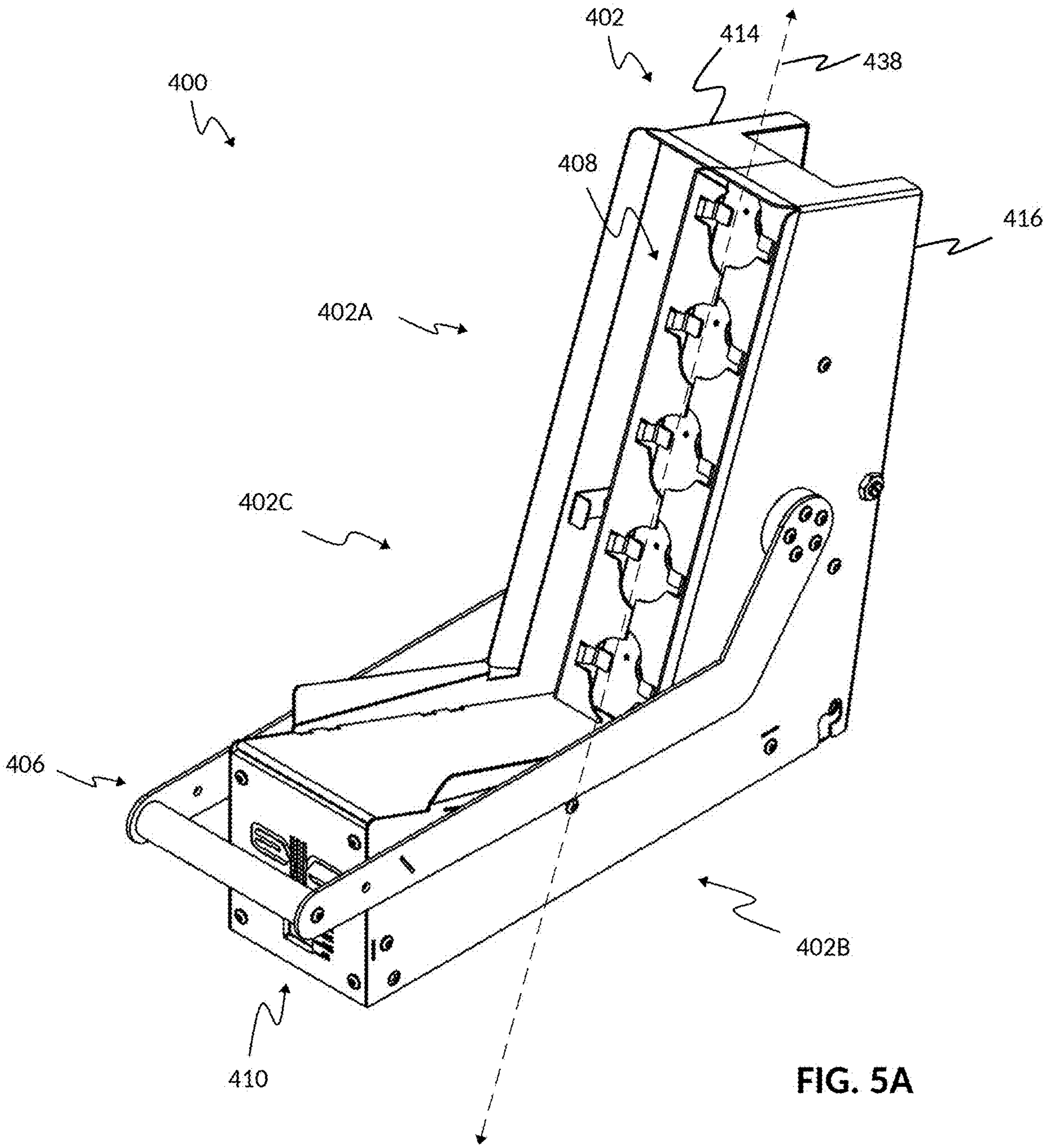
FIG. 5A is a perspective view of a multi-bag connector (MBC) assembly in an open position, according to an embodiment of the present invention, in an open position.
Figure 5B:
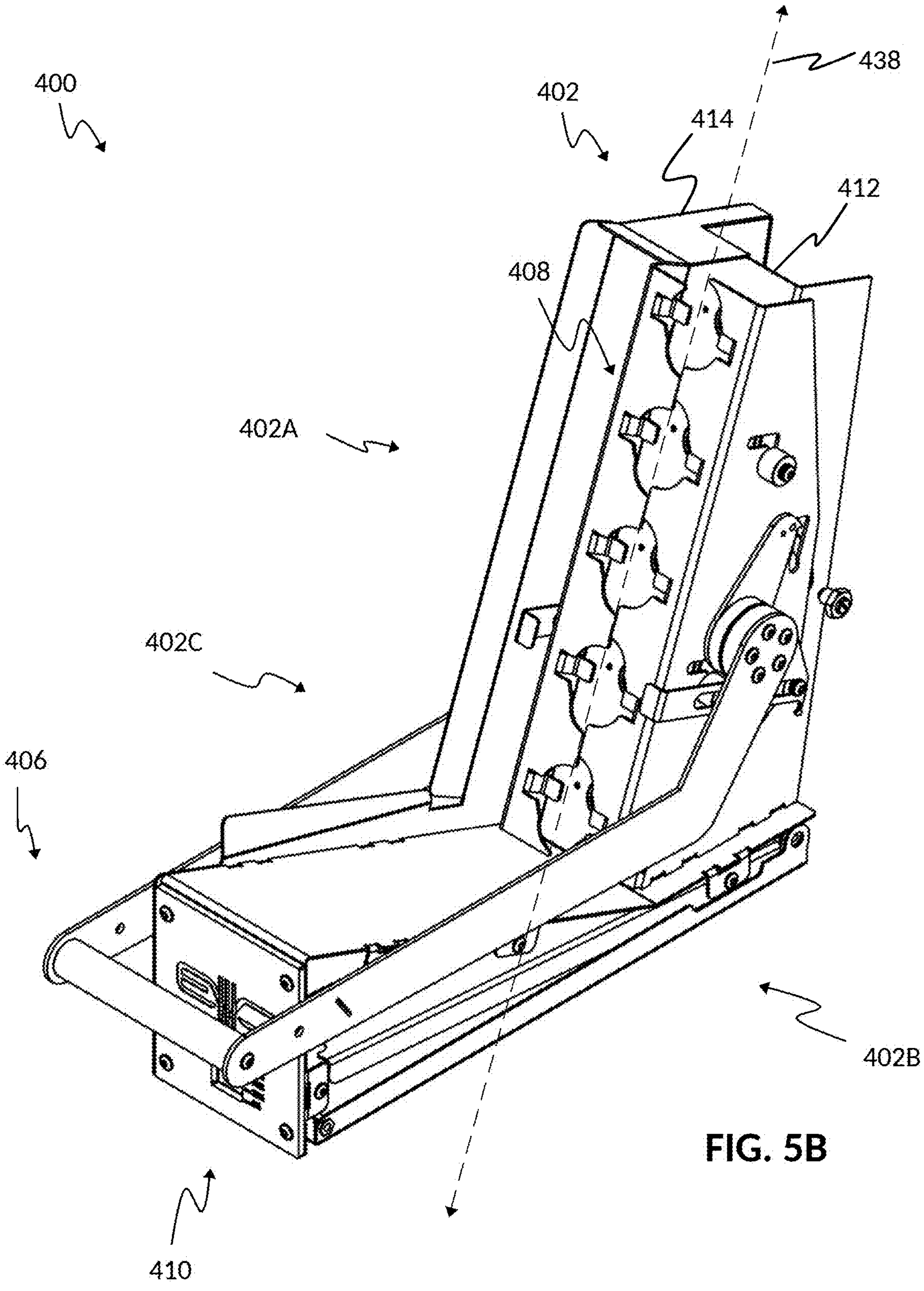
FIG. 5B is a perspective partial view of the multi-bag connector (MBC) assembly of FIG. 5A in the open position.
Figure 5C:
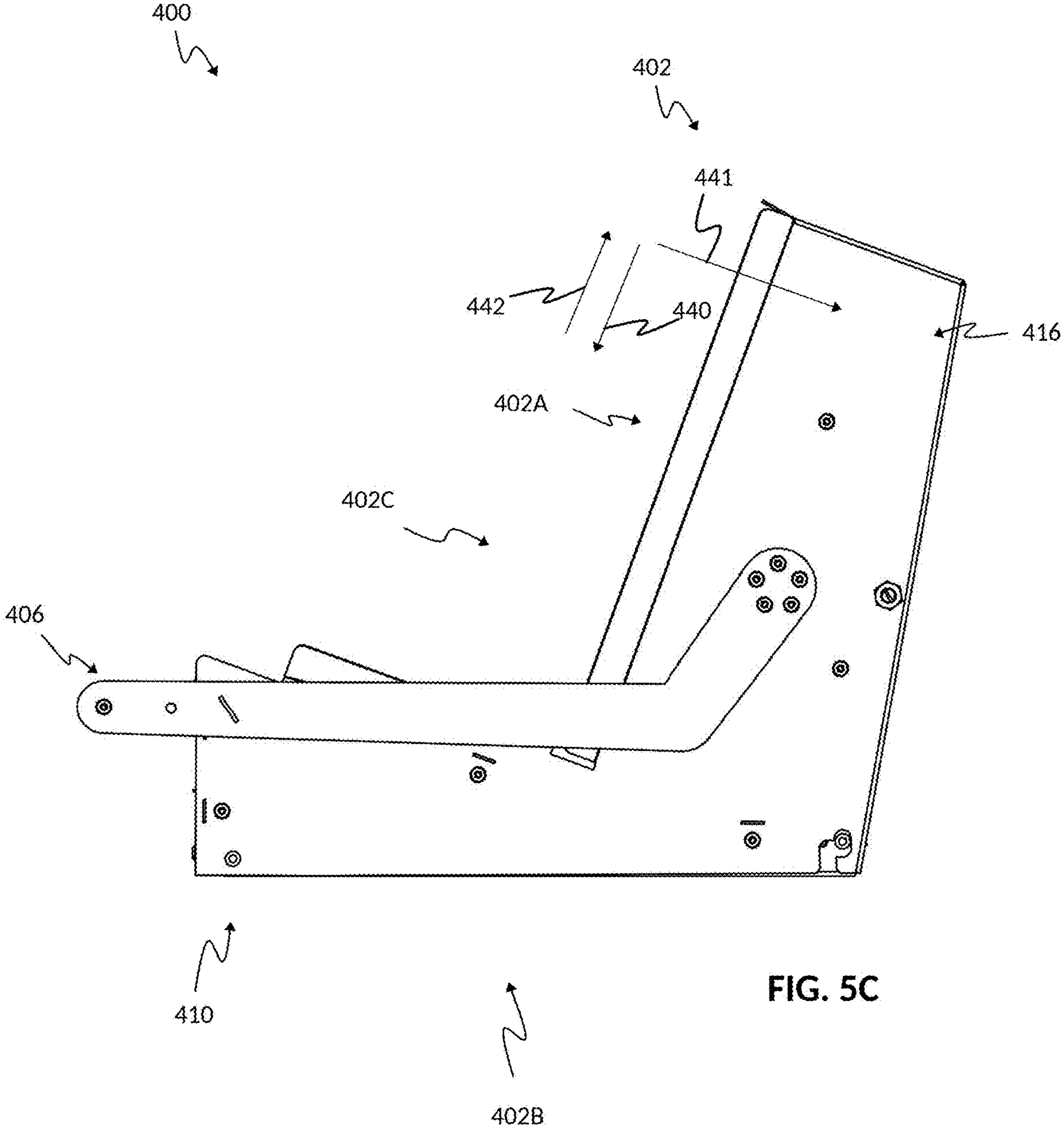
FIG. 5C is a side view of the multi-bag connector (MBC) assembly of FIG. 5A in the open position.
Figure 5D:
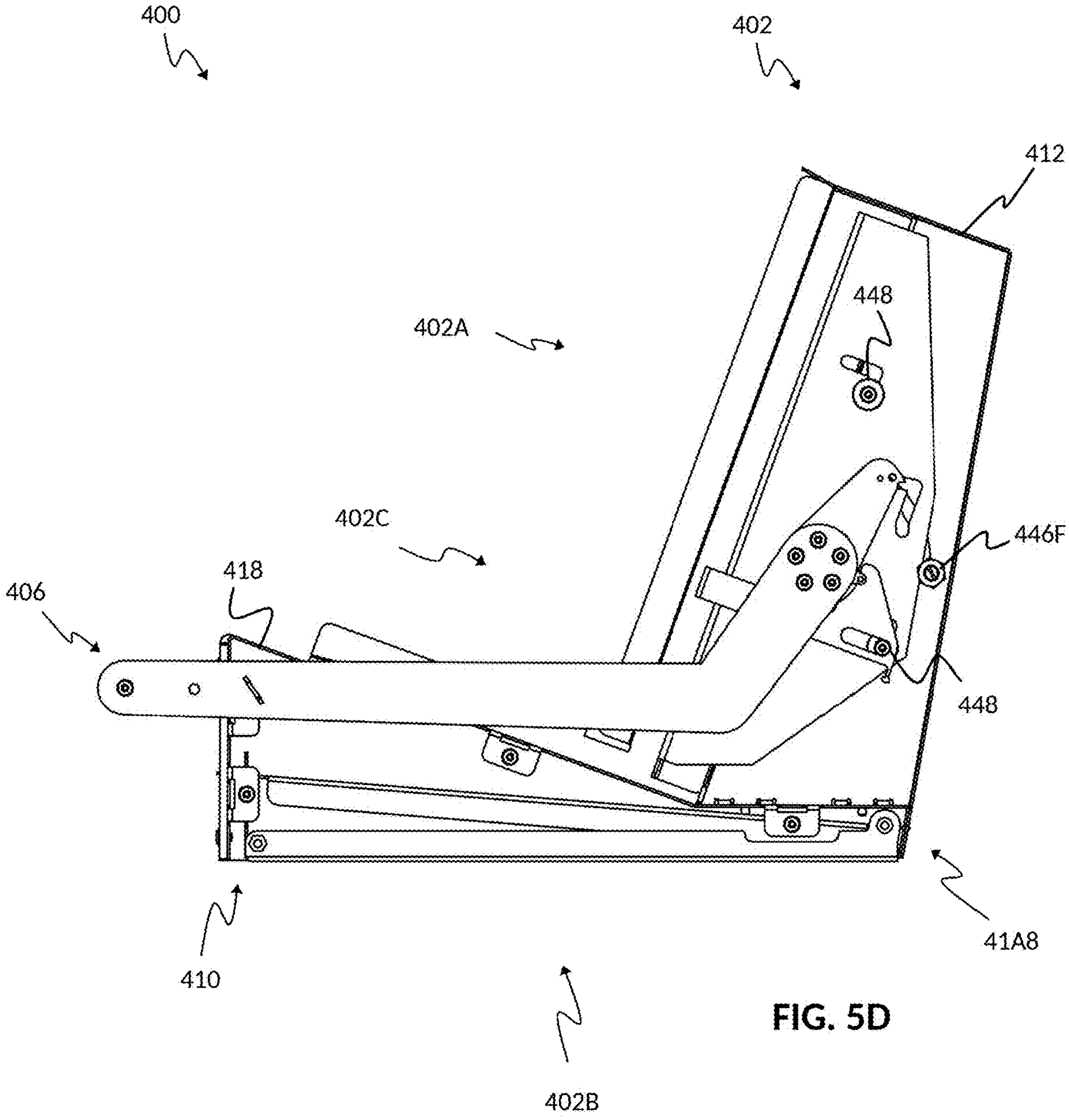
FIG. 5D is a side partial view of the multi-bag connector (MBC) assembly of FIG. 5A in the open position.
Figure 5E:
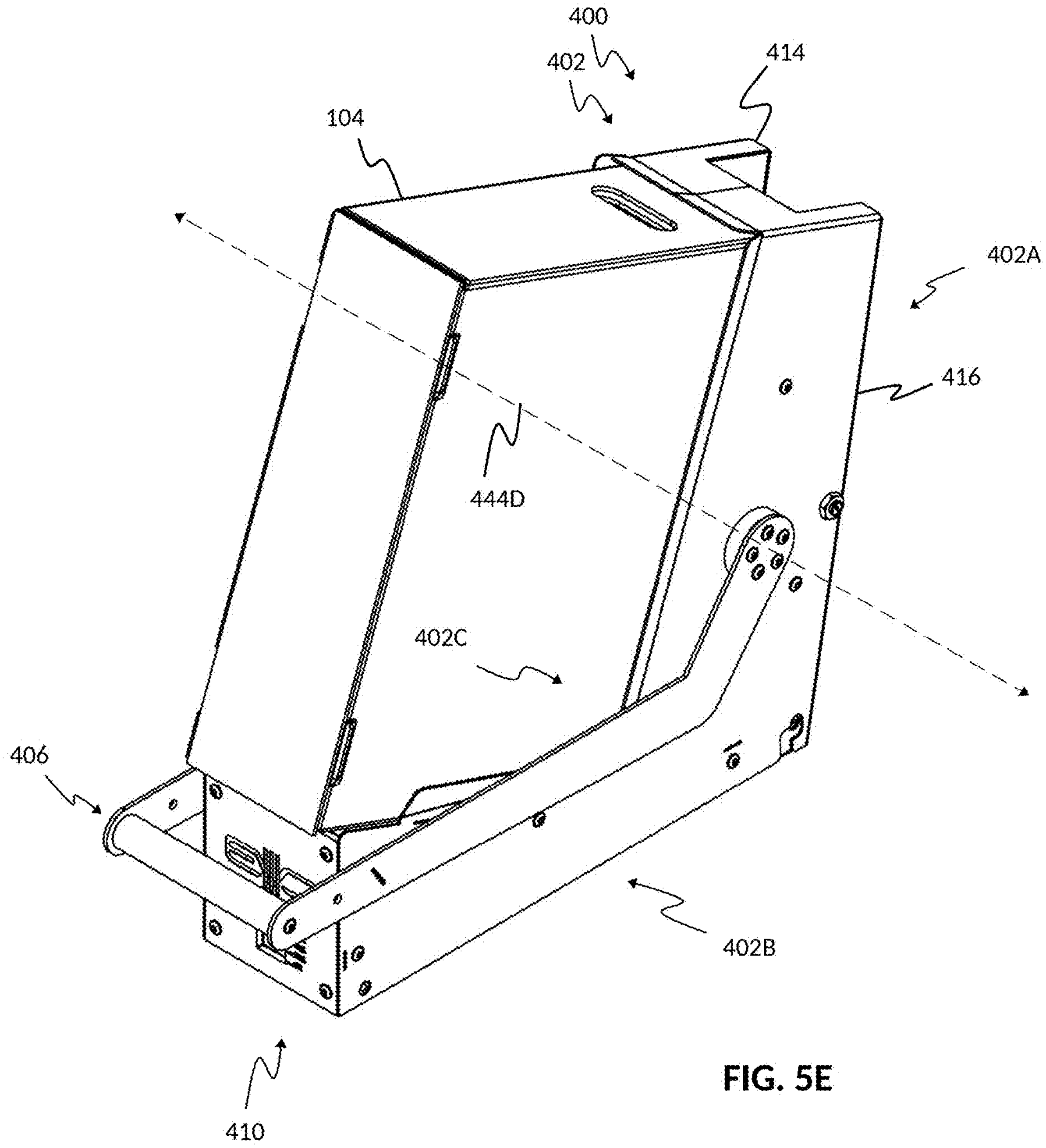
FIG. 5E is a perspective view of the multi-bag connector (MBC) assembly of FIG. 5A in the open position with a multi-bag package, according to an embodiment of the present invention.
Figure 5F:
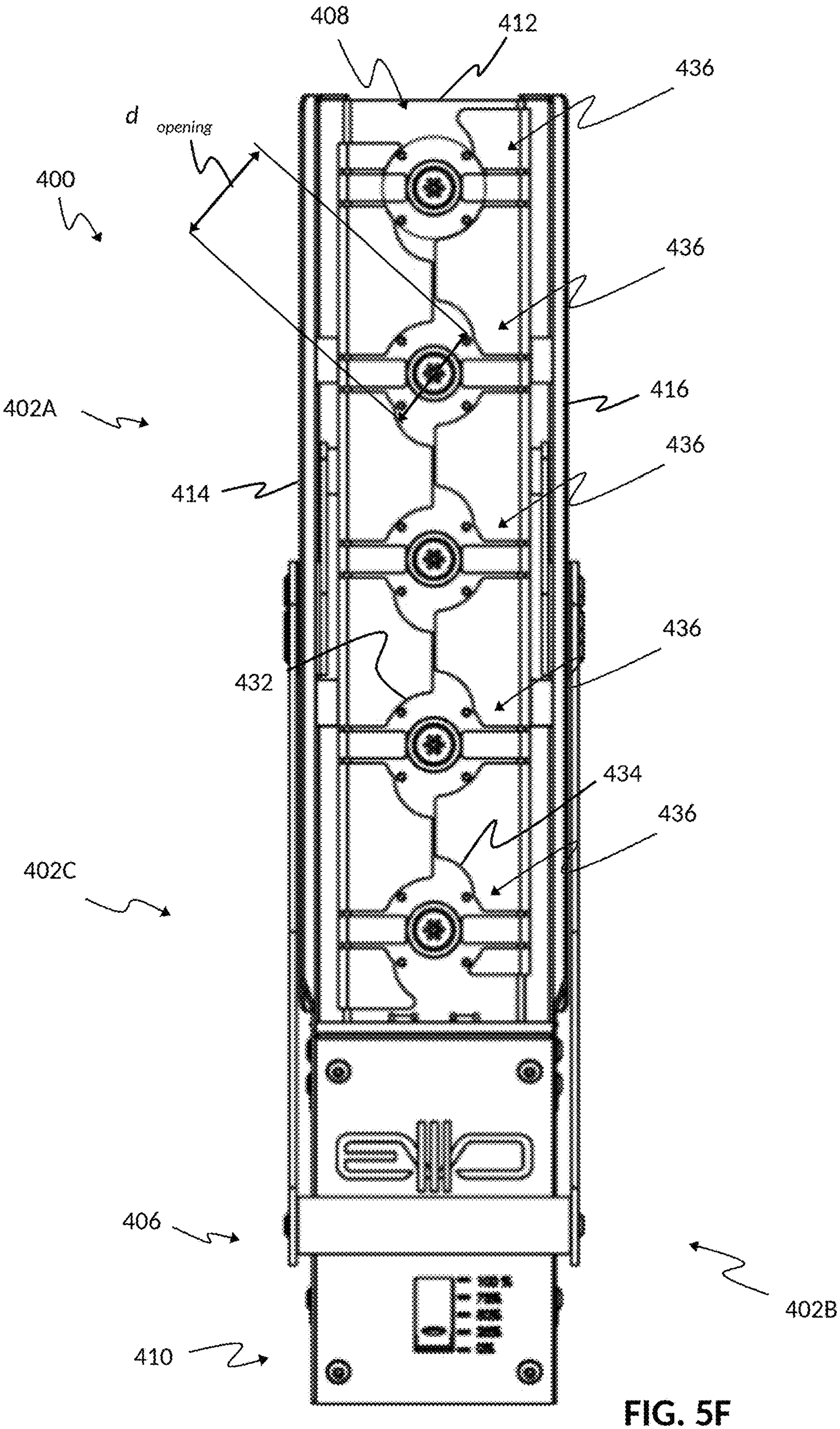
FIG. 5F is a front view of the multi-bag connector (MBC) assembly of FIG. 5A in the open position.
Figure 5G:
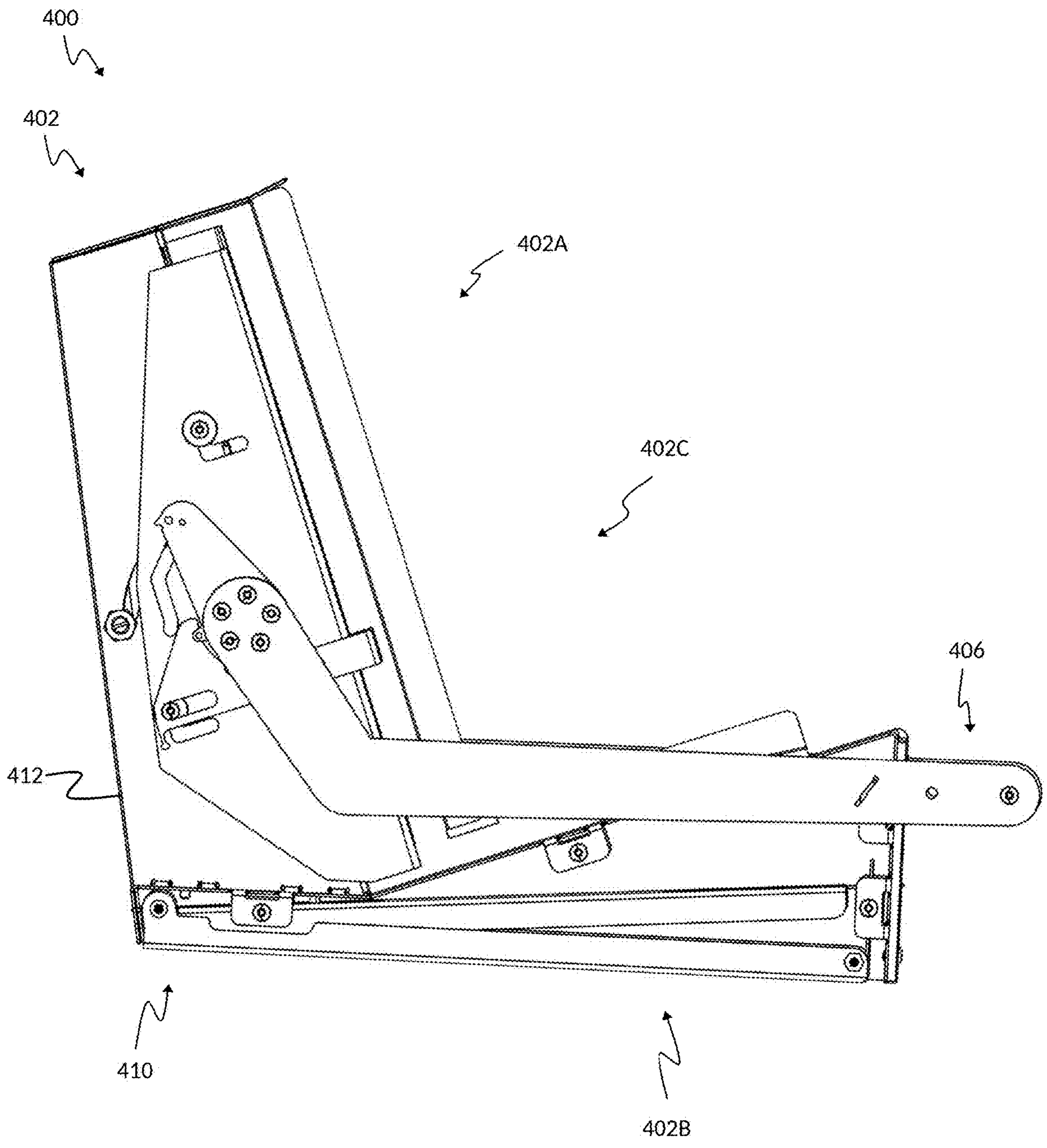
FIG. 5G is a second side partial view of the multi-bag connector (MBC) assembly of FIG. 5A in the open position.
Figure 5H:
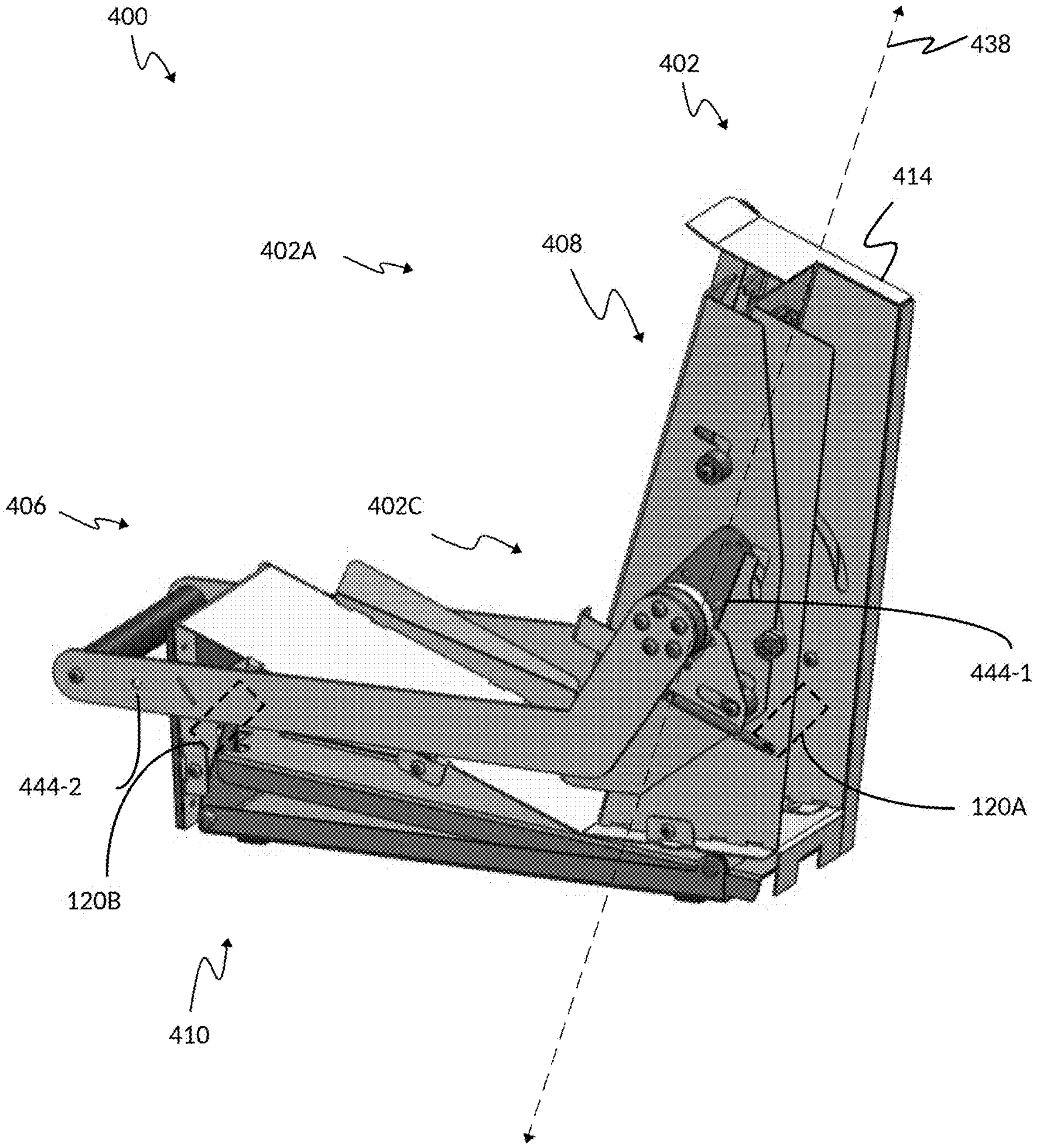
FIG. 5H is a first perspective view of a multi-bag connector assembly including one or more locking solenoids according to an embodiment of the present invention.
Figure 5I:
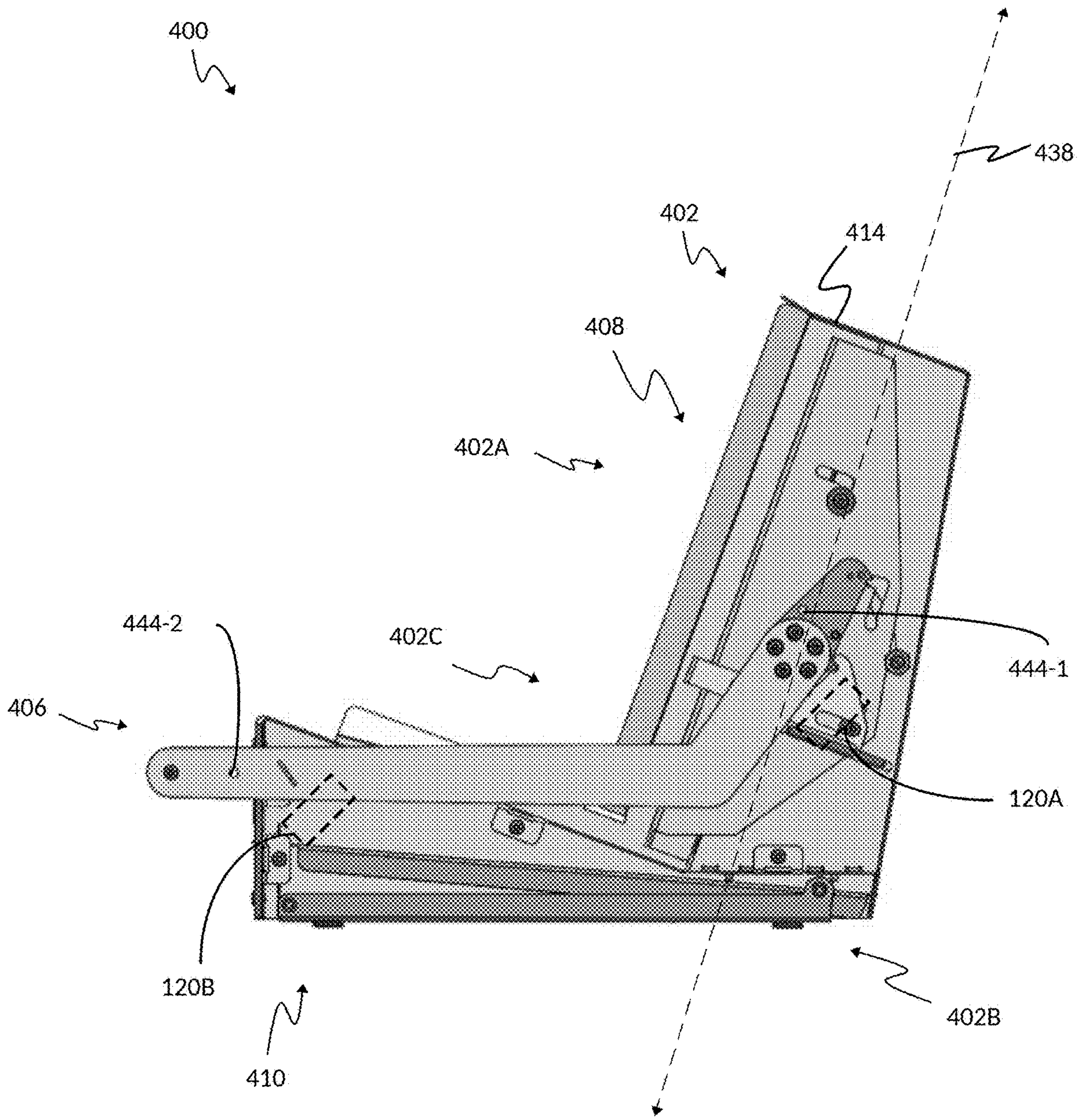
FIG. 5I is a second perspective view of a multi-bag connector assembly including one or more locking solenoids according to an embodiment of the present invention.
Figure 5J:
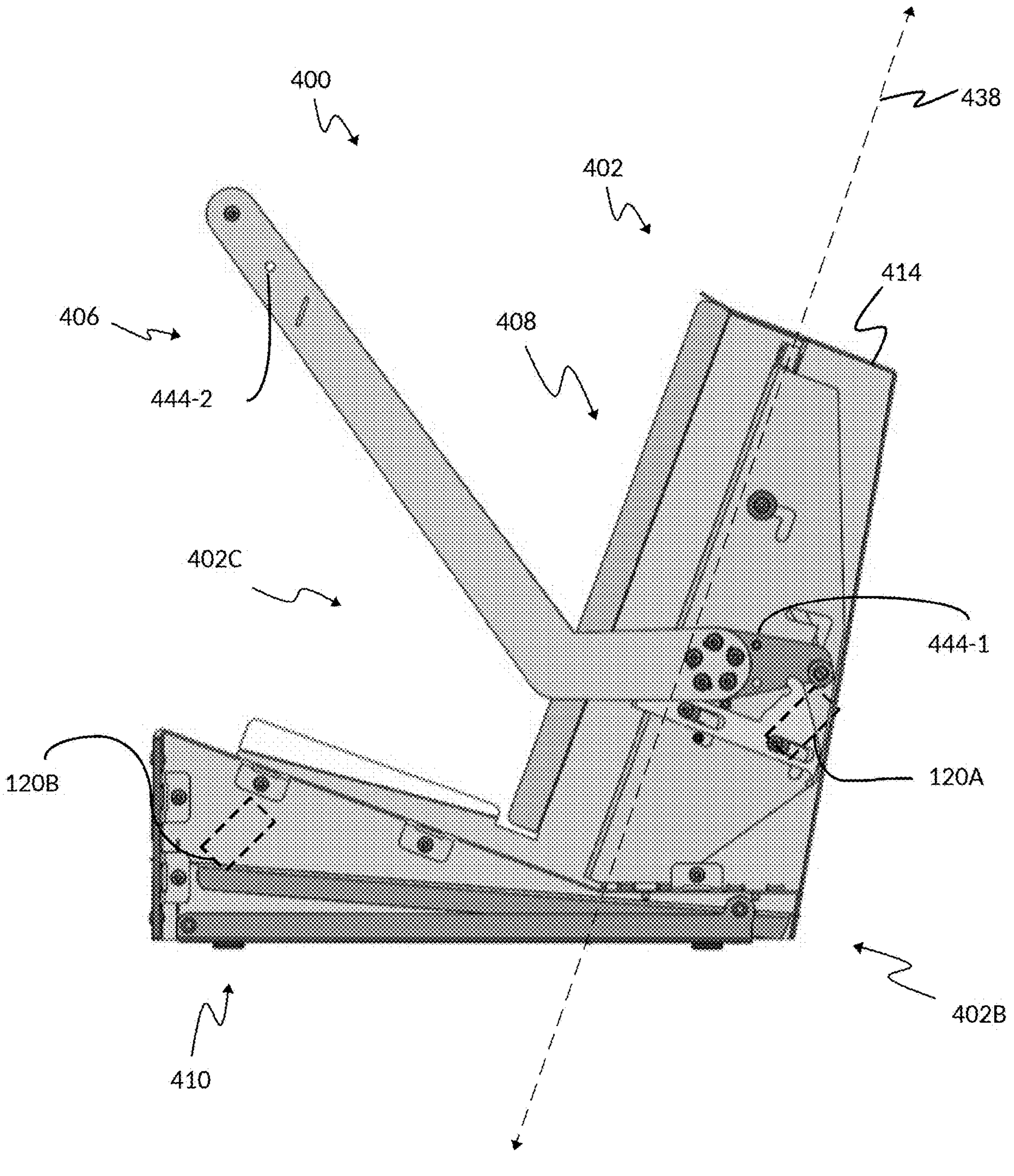
FIG. 5J is a third perspective view of a multi-bag connector assembly including one or more locking solenoids according to an embodiment of the present invention.
Figure 5K:
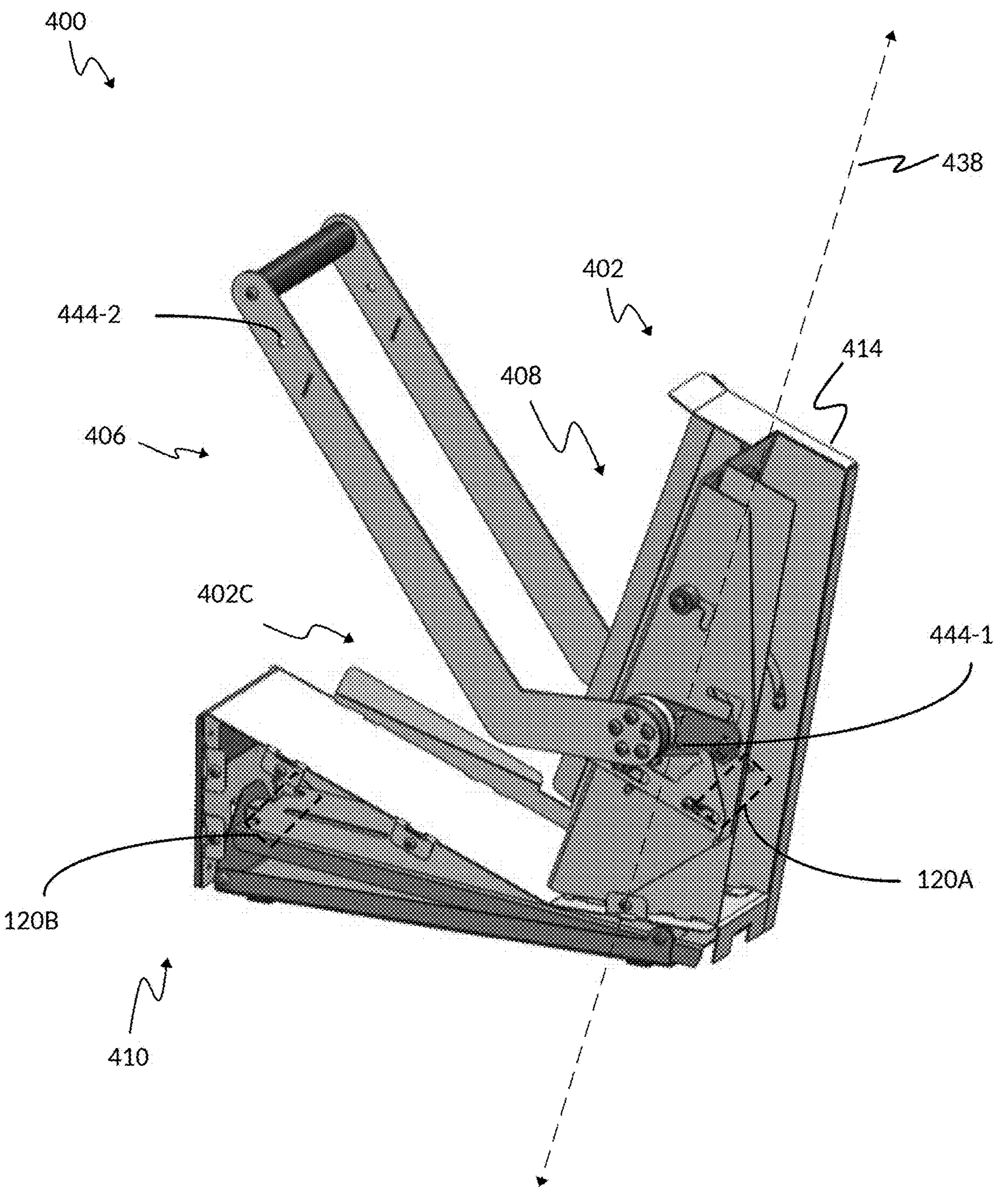
FIG. 5K is a fourth perspective view of a multi-bag connector assembly including one or more locking solenoids according to an embodiment of the present invention.
Figure 5L:
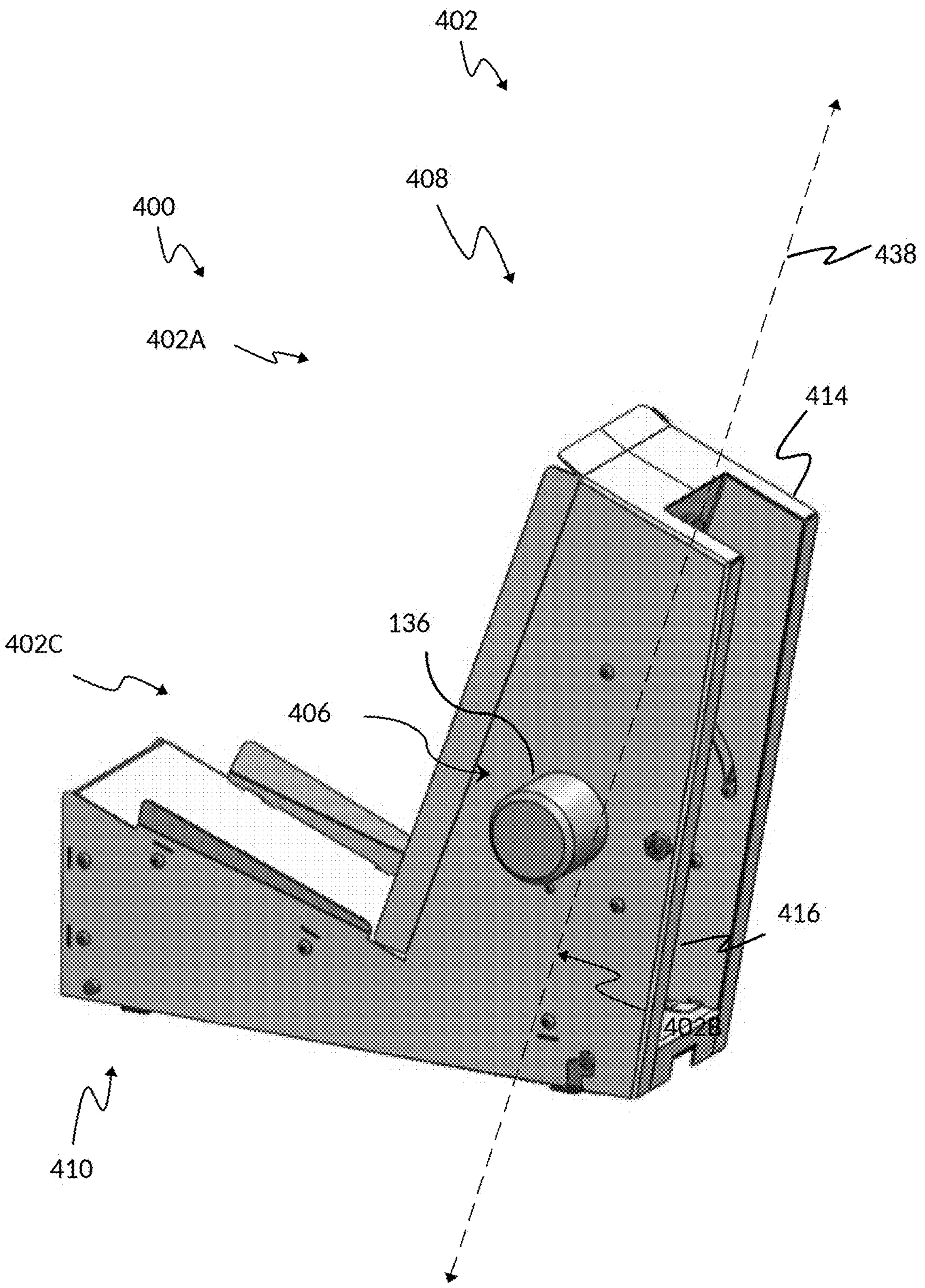
FIG. 5L is a perspective view of a multi-bag connector assembly having an actuator with an electric motor according to an embodiment of the present invention.
Figure 5M:
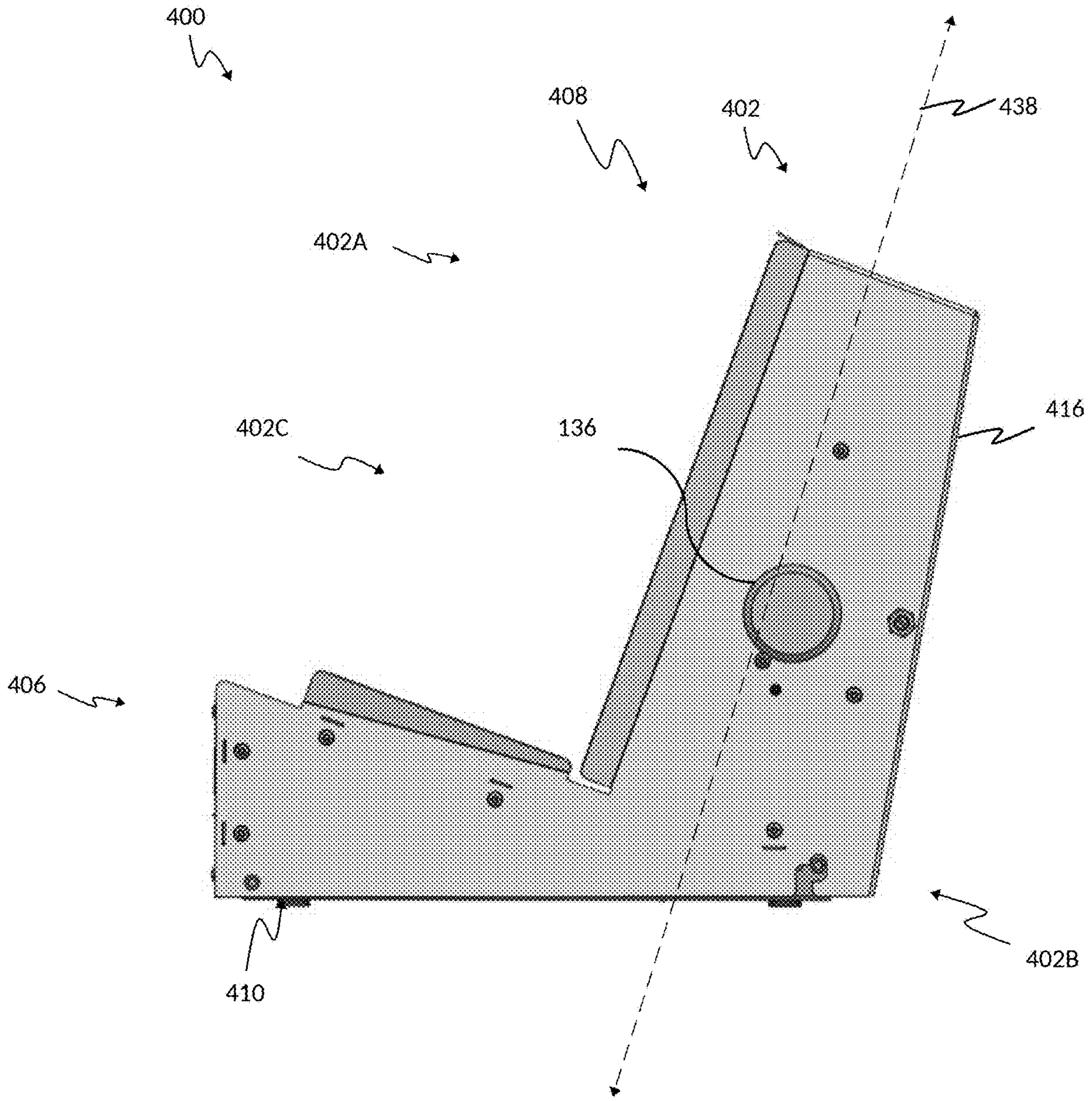
FIG. 5M is a perspective view of a multi-bag connector assembly having an actuator with an electric motor according to an embodiment of the present invention.

In another embodiment of the present invention, the actuator 120 includes an electric motor 136 (see FIGS. 5L-5M). In the illustrated embodiment, electric motor 136 replaces the handle assembly 444 and the electronic solenoids 120A, 120B. The controller 116 controls the electric motor 136 of the actuator 120 to move the actuator 120 from the open position to and from the engaged position.

In another aspect of the present invention, the system 2 includes a second reader 124 associated with the connector assembly 110. The second reader 124 is configured to establish identification information related to an operator of the connector assembly 110. In one aspect of the present invention, only authorized persons may operate a connector assembly 110. Operation of the connector assembly 110 may include installing, removing, and/or replacing a beverage dispensing package 104 and/or may also include moving the actuator 122. The second reader 124 may include, but is not limited to, a bar code reader, an RFID reader, a camera (for facial recognition), a magnetic card reader and the like. In one aspect of the present invention the actuator 122 may be generally locked by the locking mechanism 120. After an authorized operator's identify is established or confirmed, the controller 116 controls the locking mechanism 120 to unlock the actuator 122, thus allowing the operator to manually move the actuator 122.

As discussed in more detail below, in one aspect of the present invention, each connector assembly 110 includes a scale or electronic scale 420 for establishing a fill level associated with the beverage dispensing package 104. In one embodiment, the electronic scale 420 measures or establishes a weight associated with the beverage dispensing package 104 inserted into the respective connector assembly 110. With reference to FIG. 1C, the connector assembly 110 may also include a temperature sensor 126 for detecting an ambient temperature relative thereto. With reference to FIGS. 1C-1D, in another aspect of the present invention, each connector assembly 110 includes a user interface 128. The user interface 128 may include a set of indicators, for example, LED indicators and buttons (mechanical or touch-screen) 128A and a display 128B. The controller 116 may be configured to allow the operator to interact with the system 2 and display relevant information on the display 128A, for example, status of the connector assembly 110, the status the beverage dispensing package 104 installed in the connector assembly 110 (fill status), status of the supply line 4, or other information, for example, ambient temperature. This information may be communicated to the external or remote system 50 via a wireless connect module 130. The user interface 128 may also include a speaker or audio device (not shown) to provide additional audio alerts to the operator In one aspect of the present invention, the indicators and input buttons 128A on the user interface 128 may allow the operator or user to selectively provide control signals to the controller 116 to operate the connector assembly 110 to move between the open, closed and engaged states or positions.

In one aspect of the present invention, the controller 116 is configured to utilize the locking mechanism 120 to permit or prevent removal of the beverage dispensing package 104 if the fill level associated with the beverage dispensing package 104 is at a predetermined empty level.

As discussed above, in one embodiment the actuator 122 is a manual actuator and includes the handle assembly 444. An operator may operate the handle assembly 444 to move the actuator 222 to and from the open and engage positions (see below). In another embodiment the actuator 122 includes the electric motor 136 under control of the controller 116. The controller 116 controls the electric motor 136 and only allows movement of the actuator 122 under controlled specific conditions (see above and below).

With specific reference to FIG. 1A, in one aspect of the present invention, the system 2 includes a pump 138 connected to the supply line 4 and coupled to the controller 116. The controller 116 is configured to controllably operate the pump 138 to supply the liquid in the beverage dispensing package 104 through the supply line 4. In one embodiment, the pump 138 is used to pressurize the fluid or liquid within the supply line 4. At the other end of the supply line 4 a dispensing mechanism including a manually operated valve allows an operator to open the valve and dispense fluid, typically, in a glass or picture or other container. In another embodiment, the pump 138 may be operated or controlled by the controller 116 or another controller to dispense a predetermined volume of fluid or liquid.

With specific reference to FIG. 1B, in another embodiment, the system 2 may include a second connector assembly 110. The first and second connector assemblies 110 may be connected in parallel via a valve mechanism 140. Each of the first and second connector assemblies 110 has a respective recess 402C for receiving first and second beverage dispensing packages 104, respectively. The second connector assembly is further configured to controllably connect the second beverage dispensing package 104 to the second outlet 110A. In the illustrated embodiment, the valve mechanism 140 is controlled by the controller 116 to selectively connect one of the first and second connector assemblies 110 to the supply line 4. In one embodiment, the valve mechanism 140 is a three-way valve. In another embodiment the valve mechanism 140 includes first and second valves 142. The first valve 142 is positioned between the first connector assembly 110 and the supply line 4 and the second valve 142 is positioned between the second connector assembly 110 and the supply line 4. The first and second valves 142 are connected to the controller 2 for selectively coupling one of the beverage dispensing packages 104 to the supply line 4.

With specific reference to FIG. 1C, in one embodiment the connector assembly 110 includes the controller 116 includes the first and second readers 118, 124, the locking mechanism 120, the actuator 122, the temperature sensor 126, the weight/fill sensor 420, the user interface 128. In addition, the connector assembly 110 may include a number of other interfaces which may be include an electric circuit and be embodied, in part, by software executed by the controller 116. In the illustrated embodiment, a pump control interface 132, a valve control interface 134 and a wireless module 130 may be provided.

Multi-Bag Connector (MBC) Assembly

With reference to the drawings and in operation, the present invention relates to a connector (or multi-bag connector) assembly 110 for use with a beverage system 100. As discussed in further detail below, the multi-bag connector assembly 110 is configured to controllably connect a beverage dispensing package or box 104 with the beverage system 100.

Figure 2A:
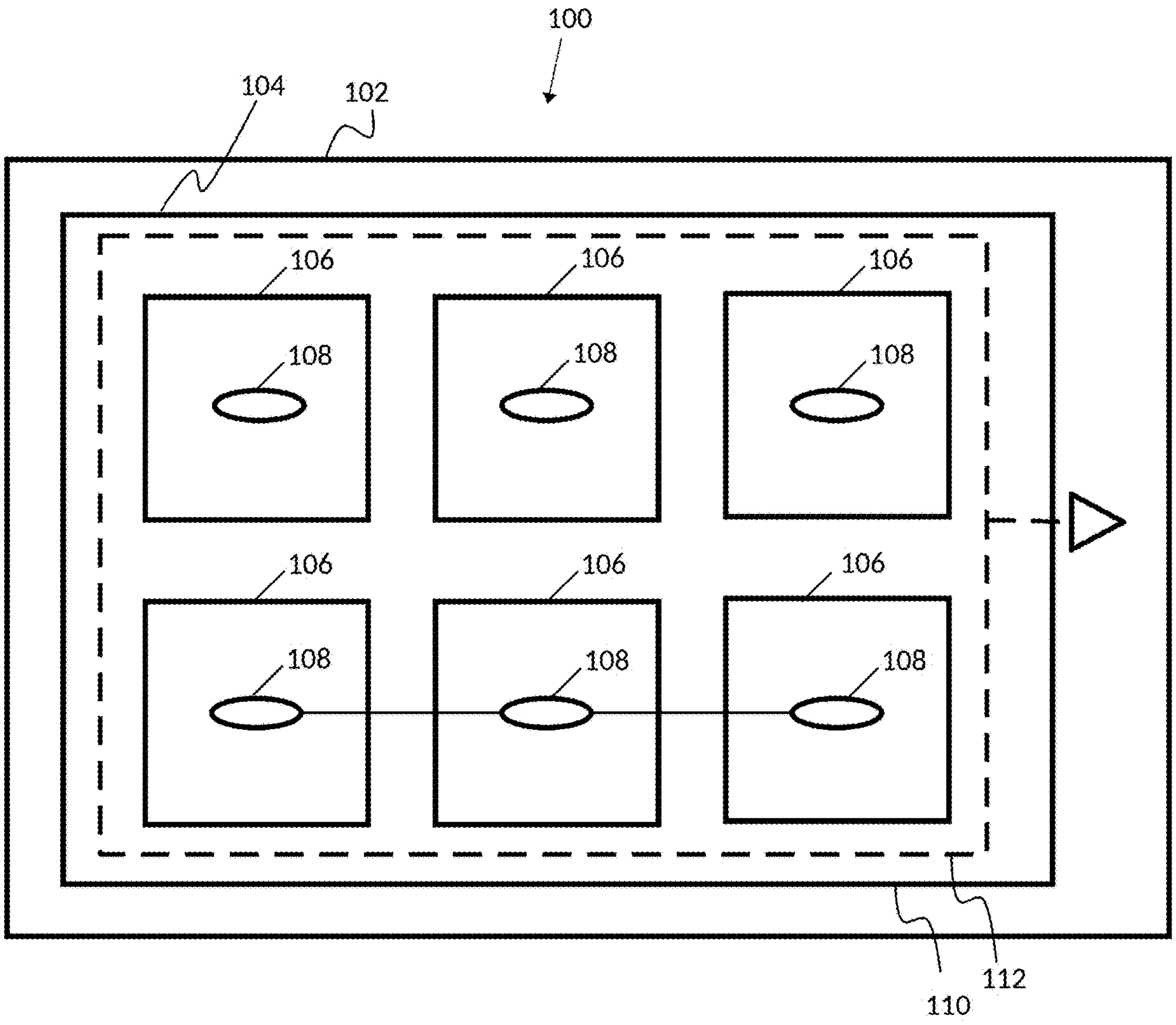
FIG. 2A is a block diagram of a beverage dispensing system that may be used with the system of FIG. 1A to dispense alcoholic beverages.

With specific reference to FIG. 2A, the present disclosure particularly describes exemplary beverage dispensing systems 100 and packages (e.g., boxes) 104 that may be used to dispense liquids or beverages. As used herein, the term beverage" refers to any beverage or liquid with or without alcoholic content that is meant for human consumption. FIG. 2A is a block diagram of an exemplary beverage dispensing system 100 that may be used to dispense liquids, such as alcoholic beverages. In one embodiment, the beverage dispensing system 100 is a bartender station (or is included therein) at a bar. Alternatively, the beverage dispensing system 100 may be used with, or incorporated within, any suitable location such as a kitchen, a bar, a reception area, or may be a portable station that may be used to serve alcoholic beverages in any suitable location.

Each box 104 may include one or more dividers (see below) that form two or more compartments within each box 104. Each compartment is designed to hold an inner container (e.g., a bag) 106 which holds an alcoholic beverage. Each bag 106 includes a fitment 108 that is attached to the bag 106 for dispensing the alcoholic beverage. Each fitment 108 is separated from each other fitment 108 so that the contents of each bag 106 do not mix or flow together until a connector assembly (see below) is attached. An alignment plate, or other suitable structure, may be used to align the fitments of the bags in preparation for attaching to the connector assembly 110.

In some embodiments, a separate alignment plate is utilized. In other embodiments, a separate alignment plate is not utilized. The box 104 may be composed primarily of cardboard with an integral structure that performs the function of the alignment plate. For instance, in one embodiment, the box 104 may include an inner box and an outer box. The inner box has a top surface with apertures for receiving a respective fitment for maintaining the correct spatial relationship there between.

As shown diagrammatically in FIG. 2A, a connector assembly (or multi-bag connector or MBC) 110 is configured to receive the box 104. The connector assembly 110 includes a valve assembly 112 adapted to be coupled to the fitments of each bag within the box 104. The valve assembly 112 fluidly couples the bags 106, via each respective fitment 108, in the box 104 to the common outlet 114 of the valve assembly 112.

The embodiments described herein comply with the Department of Treasury Alcohol & Tobacco Tax & Trade Bureau (TTB) regulations in that the alcoholic beverages contained in the bags are shipped in a "divorced" state (i.e., the outlets of the bags are not connected together) so that each bag is a self-contained bag that may hold the maximum amount of an alcoholic beverage. The embodiments also enable significant efficiencies to be realized for distributors and end users of the alcoholic beverages. For example, larger quantities of alcoholic beverages may be shipped to a destination and may be efficiently and conveniently prepared for use as compared to prior art systems where individual bottles of alcoholic beverages are shipped. In one example, according to an embodiment described herein, a box may include four bags that each holds up to a maximum allowable volume, e.g., 1.8 liters of an alcoholic beverage. Accordingly, a single box may include 7.2 liters of an alcoholic beverage that is able to be quickly attached to a connector assembly for dispensing at an end user location. Other boxes may be used with other suitable numbers of bags to enable distributors to have a wide variety of options in the amount of alcoholic beverages to include within a box. For example, boxes with 6 or 8 bags (or any suitable number) may be used to provide 10.8 liters or 14.4 liters of alcoholic beverages (or any suitable amount) as desired. For example, in one embodiment, the bags may be arranged in two rows, each with a predetermined number of bags, e.g., 2. In other embodiments, each container contains a predetermined number of bags, e.g., 4 in a single row.

In one embodiment, the beverage dispensing system 100 includes a cabinet or housing 102 and a plurality of beverage dispensing packages 104 positioned within housing 102. Beverage dispensing system 100 may be placed in a bar, a kitchen, or in any other suitable location to enable a user to dispense alcoholic beverages from the system 100. For example, a bartender may use beverage dispensing system 100 to dispense alcoholic beverages from each of the beverage dispensing packages 104 during operation.

In one embodiment, each beverage dispensing package 104 is a box or other suitable container that includes a plurality of beverage dispensing bags, for example. Each bag is designed to hold 1.8 liters of alcoholic beverage as specified by the applicable regulations. For clarity of description, beverage dispensing packages 104 may be referred to herein as boxes 104, although it should be recognized that beverage dispensing packages 104 may be any suitable container other than a box. Similarly, for clarity of description, boxes 104 are described as including a plurality of beverage dispensing bags (or "bags") 106. However, it should be recognized that any suitable internal containers may be used instead of bags.

Figure 2B:
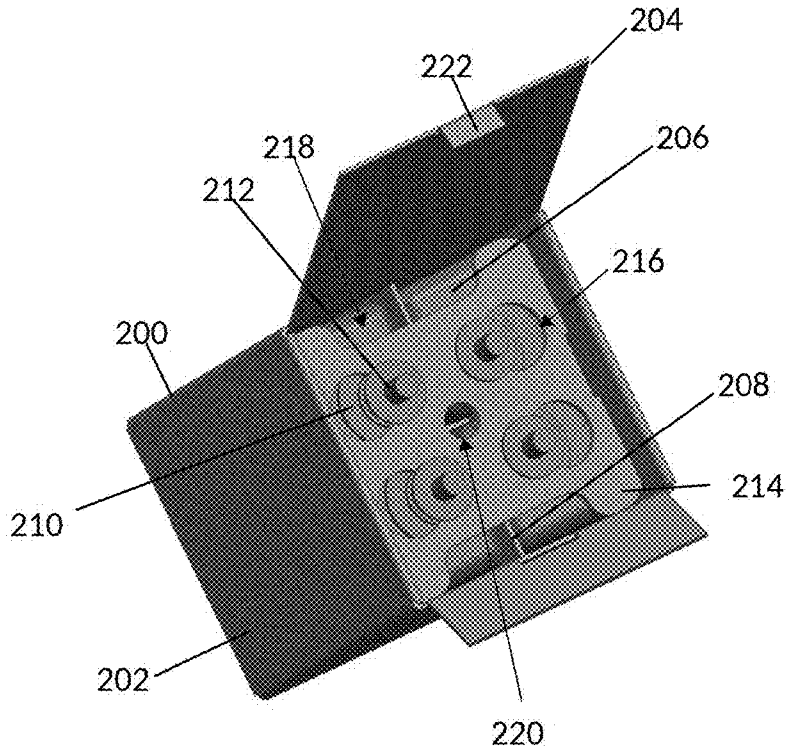
FIG. 2B is a perspective view of an exemplary beverage dispensing package that may be used with the beverage dispensing system of FIG. 2A, according to an embodiment of the present invention.

FIG. 2B is a perspective view of an exemplary beverage dispensing package 200, such as a box 200, that may be used with beverage dispensing system 100 (shown in FIG. 2A). While the package 200 is described herein as a box, it should be recognized that any suitable package or container may be used.

In an exemplary embodiment, the box 200 is a cardboard box that includes sides 202 and a top cover 204. The top cover 204 is removable to expose or to cover a plurality of compartments (not shown in FIG. 2B) that include a plurality of inner containers, such as beverage dispensing bags 206. The compartments are formed by one or more dividers 208 positioned within box 200.

In an exemplary embodiment, two dividers 208 are positioned within box 200 to form four substantially equally sized and shaped compartments. More specifically, in the exemplary embodiment, each compartment has a square-shaped cross-section that houses a respective bag 206 that also has a substantially square-shaped cross-section. Alternatively, any suitable number and shape of compartments and bags 206 may be used with box 200. In addition to creating compartments within box 200, dividers 208 provide stability and support to box 200.

Each bag 206 includes an outlet (not shown in FIG. 2B) that enables liquid (e.g., an alcoholic beverage) to be dispensed from bag 206. A container fitment 210 or another suitable connector is securely fit onto an outlet 224 of each bag 206 to enable the outlet 224 of each bag 206 to be releasably coupled to a connector assembly 110. Accordingly, in the exemplary embodiment, each outlet 224 is initially separated from each other outlet 224 until the connector assembly 110 is attached to the fitments 210. In this manner, the outlets 224 of each bag 206 may be transported in a "divorced" manner (i.e., not in fluid communication with each other) to satisfy applicable governmental regulations and may then be connected together by a connector assembly 110 at the final destination to provide one common fluid dispensing line that dispenses the contents of each bag 206 through the common dispensing line.

In one embodiment, each fitment 210 may include a removable cap 212 that prevents the contents of each bag 206 from spilling or leaking out during transport. Caps 212 also may be included for health reasons, for example, to prevent contamination of fitments 210. In a more specific embodiment, each cap 212 may be glued or otherwise attached to top cover 204 of box 200 during shipping so that when a user opens top cover 204, each cap 212 will be automatically removed to expose the fitments of each bag 206. Alternatively, the caps 212 may be connected together by a string or another suitable connection to enable a user to quickly remove all caps 212 at the same time or in quick succession. In one embodiment, caps 212 may be used to visibly determine whether bags 206 or fitments 210 have been tampered with or opened. For example, caps 212 may have a detachable ring or another suitable portion that may detach from caps 212 when caps 212 are first removed. Accordingly, a user may determine that caps 212 have been removed or fitments 210 have otherwise been tampered with by determining whether the ring (or other portion) of caps 212 is no longer attached. Alternatively, a seal (not shown) that is removable, penetrable, or may be broken, to facilitate or allow alcohol to flow, may be used. Other suitable indicators may be used to determine whether caps 212 have been removed or tampered with in other embodiments.

Figure 2C:
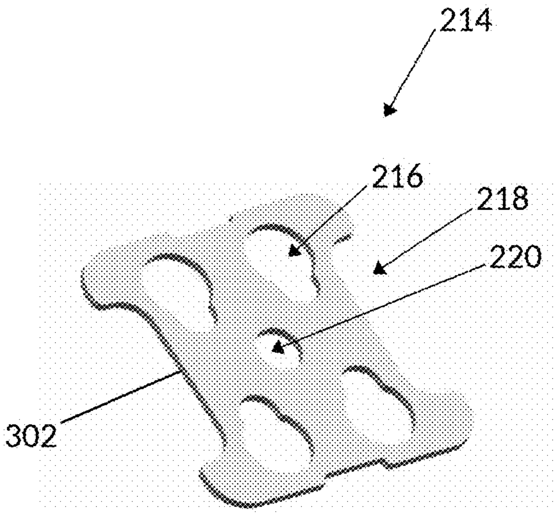
FIG. 2C is a perspective view of an exemplary alignment plate that may be used with the beverage dispensing package shown in FIG. 2B.

In one embodiment, an alignment plate 214 (see FIGS. 2B and 2C) is coupled to a top portion of box 200 and is secured to box 200 by two or more latches (not shown) on opposing sides of alignment plate 214. Alignment plate 214 includes a plurality of fitment openings 216 to enable the outlets of each bag 206 to extend through alignment plate 214. Alignment plate 214 also includes two or more grip openings 218 to enable a user to grasp a portion of alignment plate 214 when attaching a connector assembly to alignment plate 214 and bags 206. Alignment plate 214 also includes a locking member opening 220 for receiving a locking member to removably attach alignment plate 214 to the connector assembly.

In one embodiment, the alignment plate 214 is transparent to enable a user to view bags 206 underneath alignment plate 214. In a further embodiment, the bags 206 are transparent to enable a user to view the contents of bag 206 and/or a fill level of bags 206.

In one embodiment, the top cover 204 is foldable or otherwise movable to either cover, or expose the top portion of box 200. For example, top cover 204 may be folded down into a closed position for shipping or transport. Additionally, or alternatively, the top cover 204 may be removable by a user to expose the top portion of box 200. For example, the top cover 204 may be removably attached to the box 200 by a perforated or prescored hinge that a user may tear off to remove top cover 204. In the closed position, the top cover 204 hides the alignment plate 214 and fitments 210 from view and protects the alignment plate 214 and the fitments 210 during transport. The top cover 204 may be latched in the secured position by a tab or latch 222. The top cover 204 may also be removed or folded up into an open position when a user wants to access fitments 210 or alignment plate 214, for example, in preparation for dispensing the contents of bags 206.

With specific reference to FIG. 2B, in an exemplary embodiment, the alignment plate 214 includes a plurality of fitment openings 216 and a locking member opening 220. In one embodiment, the fitment openings 216 are key-hole shaped to enable fitments 210 of each bag 206 to be easily inserted (through the larger portion of each opening 216) and to enable fitments 210 to be secured in a final attachment position (the smaller portion of each opening 216) to facilitate coupling fitments 210 to the connector assembly. Alternatively, fitment openings 216 may have any suitable shape.

The locking member opening 220 may be shaped to receive a portion of a locking member of the connector assembly 110. In one embodiment, the locking member opening 220 is circular. Alternatively, the locking member opening 220 may be any suitable shape.

In the illustrated embodiment, the alignment plate 214 also includes two grip openings 218 defined therein to enable a user to grasp a grip portion 226 of the alignment plate 214. While two grip openings 218 are shown in FIG. 2B, it should be recognized that any suitable number of grip openings 218 may be formed in alignment plate 214.

Figure 2D:
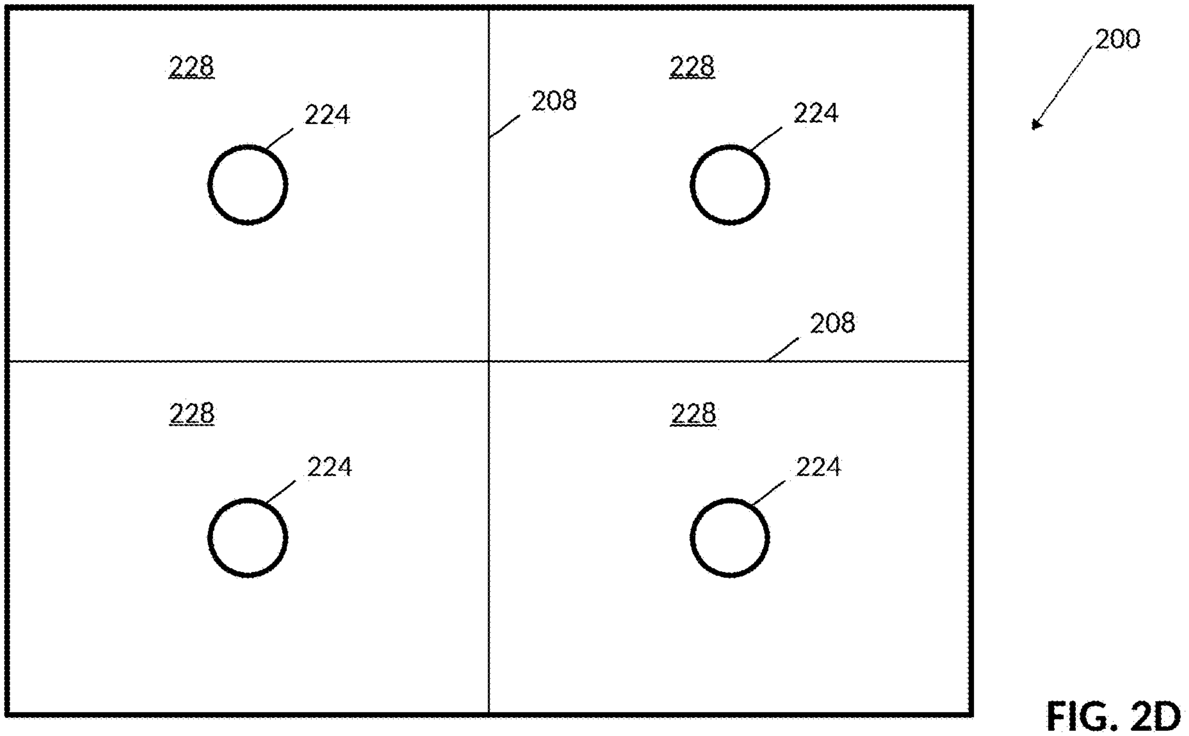
FIG. 2D is a block diagram showing a top view of the beverage dispensing package of FIG. 2B with an alignment plate and fitment caps removed.

FIG. 2D is a block diagram showing a top view of the beverage dispensing package or box 200 with the alignment plate 214 and the caps 212 removed. As illustrated in FIG. 2D, the box 200 may include a plurality of dividers 208 that form a plurality of compartments 228 within the box 200. While two dividers 208 are shown as forming four compartments 228, it should be recognized that any suitable number of dividers 208 and compartments 228 may be included within each box 200.

In an exemplary embodiment, a separate bag 206 is positioned within each compartment 228. Each bag 206 includes a respective outlet 224 for dispensing the contents of bag 206 (e.g., alcoholic beverages). Each outlet 224 is separated from each other so that the outlets 224 (and therefore, the contents of each bag 206) are not in fluid communication with each other. This is sometimes referred to as being in a "divorced" state.

As illustrated in FIG. 2D, the box 200, compartments 226, and bags 206 may have a substantially square or rectangular cross-section to enable bags 206 and boxes 200 to be stacked on top of each other during transport or during operation (i.e., during the dispensing of the alcoholic beverages). Alternatively, the boxes 200, compartments 228, and bags 206 may have any suitable shape or cross-section as desired. Further examples of box 200, compartments 228, and bag 206 shapes are illustrated in FIGS. 5 and 6A-6D.

FIGS. 3A-3B illustrate an alternative embodiment of a box 300 having elongated rectangular compartments 302 that may be used with beverage dispensing system 100 (shown in FIG. 2A). While six rectangular compartments 302 are illustrated in FIGS. 3A-3B, any suitable number and shape of compartments 302 may be used with the box 300.

Figure 3:
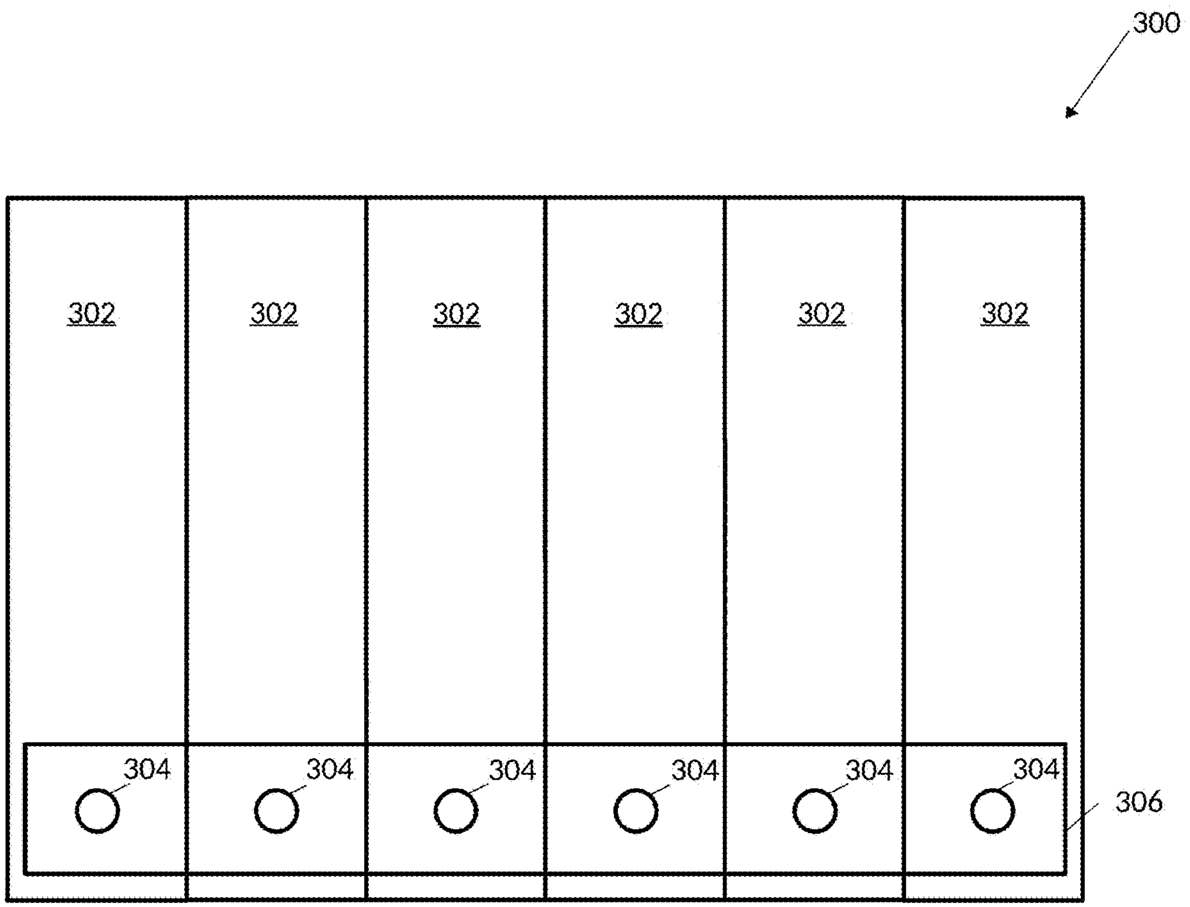
FIG. 3 illustrates an alternative embodiment of a beverage dispensing package having elongated rectangular compartments that may be used with the beverage dispensing system shown in FIG. 1.
Figure 4A:
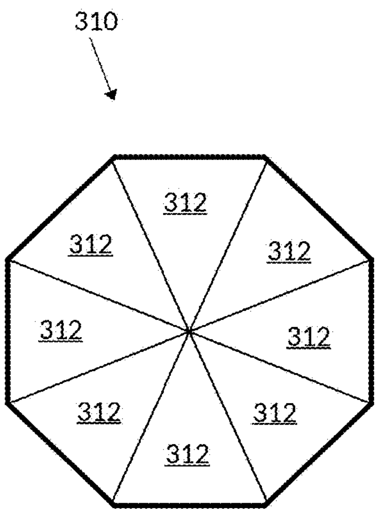
FIGS. 4A-4D illustrate alternative beverage dispensing packages and associated containers that may be used with the beverage dispensing system shown in FIG. 2A.
Figure 4B:
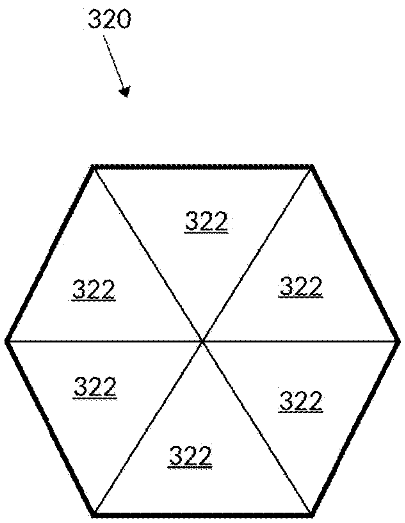
Figure 4C:
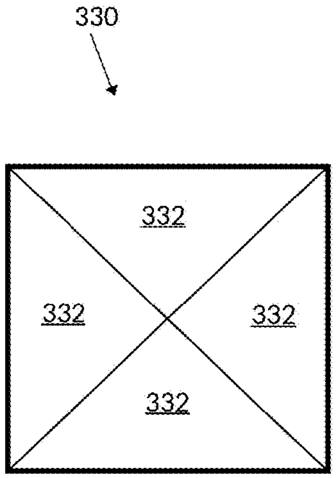
Figure 4D:
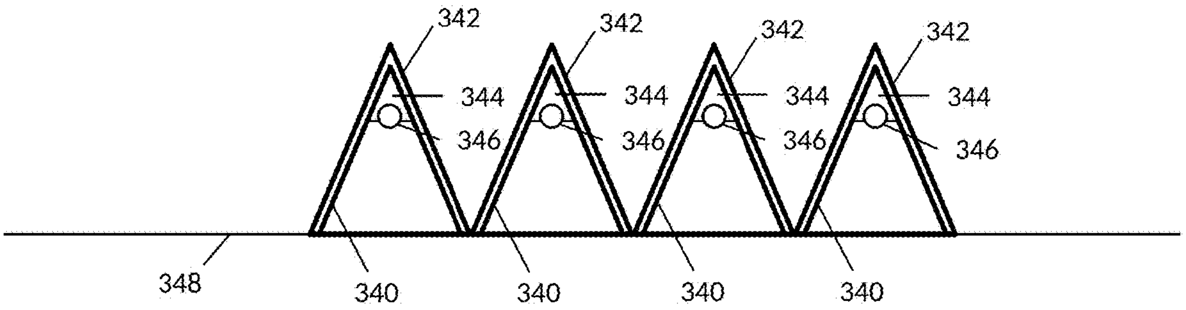

In the embodiment shown in FIG. 3, a bag (not shown) having a rectangular cross-section is placed within each compartment 302, and an outlet 304 of each bag is positioned near a bottom portion of each compartment 302. Alternatively, outlets 304 may be positioned in any suitable location with respect to the bags or compartments 302. A rectangular alignment plate 306 is coupled to the bags and outlets 304 in a similar manner as described above with reference to FIGS. 2B-2D.

Figure 6A:
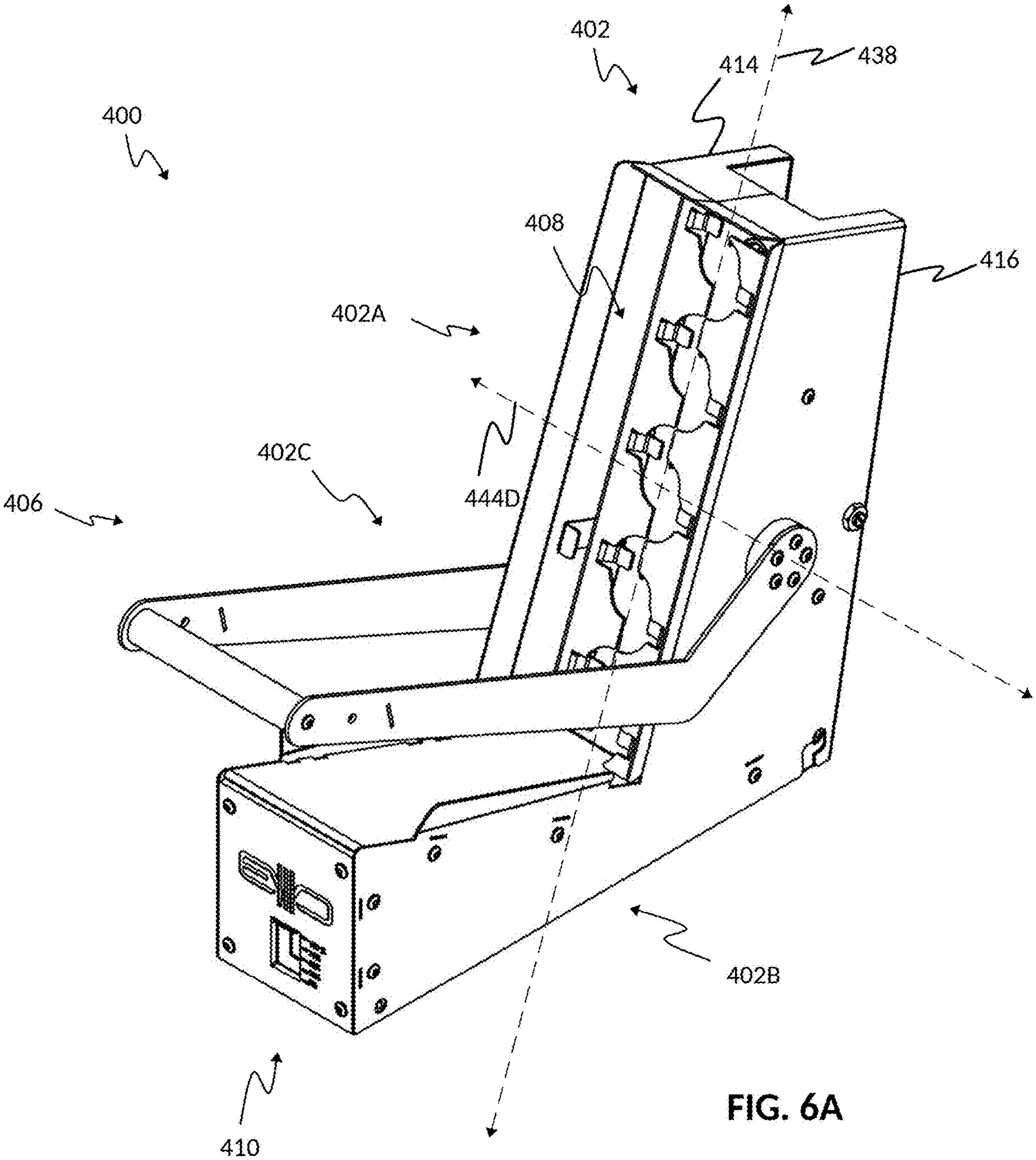
FIG. 6A is a perspective view of the multi-bag connector (MBC) assembly of FIG. 5A in a closed position, according to an embodiment of the present invention, in a closed position.
Figure 6B:
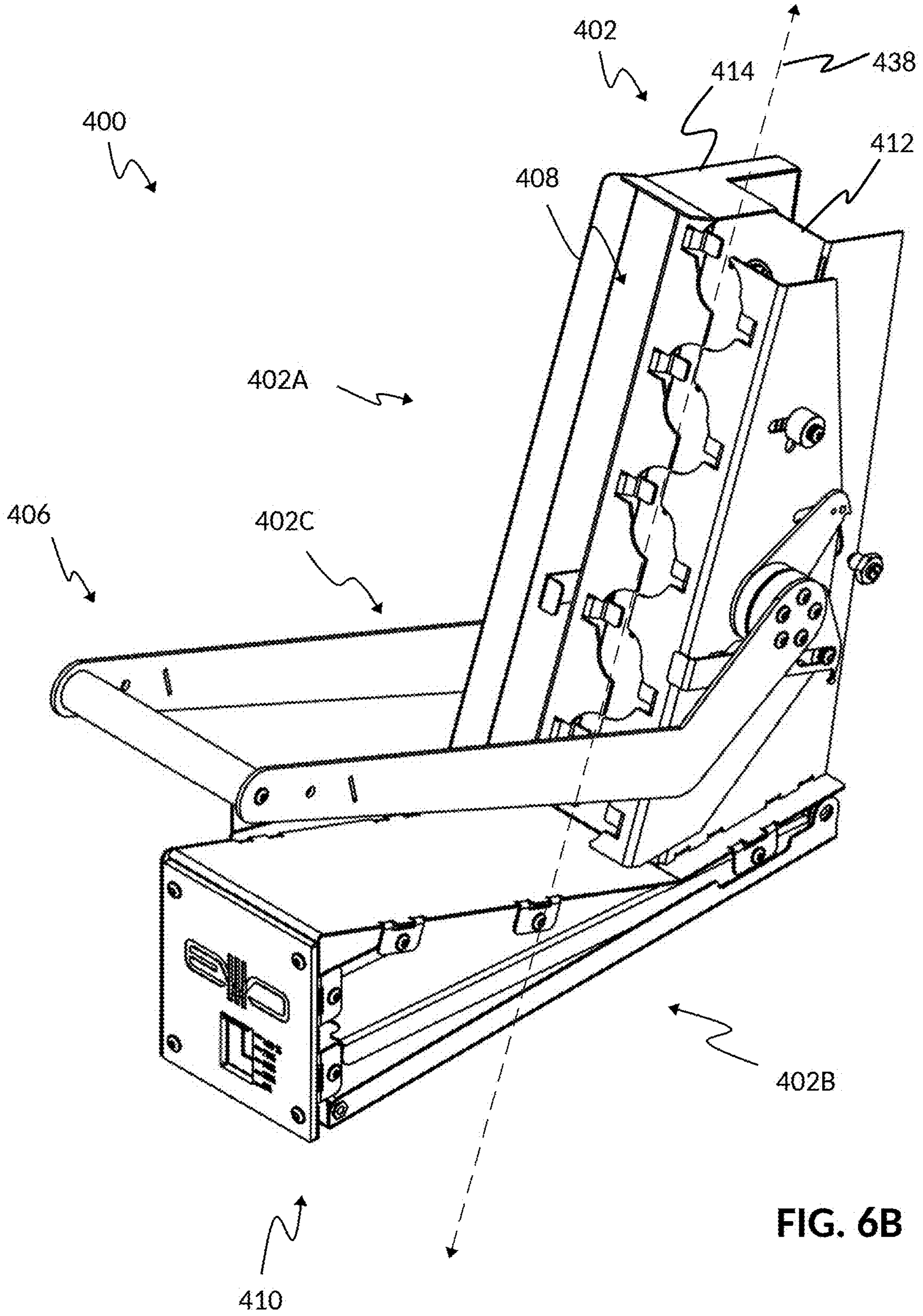
FIG. 6B is a perspective partial view of the multi-bag connector (MBC) assembly of FIG. 5A in the closed position.
Figure 6C:
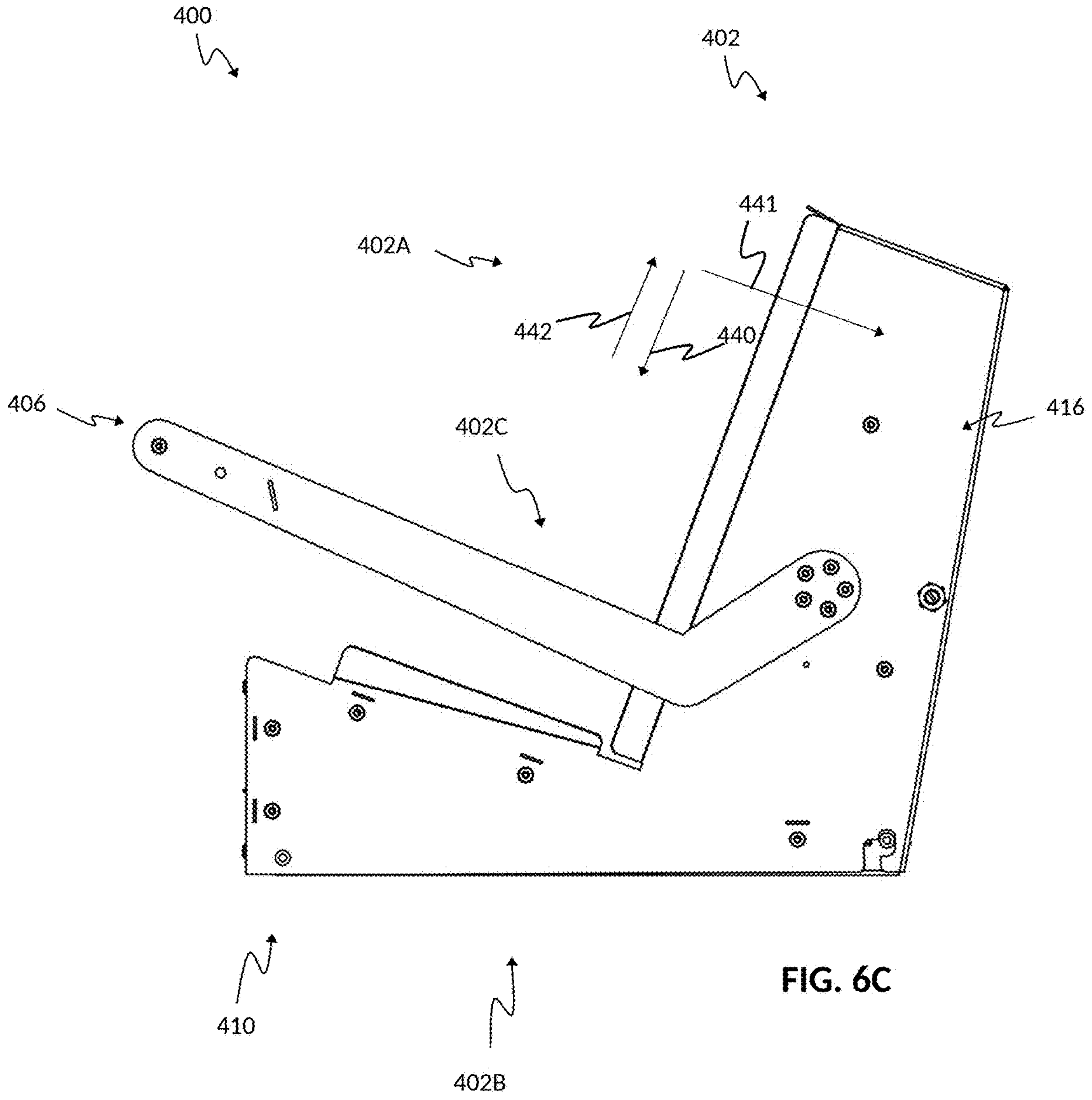
FIG. 6C is a side view of the multi-bag connector (MBC) assembly of FIG. 5A in the closed position.
Figure 6D:
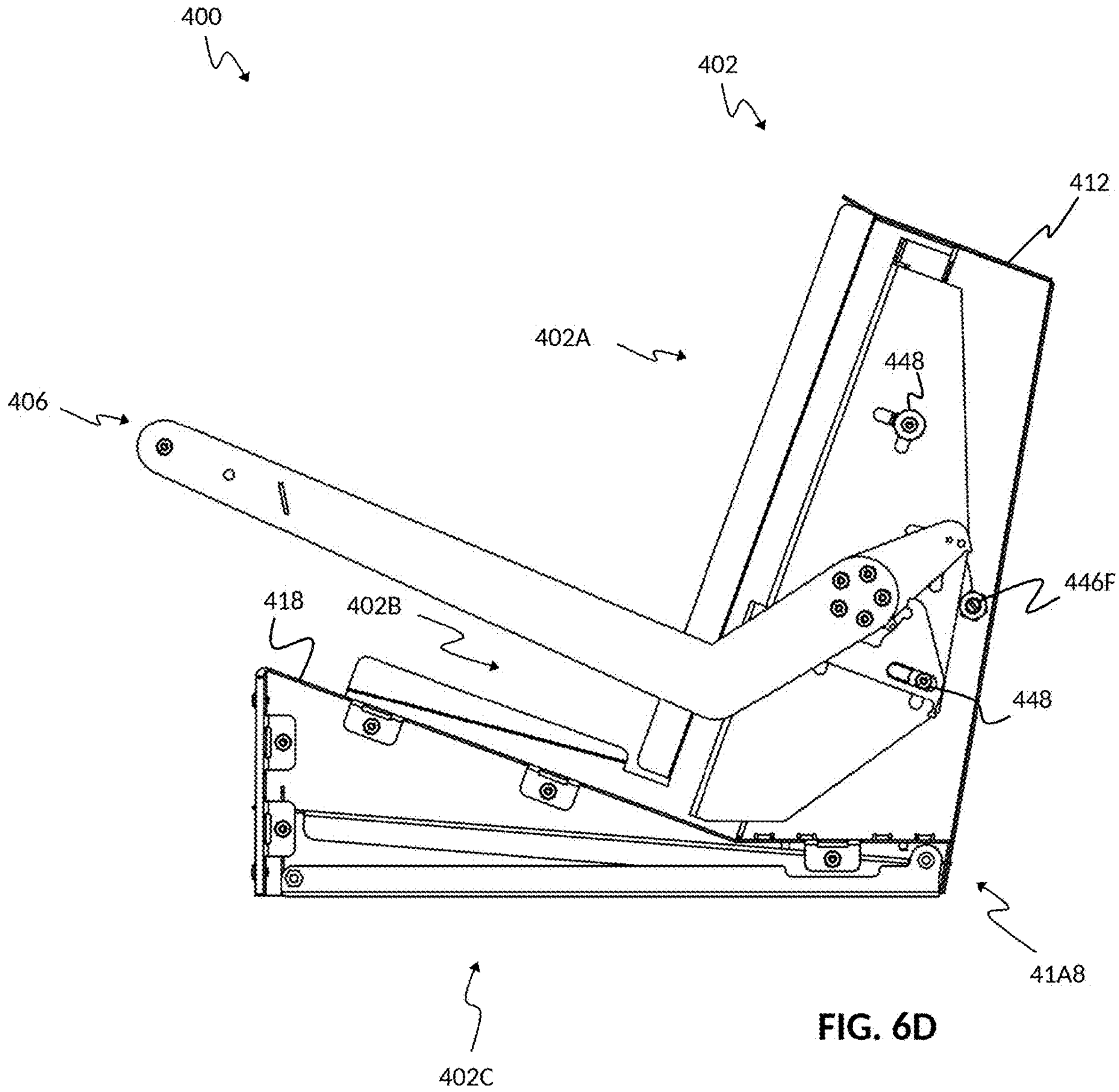
FIG. 6D is a side partial view of the multi-bag connector (MBC) assembly of FIG. 5A in the closed position.
Figure 6E:
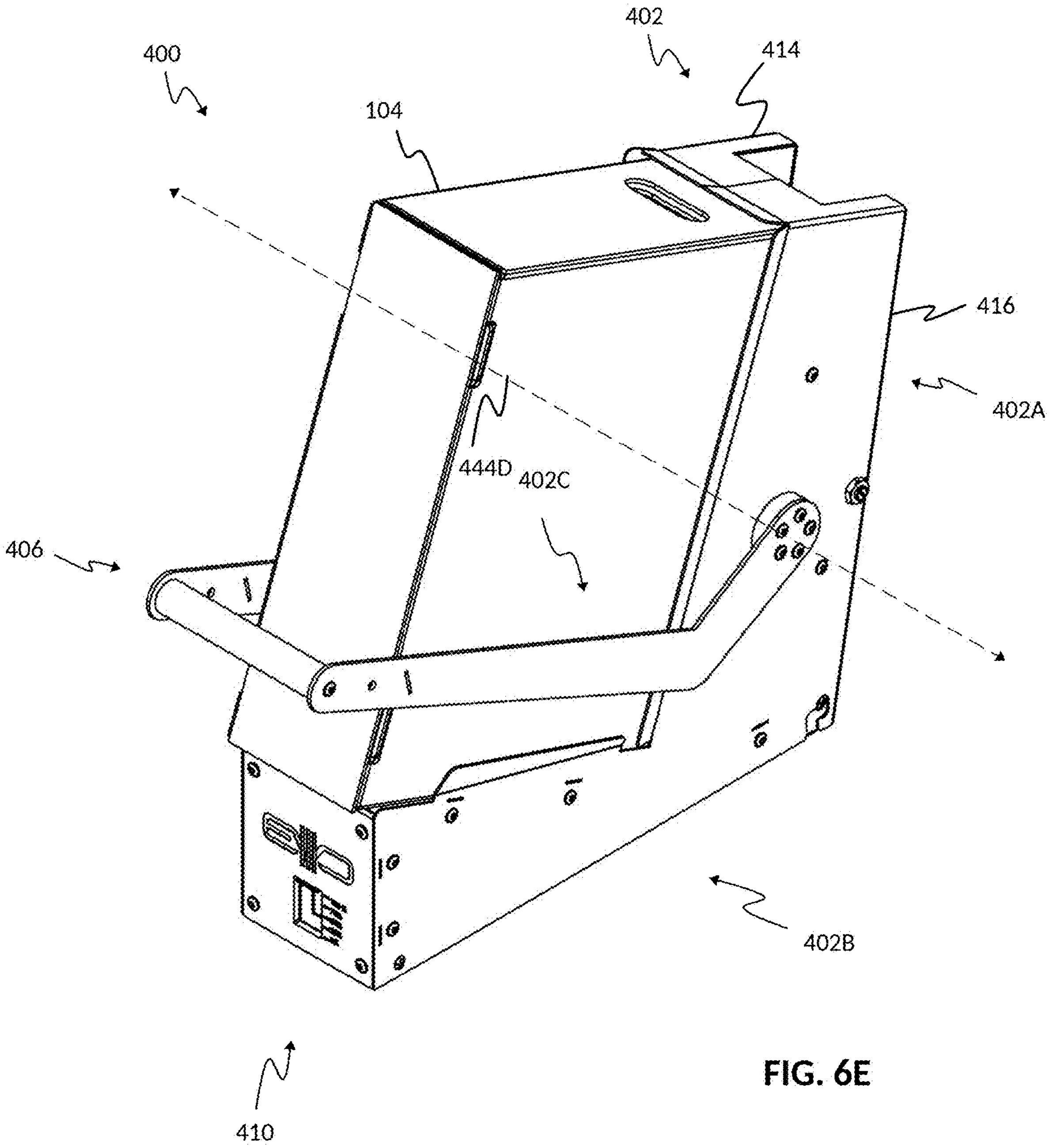
FIG. 6E is a perspective view of the multi-bag connector (MBC) assembly of FIG. 5A in the closed position with a multi-bag package, according to an embodiment of the present invention.
Figure 6F:
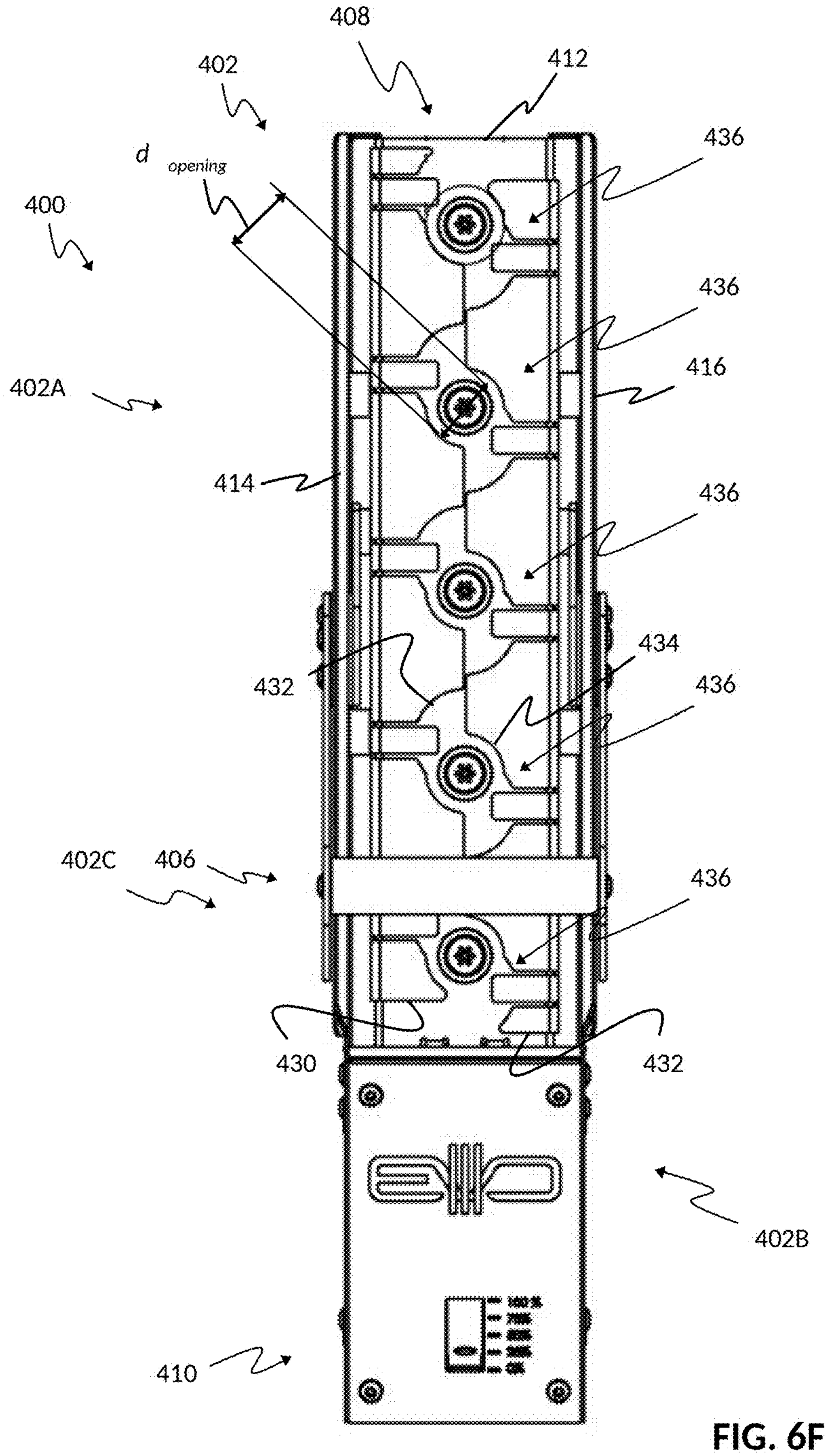
FIG. 6F is a front view of the multi-bag connector (MBC) assembly of FIG. 5A in the closed position.
Figure 6G:
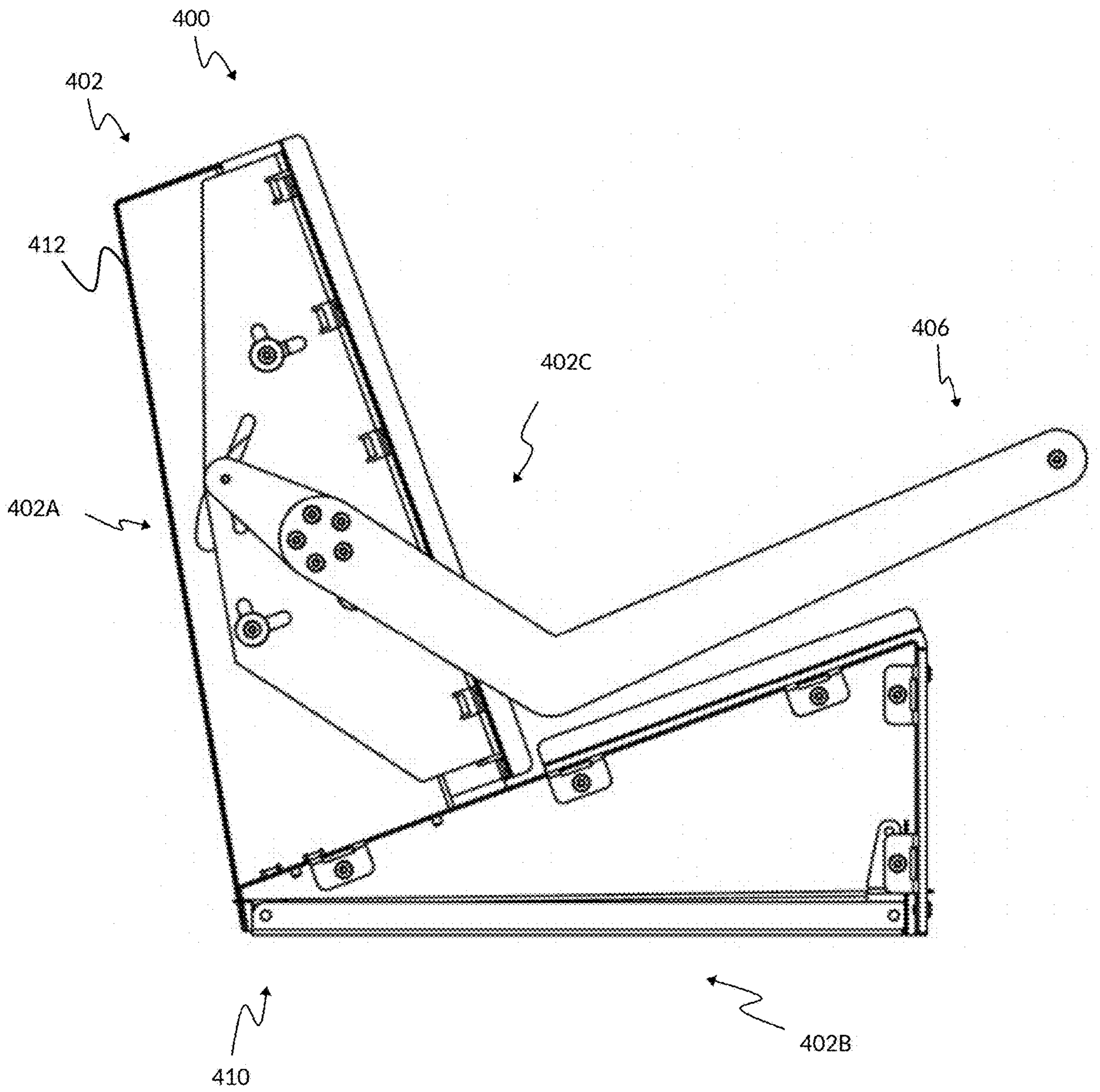
FIG. 6G is a second side partial view of the multi-bag connector (MBC) assembly of FIG. 5A in the closed position.
Figure 7A:
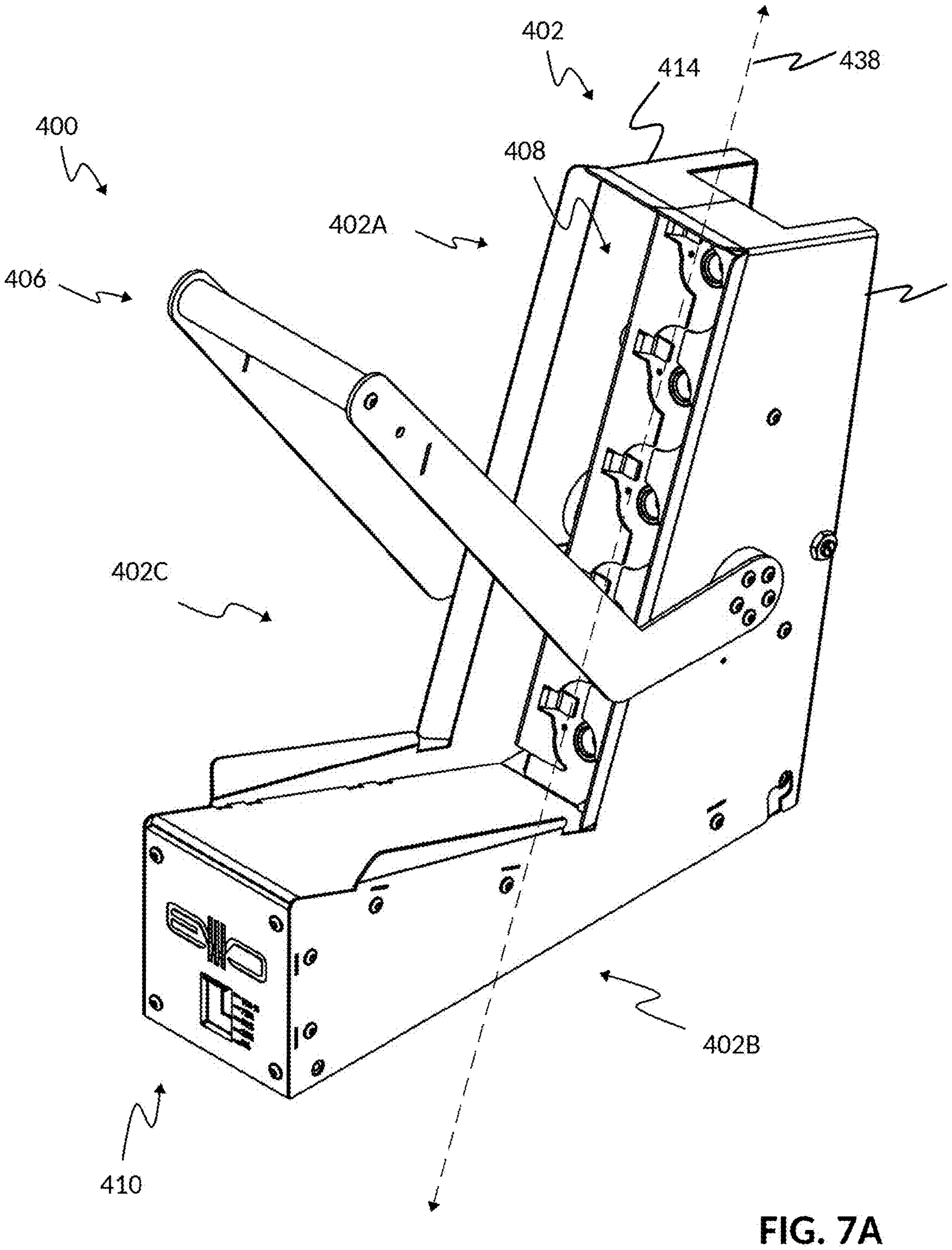
FIG. 7A is a perspective view of the multi-bag connector (MBC) assembly of FIG. 5A in an engaged position, according to an embodiment of the present invention, in a closed position.
Figure 7B:
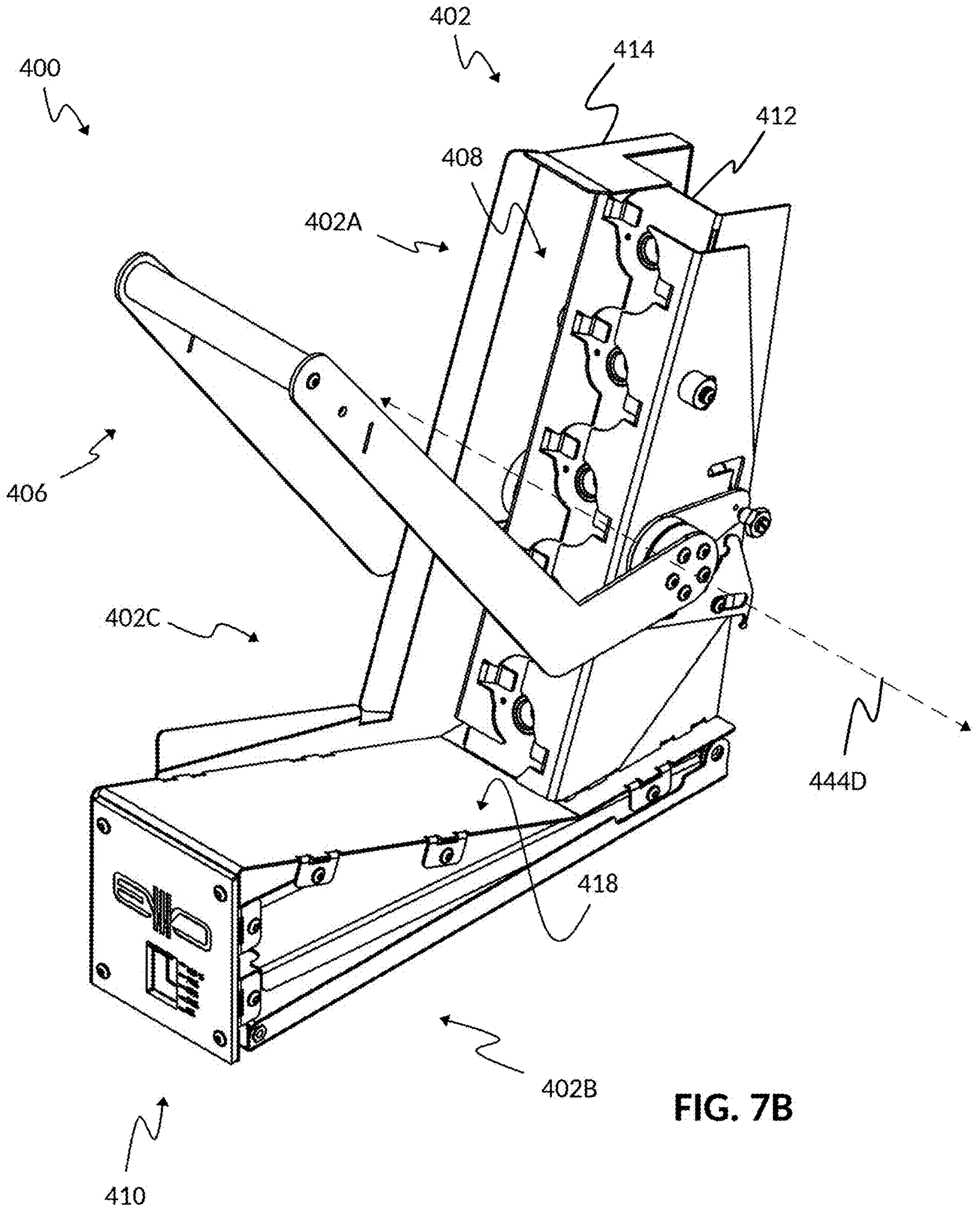
FIG. 7B is a perspective partial view of the multi-bag connector (MBC) assembly of FIG. 5A in the engaged position.
Figure 7C:
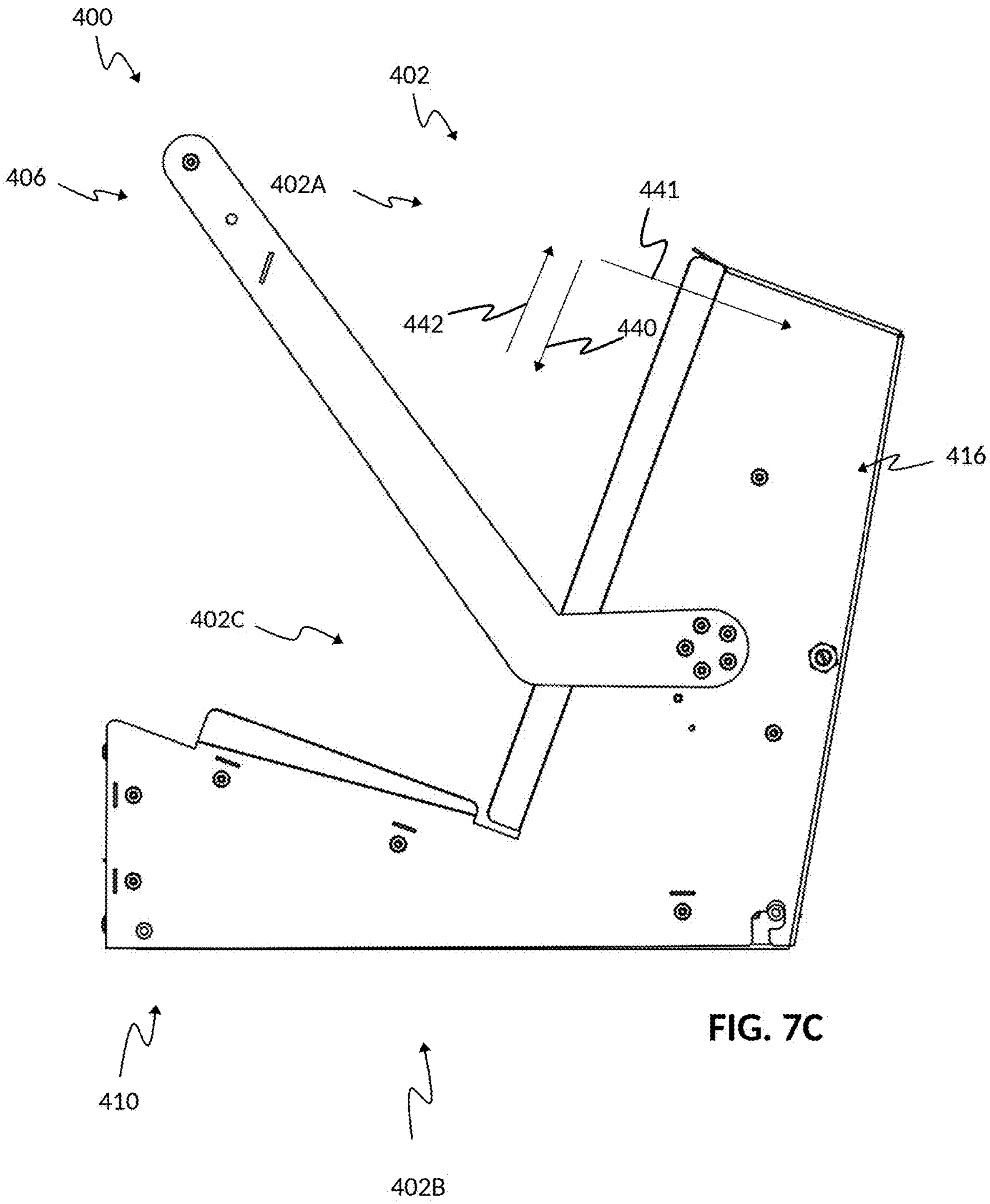
FIG. 7C is a side view of the multi-bag connector (MBC) assembly of FIG. 5A in the engaged position.
Figure 7D:
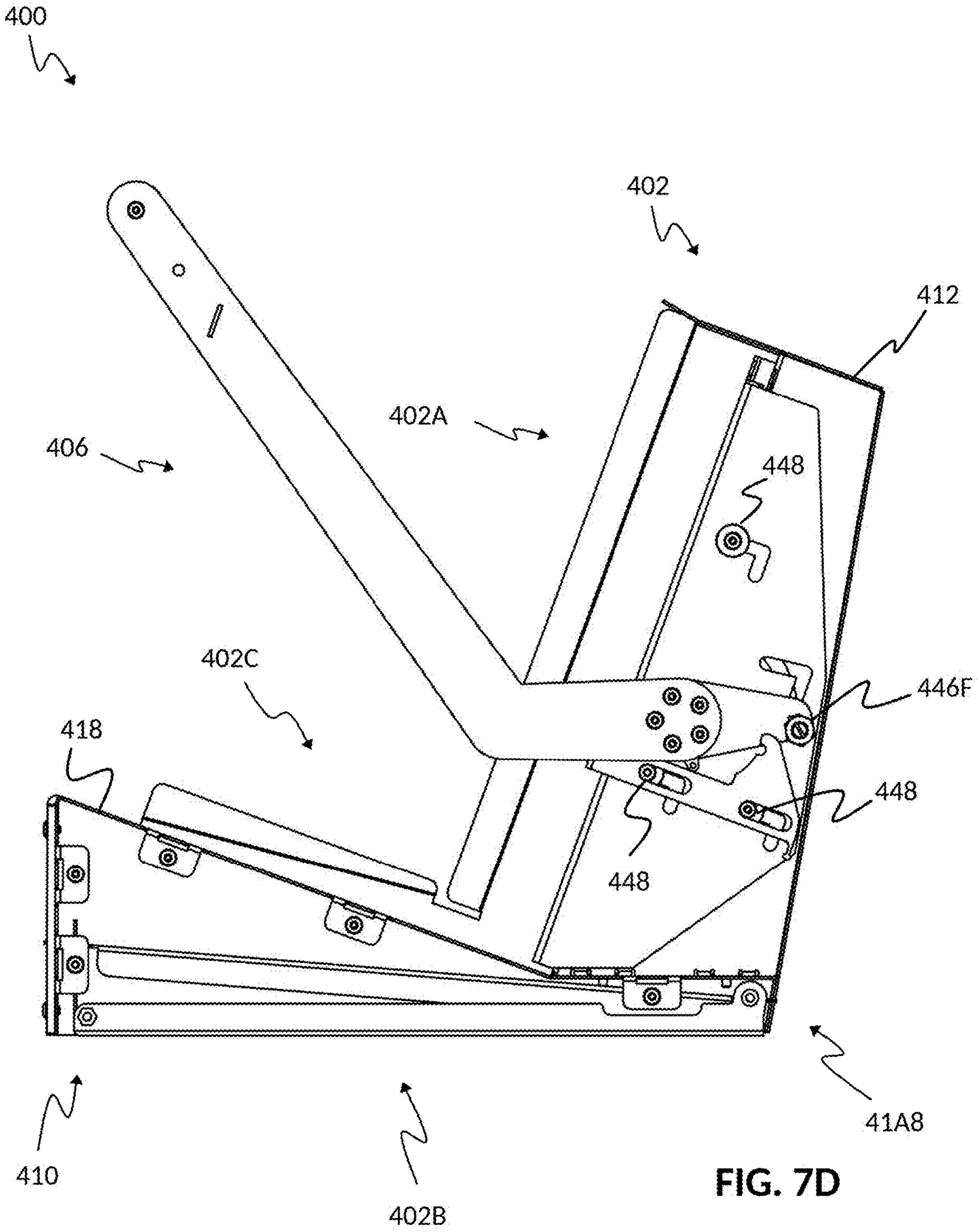
FIG. 7D is a side partial view of the multi-bag connector (MBC) assembly of FIG. 5A in the engaged position.
Figure 7E:
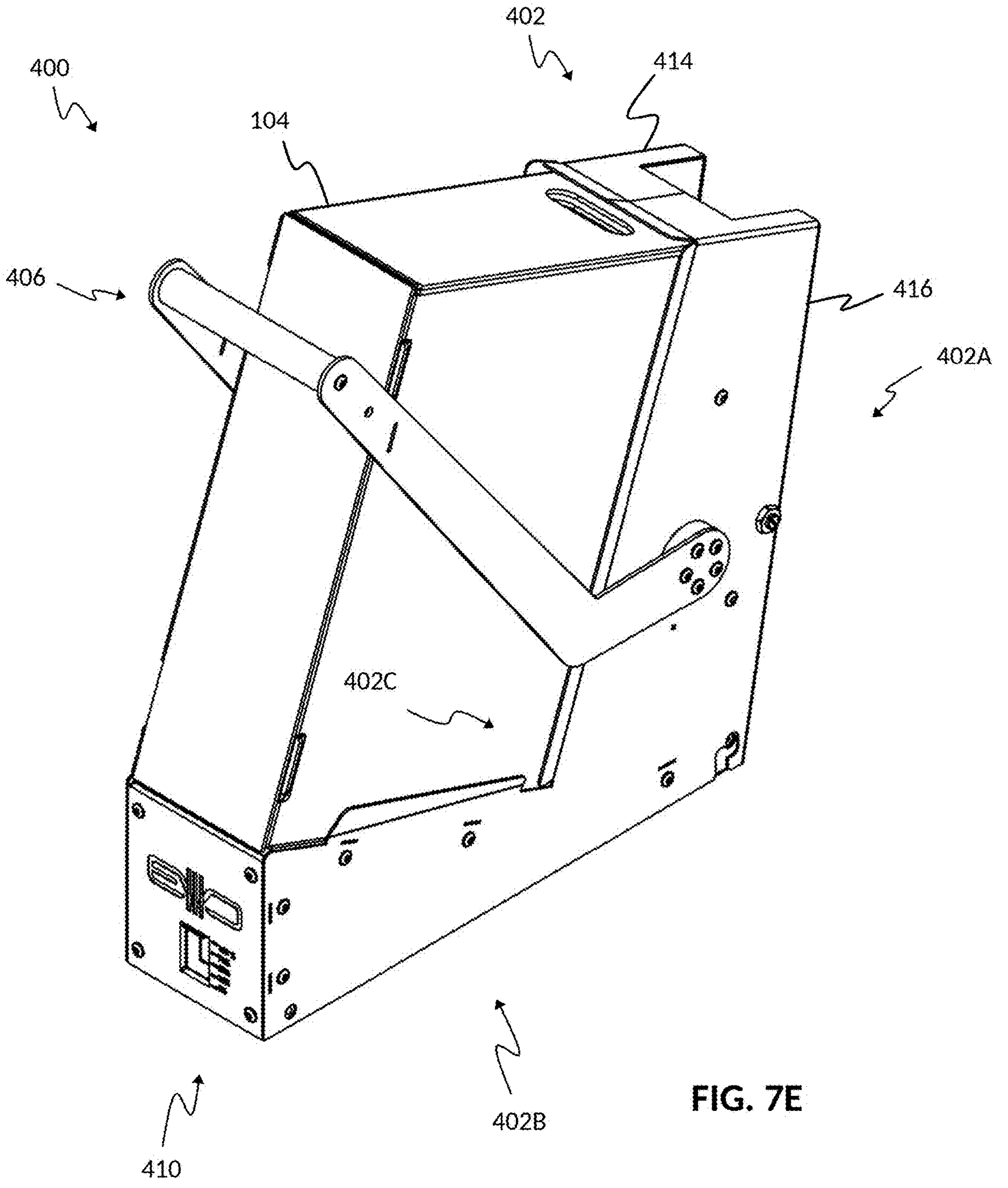
FIG. 7E is a perspective view of the multi-bag connector (MBC) assembly of FIG. 5A in the engaged position with a multi-bag package, according to an embodiment of the present invention.
Figure 7F:
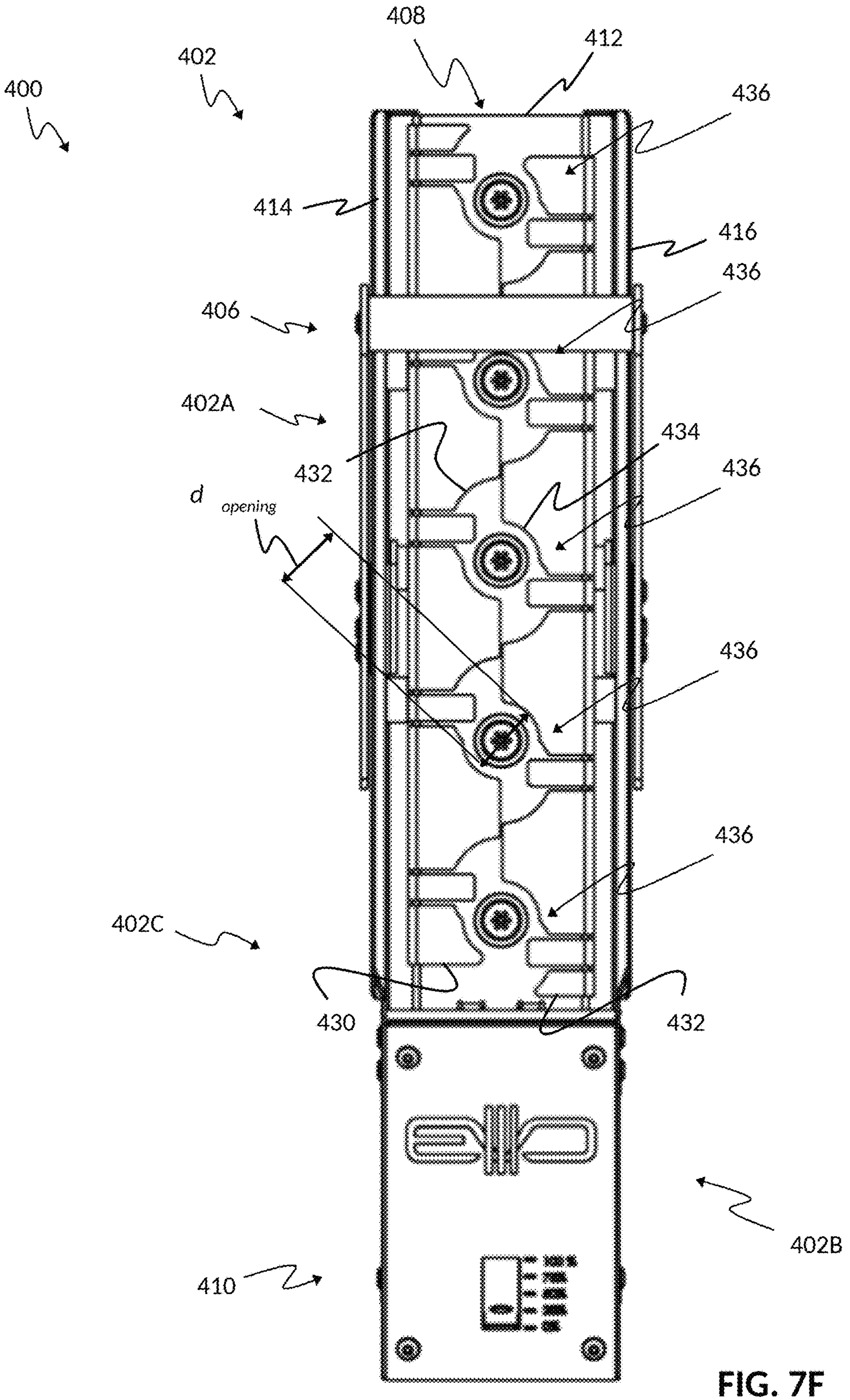
FIG. 7F is a front view of the multi-bag connector (MBC) assembly of FIG. 5A in the engaged position.
Figure 7G:
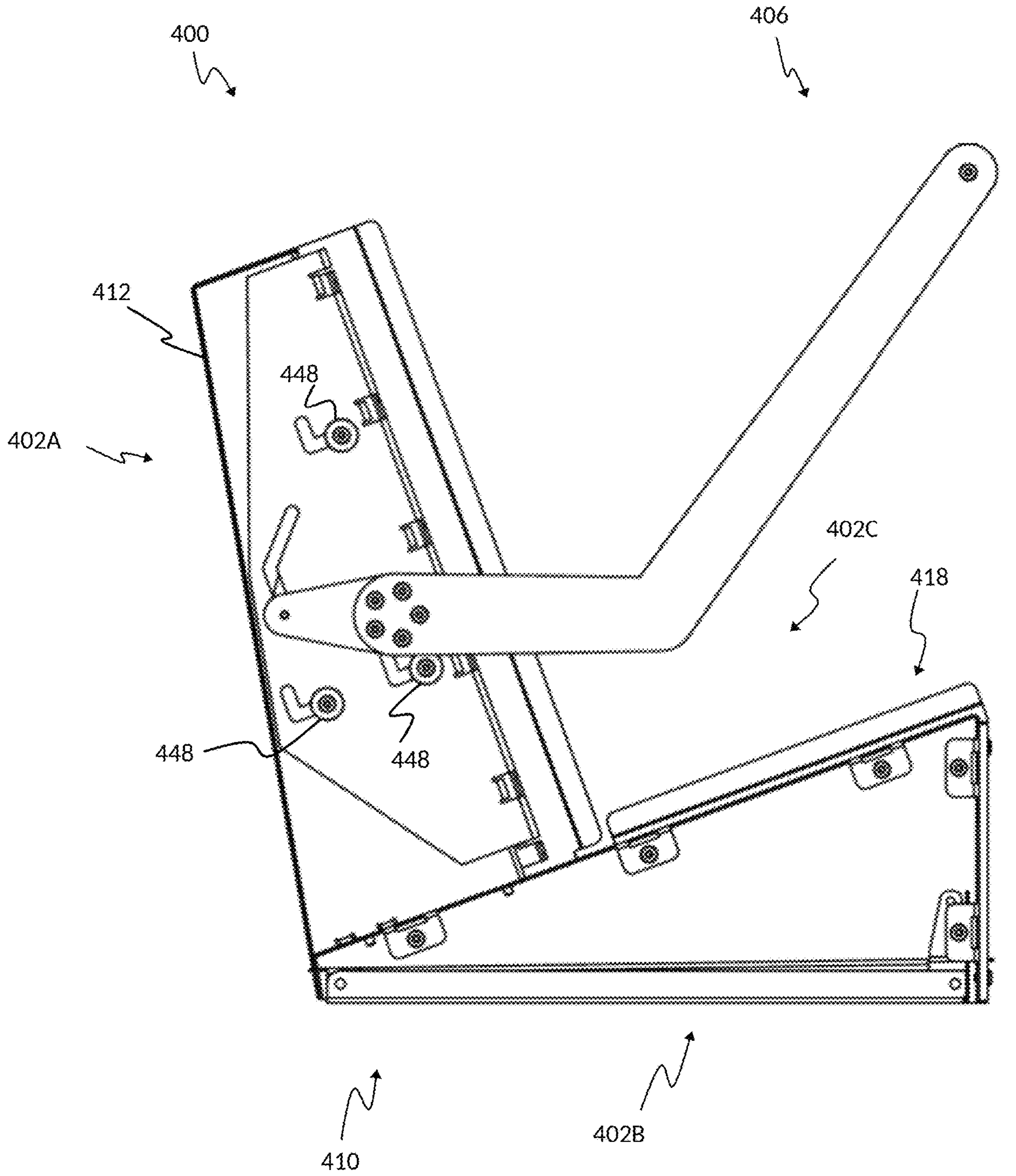
FIG. 7G is a second side partial view of the multi-bag connector (MBC) assembly of FIG. 5A in the engaged position.

FIGS. 4A-4D illustrate alternative boxes and associated bags that may be used with beverage dispensing system 100 (shown in FIG. 2A). FIG. 3A is a block diagram of a substantially octagonal box 310. FIG. 6B is a block diagram of a substantially hexagonal box 320. FIG. 6C is a block diagram of a substantially square box 330. Each of the boxes 310, 320, 330 form a plurality of compartments 312, 322, 322 with a triangular cross-section.

FIG. 3D illustrates bags 340 having a substantially triangular cross-section that may be used with the boxes 310, 322, 332 shown in FIGS. 3A-3C.

Referring to FIG. 3D, a plurality of bags 340 having a triangular cross-section may be used with the boxes shown in FIGS. 3A-3C. The bags 340 may be housed or positioned within an intermediate container 342. Each bag 340 may include an alignment portion 344 that may be used to correctly position a respective fitment 346 with the box 310, 320, 330.

Each intermediate container 342 may be coupled to a common edge 348 that may form the exterior of the box 310, 320, 330. For example, in one embodiment, each intermediate container 342 is coupled to a common piece of cardboard that may be folded to form the box 310, 320, 330. Thus, if four intermediate containers 342 and associated bags 340 are provided, containers 342 may be folded along edge 342 to form the square box 330 shown in FIG. 3C. It should be recognized that other suitable shapes may be used for intermediate containers 342 and bags 340 to form a box of any suitable shape and size. It should also be recognized that intermediate containers 342 may be connected together along different edges to form boxes of any desired shape and configuration.

In one embodiment, the bags of the boxes described in FIGS. 3A-3C may be covered by a removable portion of the respective box. For example, in one embodiment, the box may include one or more tear-away portions or sides that may be pulled away from the bags by a user to reveal the bags and/or outlets.

Other details of a beverage dispensing system and connector assembly are shown in U.S. Pat. No. 10,233,003, issued Mar. 19, 2019, and U.S. Pat. No. 10,538,424, issued on Jan. 21, 2022, both of which are herein incorporated by reference.

As discussed in more detail below, an external connector assembly 110 is utilized to controllably, fluidly couple the outlet for the bags or containers 106 within a box 104. In general, the connector assembly 110, which may be referred to as a multi-bag connector or MBC assembly 110, includes a valve assembly 112 used to connect the outlet 224 of each bag 106 to the system 100. The valve assembly 112 connects the outlet 224 of the bags 106 together to jointly direct liquids from the bags 224 to a common main outlet 114 of the valve assembly 112.

As is described more fully herein, the components of the connector assembly cooperate together to enable a user to quickly, and accurately, attach the MBC assembly 110 to the MBP 104 when the user prepares the beverage dispensing system 100 for use. The components of the connector assembly 110 also cooperate together to enable the user to quickly and efficiently disengage the MBC assembly 110 from the MBP 104, for example, when the user wishes to replace empty bags or boxes with filled replacement bags or boxes.

With reference to FIGS. 5A-5G, 6A-6G, 7A-7G, 8A-8D, 9A-9F, 10A-10B, 10A-11D, 12A-12E, 13A-13B, and 15A-15C, a multi-bag connector (MBC), or connector, assembly 400 according to an embodiment of the present invention is shown. As discussed above, the MPC assembly 400 controllably couples a plurality of containers or bags 106 containing a liquid. The containers 106 are contained within a common package or box 104. Each container 106 has a fitment 210 (see FIGS. 14A-14B). Each fitment 210 has a channel and a flange 210A and configured to releasably connect a respective container 106 to the connector assembly 400. The containers 106 may be housed in a box 200 with the fitments 210 arranged in predetermined relative locations.

It should also be noted that the connector assembly 400 may also be adapted to work with a single container (or box or container) containing a single container.

In the illustrated embodiment, the MBC 400 includes a housing 402, a valve assembly 404, an actuator 406, and a locking plate assembly 408. The housing 402 includes a lower portion 402A and an upper portion 402B. The upper portion 402A extends from the lower portion 402B. The lower portion 402A and the upper portion 402B form a recess 402C for receiving the box or package 104.

While the MBC assembly 400 shown is configured to work with a box 104 containing five bags 106 linearly arranged, the MBC assembly 400 of the present invention may be configured or adapted to work with any box configuration, including, but not limited to the box arrangements discussed above.

With specific reference to FIGS. 9A-9F, an exemplary valve assembly 500 is shown. The valve assembly 500 includes a plurality of fitment receptacles or inlets 502. Each fitment receptacle 502 is associated with a respective fitment 108 of the package or box 104. The plurality of fitment receptacles 502 being arranged in a pattern coinciding with the predetermined relative locations of the fitments 104. As shown, the valve assembly 500 includes a liquid flow channel 504 and an outlet 506. The liquid flow channel 504 couples the fitment receptacles 502 to the outlet 506. In the illustrated embodiment, the outlet 506 forms the common outlet 114 and the outlet 110A of the connecter assembly 110.

In the illustrated embodiment, the valve assembly 500 includes a top portion 508 and a bottom portion 510. The top portion 508 and the bottom portion 510 may be composed from Polyoxymethylene (POM, or other suitable material. The top portion 508 includes a plurality of apertures 512 that provide access to the fitment receptacles 502 which are formed within the bottom portion 510. The top portion 508 and the bottom portion 510 are fastened together via a plurality of fasteners (not shown). A seal 514 located between the top portion 508 and the bottom portion 510 to provide sealing therebetween.

Figure 9D:
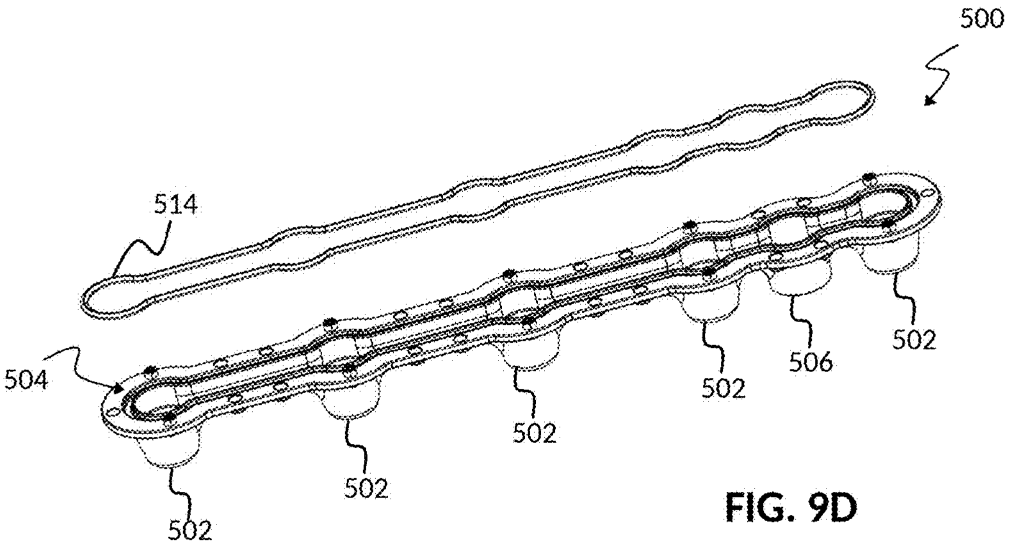
FIG. 9D is a perspective view of a bottom portion and a seal of the valve assembly of FIG. 9A.
Figure 9E:
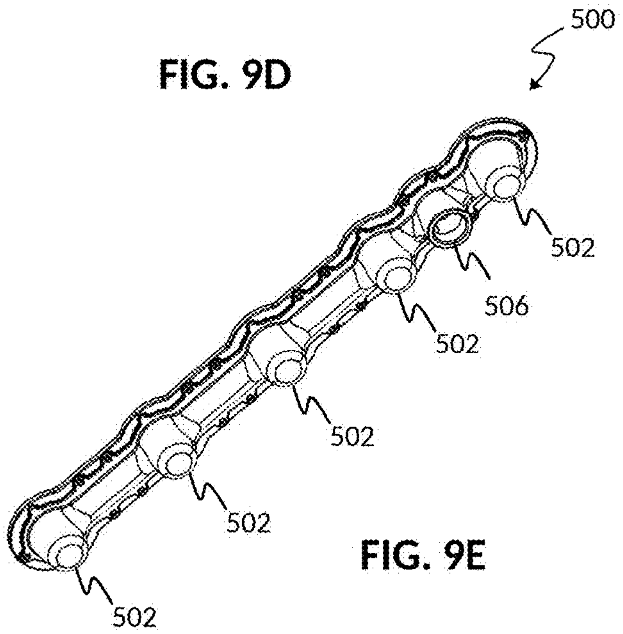
FIG. 9E is a second perspective view of the bottom portion of the valve assembly of FIG. 9A.
Figure 9F:
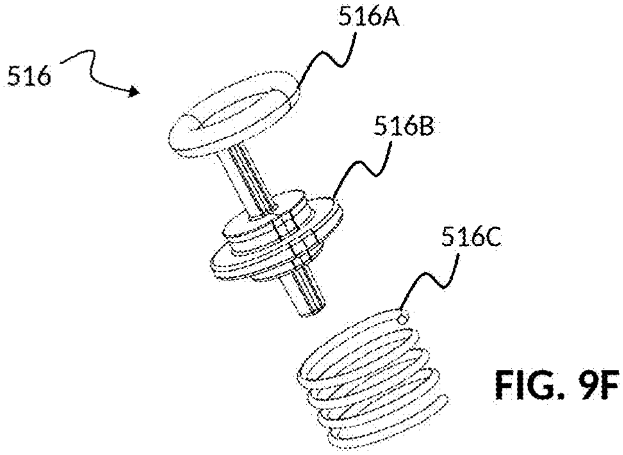
FIG. 9F is an exploded view of a valve sub-assembly of the valve assembly of FIG. 9A.

With specific reference to FIG. 9F, a valve sub-assembly 516 is located within each fitment receptacle 502. Each valve sub-assembly 516 includes an o-ring 516A, a valve element 516B, and a spring 516C. The valve sub-assembly 516 and the respective fitment receptacle 502 form a respective valve within the valve assembly 500. The spring 516C acts against an underside of the valve element 516B to bias the valve element 916B towards the top portion 908 of the valve assembly 900. The When a fitment 104 is inserted into a fitment receptacle 502, the fitment 104 is pushed against a top surface of the valve element 516 to open the respective valve 516, 502 to allow fluid to flow from a respective bag 106 through the liquid flow channel 504 to the outlet 506.

Returning to FIGS. 5A-5G, 6A-6G, 7A-7G, the actuator 406 is rotatably coupled to the housing 402. The actuator 406 is movable between an open (or first) position (shown in FIGS. 5A-5G), a closed (or second) position (shown in FIGS. 6A-6G), and an engaged (or third) position (shown in FIGS. 7A-7G).

With specific reference to FIGS. 12A-12E, the locking plate assembly 408 includes a first plate 430 and a second locking plate 432. The first and second locking plates 430, 432 are coupled to the actuator 406 form an opening 436 (see also FIGS. 5F, 6F, 7F) corresponding to each fitment 210. The openings 436 have a variable diameter, $d_{variable}$, as a function of the position of the actuator 406. In the illustrated embodiment, the opening 436 have has a first diameter (or diameter value) when the actuator 406 is in the open position and a second diameter (or diameter value) when the actuator 406 is in the closed and engaged positions. The first diameter of the openings 436 are configured to allow entry of the flange 210A of each fitment 210 into the respective opening 436. Movement of the actuator 406 from the open position to the closed position closes the openings 436 to the second diameter (or diameter value). The second diameter is smaller than the first diameter and is also smaller than a diameter of the fitments 210.

As will be explained in more depth below, further movement of the actuator 406 from the closed position to the engaged position, results in movement of the locking plate assembly 408 towards the rear of the housing 402, i.e., the valve assembly 404. With a package or box 104 within the recess 402 of the housing 400, when the locking plate assembly 408 is moved towards the valve assembly 404, since the variable diameter, $d_{variable}$, is smaller than a diameter of the fitments 210, the box or package 104 is drawn towards the rear of the housing 402 of the MBC assembly 400 such that the fitments 210 and the bags 106 are in fluid communication with the valve assembly 112. Essentially, the locking plate assembly 408 "grabs" the fitments 108 and pulls the fitments 108 and the package 104 towards the valve assembly 112 such that the fitments 108 are connected to the corresponding valve inlets or apertures 512.

Figure 8A:
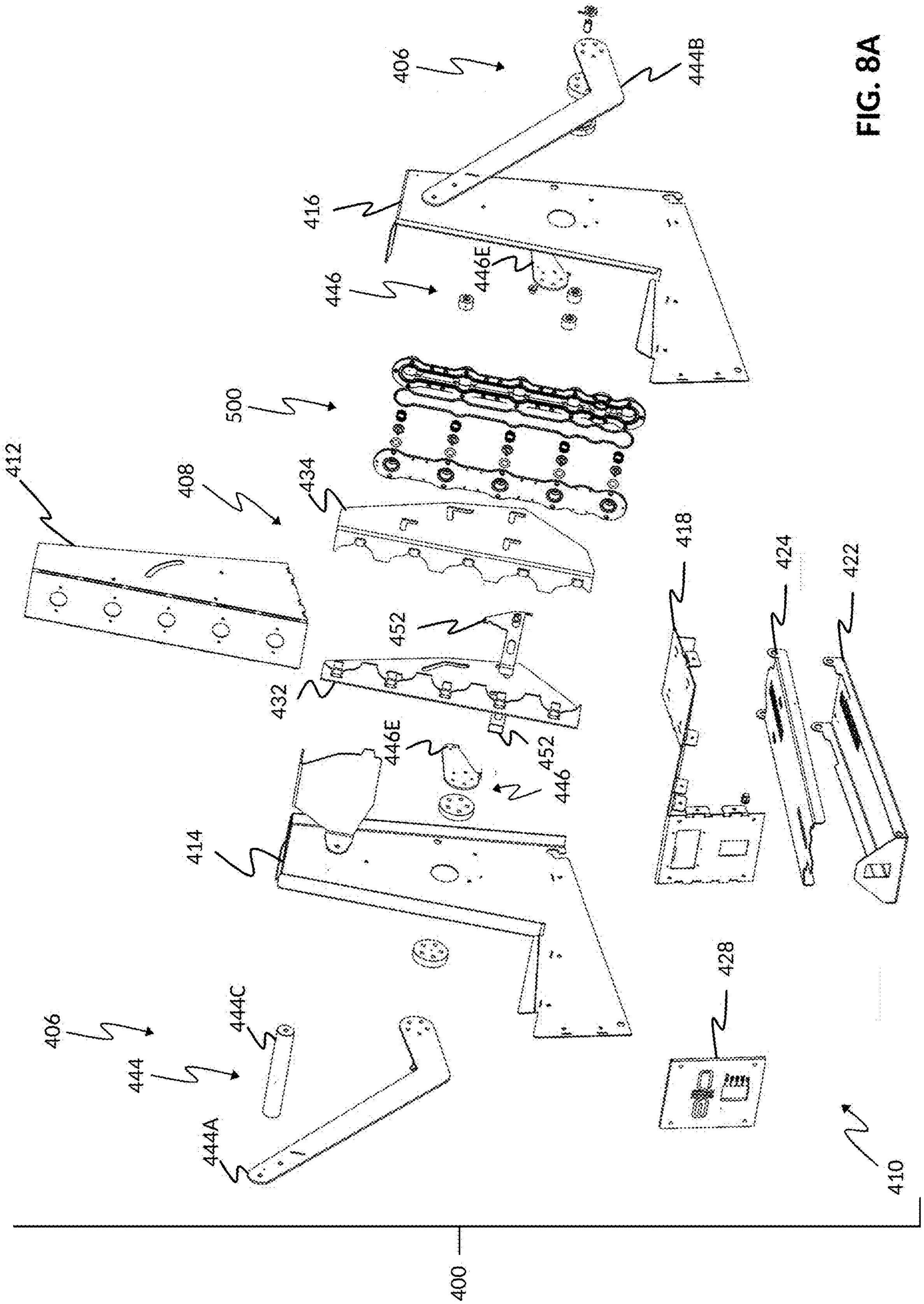
FIG. 8A is an exploded view of the multi-bag connector (MBC) assembly of FIG. 5A.
Figure 8B:
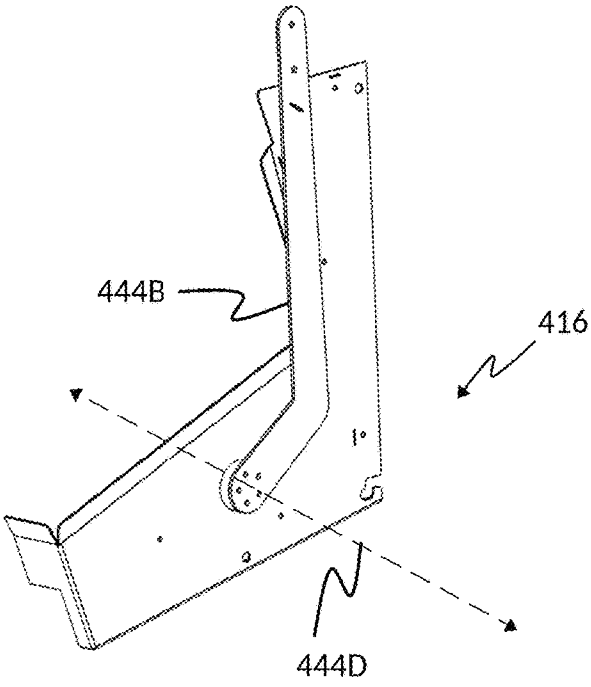
FIG. 8B is a first perspective view of a sub-assembly of the MBC assembly of FIG. 5A.
Figure 8C:
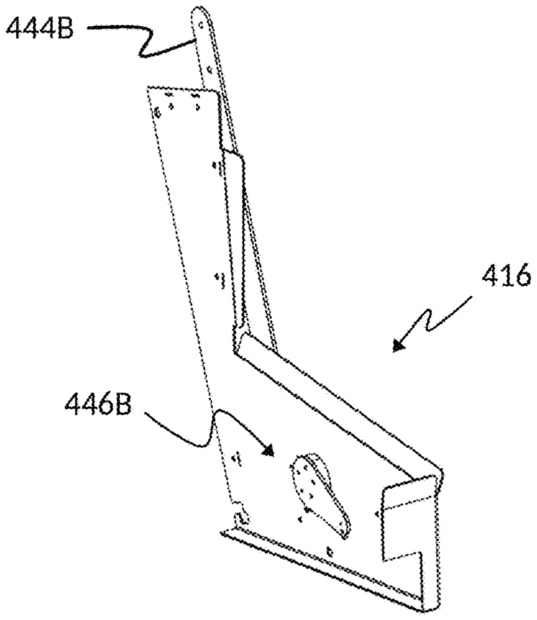
FIG. 8C is a second perspective view of the sub-assembly of FIG. 8B.
Figure 8D:
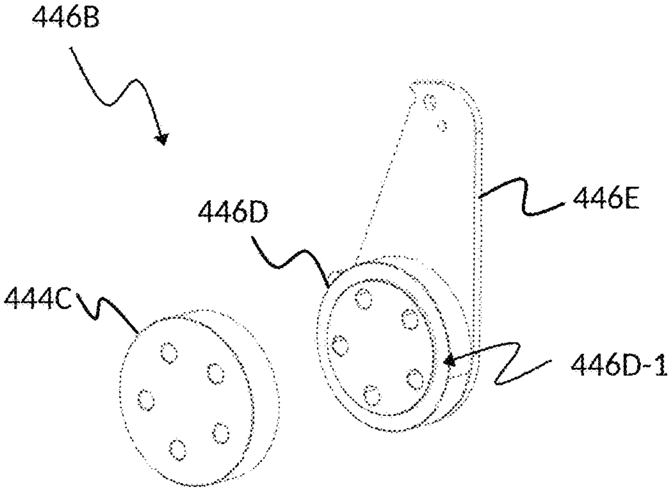
FIG. 8D is an exploded perspective view of a portion of the sub-assembly of FIG. 8B.
Figure 8E:
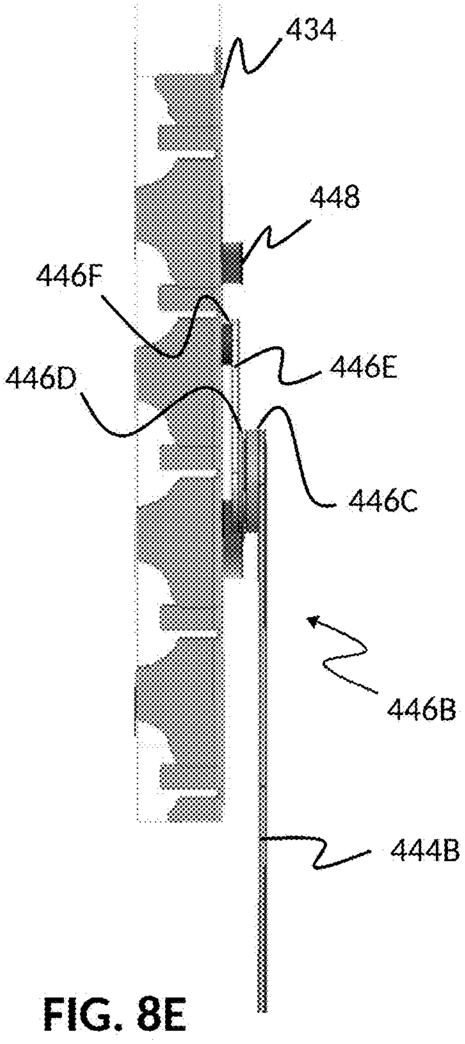
FIG. 8E is a side view of a portion of the sub-assembly of FIG. 8B.
Figure 8F:
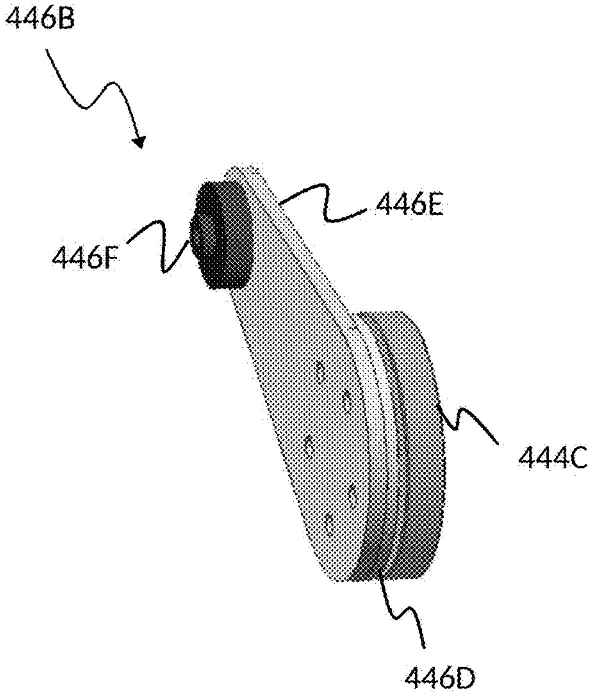
FIG. 8F is a second perspective view of the portion of the sub-assembly of FIG. 8B.

With reference to FIGS. 8A, the housing 402 of the MBC assembly 110 includes a base assembly 410, a back bracket 412, and first and second outer housing portions 414, 416. The base assembly 410, the back bracket 412, and the first and second outer housing portions 414, 416 are fastened together using fasteners (not shown) to form the housing 402.

Figure 10A:
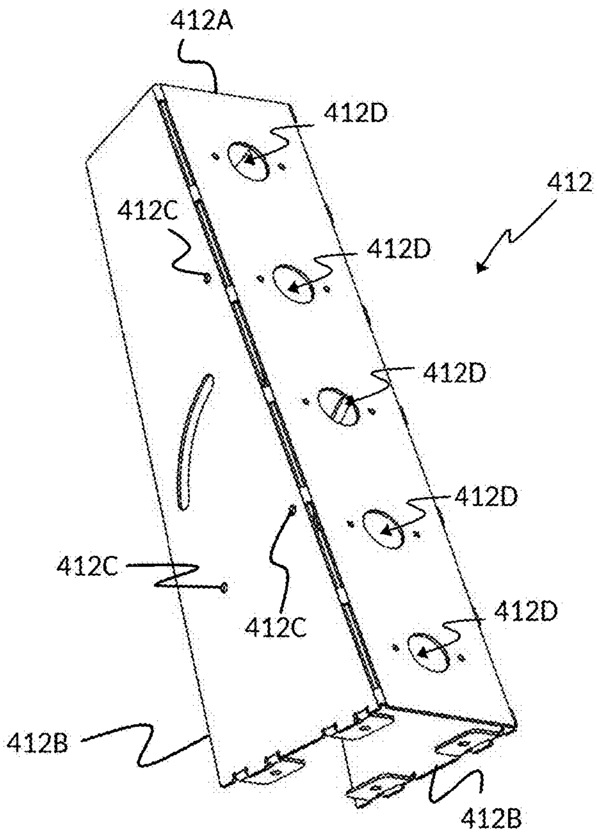
FIG. 10A is a first perspective view of a back bracket of the MBC assembly of FIG. 5A.
Figure 10B:
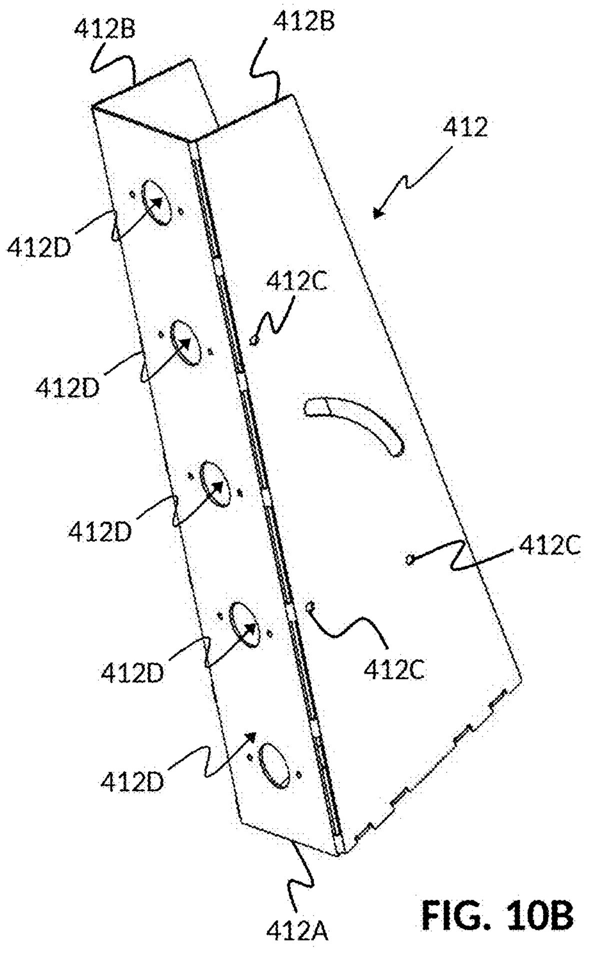
FIG. 10B is a second perspective view of the back bracket of FIG. 10A.
Figure 11A:
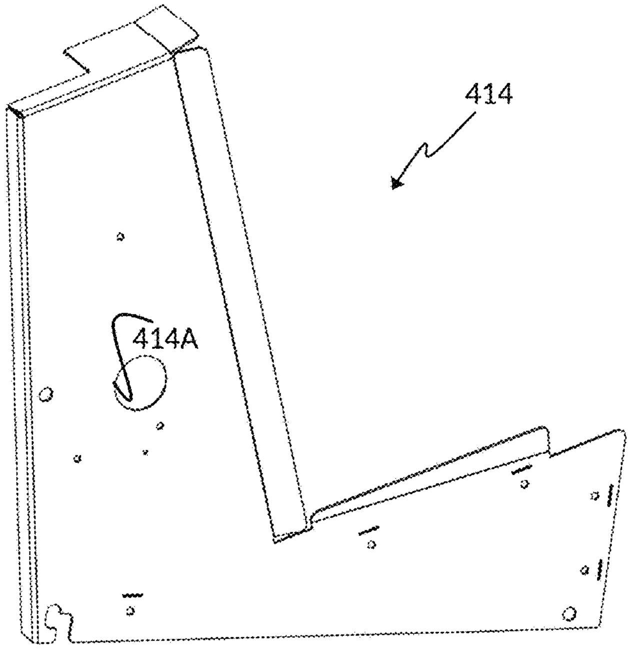
FIG. 11A is a first perspective view of a first portion of a housing of the MBC assembly of FIG. 5A.
Figure 11B:
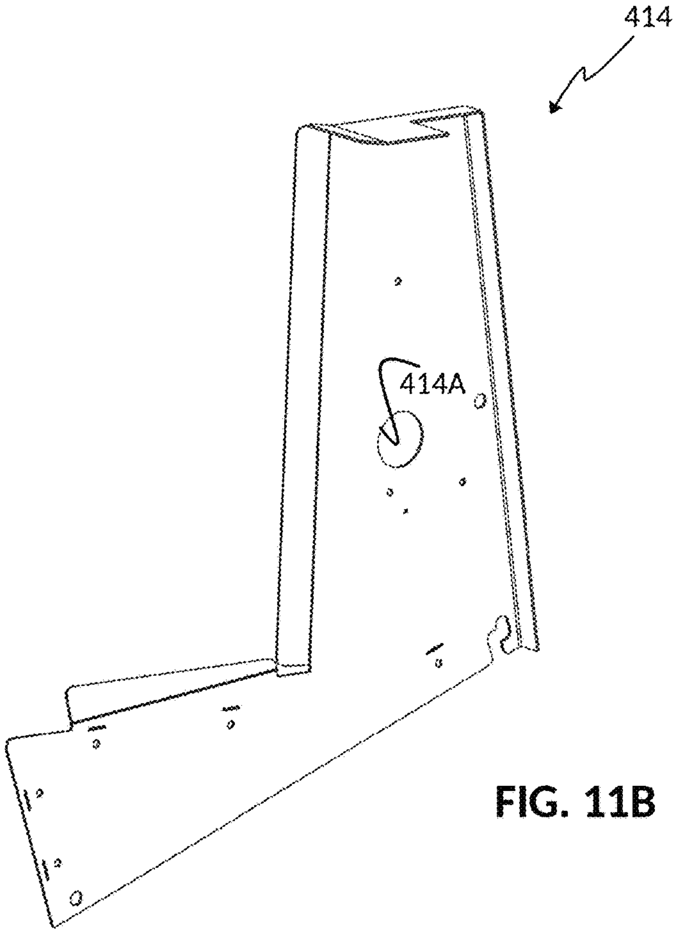
FIG. 11B is a second perspective view of the first portion of the housing of FIG. 11A.
Figure 11C:
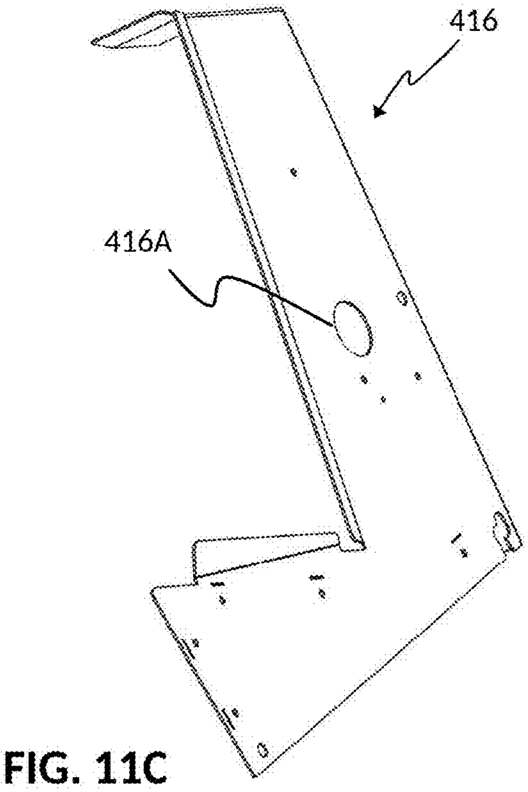
FIG. 11C is a first perspective view of a second portion of the housing of the MBC assembly of FIG. 5A.
Figure 11D:
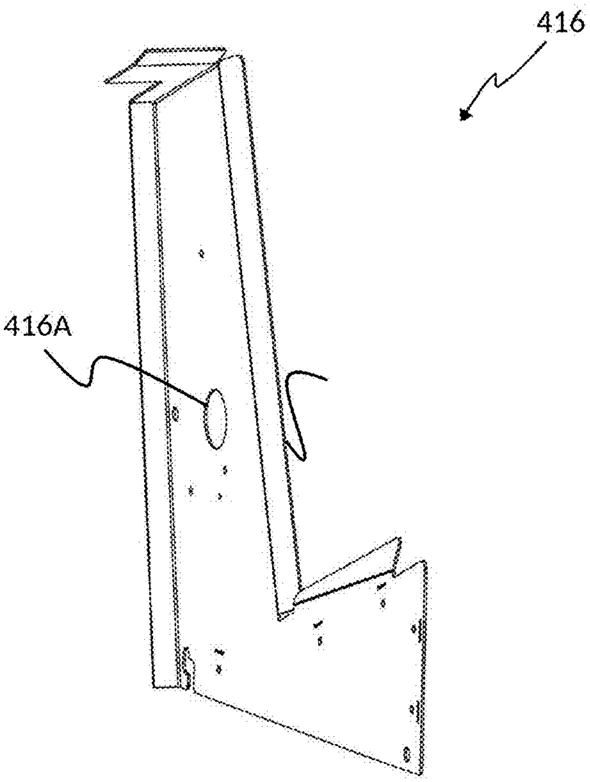
FIG. 11D is a second perspective view of the second portion of the housing of FIG. 11C.

As shown in FIGS. 10A, 10B, the back bracket 412 includes front panel 412A and two side panels 412B. The valve assembly 404 is mounted to a back surface of the front panel 412A using fasteners (not shown). A plurality of orifices 412D within the front panel 412A provide access to the fitment receptacles 502.

Figure 13A:
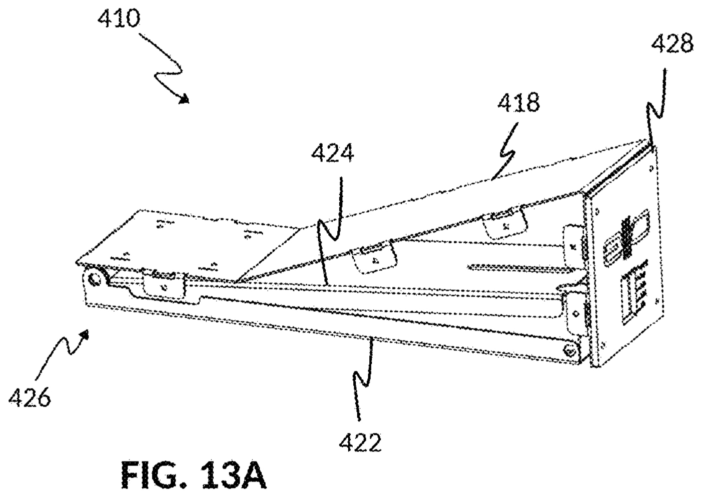
FIG. 13A is a perspective view of a base assembly of the MBC of FIG. 5A including a scale.
Figure 13B:
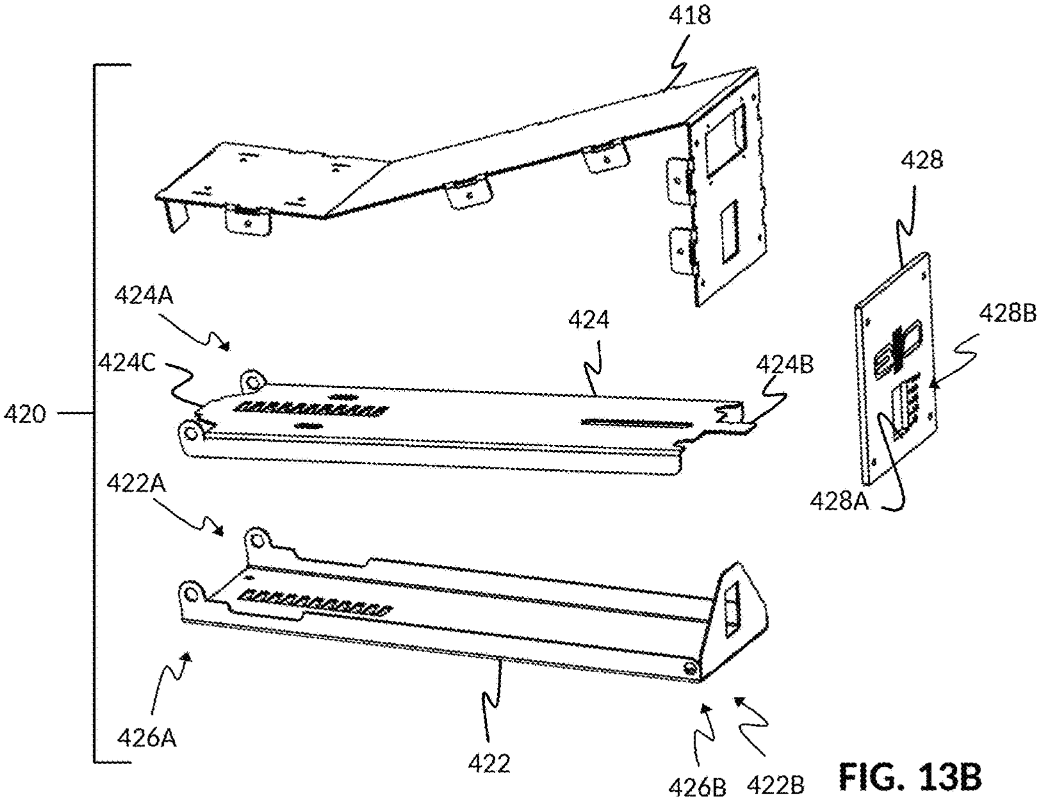
FIG. 13B is an exploded view of the base assembly of FIG. 13A.
Figure 14A:
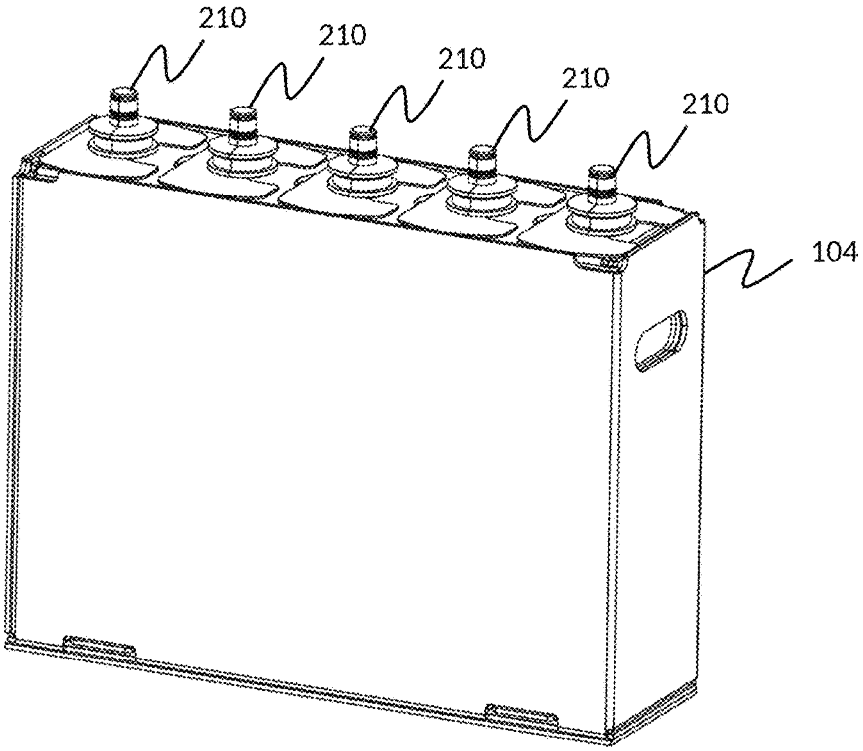
FIG. 14A is a perspective view of a multi-bag package (MBP) or box for use with the MBC assembly of FIG. 5A.
Figure 14B:
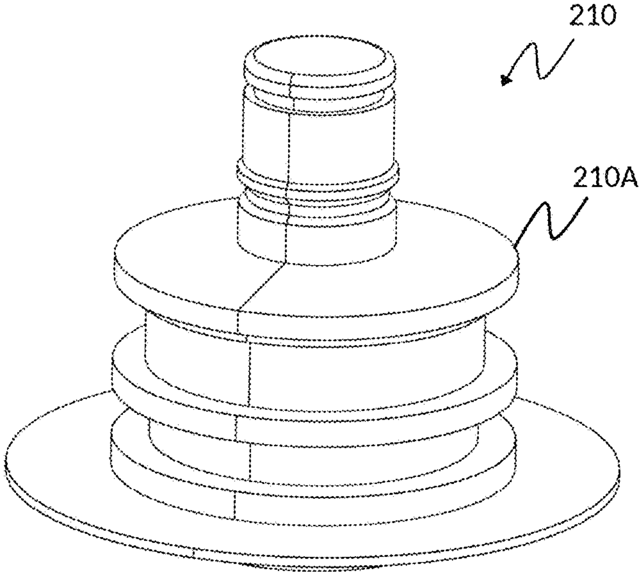
FIG. 14B is a perspective view of a fitment of the MBP of FIG. 14A.

As shown in FIGS. 13A-13B, the base assembly 410 includes a guide plate 418 configured to bear the weight associated with the containers 106. As shown, the guide plate 418 is inclined downward towards a back end of the housing 402 and forms part of the recess 402C.

In one aspect of the present invention, the base assembly 410 includes scale 420 configured to detect a weight associated with the package or box 104 and the containers 106 and provides a visual indication of the detected weight. In one embodiment, the scale 420 is an electronic scale (not shown) that includes an electronic display (not shown) to display the detected weight.

In another embodiment, the scale 420 is a mechanical scale. As shown in FIGS. 13A-13B, in the illustrated embodiment, the scale 420 includes the guide plate 418, a bottom plate 422, and a scale arm 424. Each of the bottom plate 422 and the scale arm 424 have a pair of orifices 422A, 424A located at a first end thereof. The orifices 422A, 424A are configured to receive fasteners (not shown) to form a first hinge 426A. A second end of the scale arm 424 is biased downward by a spring (not shown) located between the bottom plate 422 and the second end of the guide plate 418. The scale arm 424 includes a visual indicator 424B. The bottom plate 422 further includes a second pair of orifices 422B configured to receive fasteners (not shown) to couple the bottom plate 422 to the housing 102 to form a second hinge 426B.

The scale 420 may further include a plate 428 mounted to a front of the guide plate 418 and having an aperture 428A. The visual indicator 424B extends through the aperture 428A in the plate 428. The plate 428 may further include indicia 428B located on an outer surface thereof. The indicia 428B cooperate with the visual indicator 424B to provide an indication of the detected weight. In one embodiment, the indicia are expressed as a percentage of a level of liquid remaining within the package or box 104, e.g., between 0% and 100%. In the illustrated embodiment, the following values are included in the indicia 428B: 0%, 25%, 50%, 75%, 100%.

The guide plate 418, bottom plate 422 and scale arm 424 may be composed from stainless steel, such as Stainless Steel 430 and fastened together using any appropriate fastener(s). The plate 428 may be composed of a plastic, or other similar or suitable material. The scale arm 424 further includes a tab 424C which is positioned within a slot 418A (see FIGS. 5D, 6D, 7D) in the guide plate 418.

When a box or package 104 is inserted into the recess 402C of the housing 402, the weight of the box or package 104 results in the bottom plate 422 to pivot about the second hinge 426B. The tab 424C is held in place by the guide plate 418 and the guide plate 418 pivots about the first hinge 426A resulting in upward movement of the indicator 424B to provide the visual indication of the detected weight.

The other components of the housing 402, including the back bracket 412 and the first and second outer housing portions 414, 416 may also composed from stainless steel, such as Stainless Steel 304 (type 1.4301) fastened together (and to the base assembly 410) using any appropriate fastener(s).

With reference to FIGS. 8A and 12A-12E, the locking plate assembly 408 includes the first locking plate 432 and the second locking plate 434. As mentioned above, the locking plate assembly 408 includes a plurality of opening 436. Each of the openings 436 corresponds to one of the fitments 210 of the box 104. The first locking plate 432 includes a front panel 432A and a side panel 432B. The second locking plate 434 includes a front panel 434A and a side panel 434B. Each of the openings 436 is formed by a respective recess 432C in the front panel 432A of the first locking plate 432 and an opposing recess 434C in the front panel 434A of the second locking plate 434. Each recess 432B, 434B may include a recessed tab 432D, 434D that is located between the respective opening 436 to limit the amount of travel of the fitments 210.

In a first embodiment of the present invention, one of the first and second locking plates moves in a first direction (for example, as indicated by arrow 440 in FIG. 12A) along an axis of the housing in response to the actuator being moved from the open position to the closed position and the one of the first and second locking plates moves in a second direction opposite the first direction (for example, as indicated by arrow 442 in FIG. 12A) in response the actuator being moved from the closed position to the open position.

In a second embodiment of the present invention, in response to the actuator 406 being moved from the open position to the closed position, the first locking plate 432 moves in a first direction 440 along an axis 438 of the housing 402 and the second locking plate 434 moves in a second direction 442 along the axis 438. The first and second directions 440, 442 are opposite.

In the illustrated embodiment, the actuator 406 includes a handle assembly 444. With reference to FIGS. 5A and 8A, the handle assembly 444 may include first and second arms 444A, 444B and a gripping portion 444B fastened between first ends of the first and second arms 444A, 444B. Opposite ends of the first and second arms 444A, 444B are rotatably coupled to the housing 402 (see below).

In the illustrated embodiment, the actuator 404 is moveable between an open position (shown in FIGS. 5A-5G) to closed position (shown in FIGS. 6A-6G) to an engaged position (shown in FIGS. 7A-7G). When in the open position, the first locking plate 432 is in a down position and the second locking plate 434 is in an upward position. In the open position, the variable diameter ($d_{variable}$) of the openings 436 is large enough to allow the fitments 210 to be received therethrough.

After a box 104 is inserted or placed in the recess 432C of the housing 402, the handle assembly 444 may be moved from the open position to the closed position resulting in the variable diameter ($d_{variable}$) of the openings 436 being reduced such that the fitments 210 are captured by the locking plate assembly 408. Thereafter, movement of the handle assembly 444 from the closed position to the engage position results in motion of the locking plate assembly 408 backwards (towards the valve assembly 500 and the back bracket 412). This action brings the fitments 210 into engagement with the valve assembly 500 (see above).

With specific reference to FIGS. 8A, 5B, 5G, 6B, 6G, 7B and 7G, the connector assembly may further include a guide assembly device 446. The guide assembly device 446 is coupled to the handle assembly 444 of the actuator 406 and is, at least partially, located between the housing 402 and the locking plate assembly 408. In the illustrated embodiment the guide assembly 446 includes a first guide assembly 446A coupled to the first arm 444A of the handle assembly 444 and a second guide assembly 446B coupled to the second arm 444B of the handle assembly 444.

An exploded view of a portion of the second guide assembly 446B is shown in FIGS. 8B-8F. The first guide assembly 446A is a mirror of the second guide assembly 446B and operates in a similar manner. As shown, the second guide assembly 446B is rotatably coupled to the second outer housing portion 416. In the illustrated embodiment, each of the first and second guide assemblies 446A, 446B includes a disk 446C, a bearing ring 446D, and a cam 446E. The disks 446C are located adjacent an outer surface of the first and second outer housing portions 414, 416, respectively. The bearing ring 446D has an inner portion with a reduced diameter 446D-1 that fits within an aperture 414A, 416A of the first and second outer housing portions 414, 416 (see FIGS. 11A-11D). The cam 446D is located at an outer surface of the bearing ring 446D. The disk 46C, bearing ring 446D, and cam 446E are fixedly coupled to the send end of the first and second arms 444A, 444B of the handle assembly 444, and thus are rotated about an axis 444D of the handle assembly 444.

The cam 446E is fixedly coupled to the respective first and second arms 444A, 444B at a first cam end. Each of the first and second guide assemblies 446A, 446B further include a primary guide pin 446F (see FIGS. 8D-8F).

Returning to FIGS. 8E, 8F and 12A-12G, each of the first and second locking plates 432, 434 includes a primary guide track 432E, 434E configured to receive the primary guide pin 446F connected to the second cam end of the cam 446E. Rotation of the handle assembly 444 moves the primary guide pins 446F connected to the second cam end of the cam 446E within the respective primary guide track 432E, 434E resulting in movement of the first and second locking plates 432, 434 relative to the housing 402.

In the illustrated embodiment, the first locking plate 432 includes at least one secondary guide track 432F and the second locking plate 434 includes at least one secondary guide track 434F. Each of the first and second guiding assemblies 446A 446B include associated secondary guide pins 448 coupled to the housing 402.

In the illustrated embodiment, each of the first and second locking plates 432, 434 include three secondary guide tracks 432F, 434F and the first and second guiding assemblies 446A, 446B include three guide pins 448 coupled to the back bracket 412 using fasteners at predetermined locations or fastener apertures 412D (see FIGS. 10A, 10B). The secondary guide tracks 432F, 434F are configured to receive respective secondary guide pins 448. The arrangement of the second guide tracks 432F, 434F and the guide pins 448 limit movement of the first locking plate 432 relative to the housing 402 along a first trajectory and to limit movement of the second locking plate 434 relative to the housing 432 along a second trajectory.

Figure 12A:
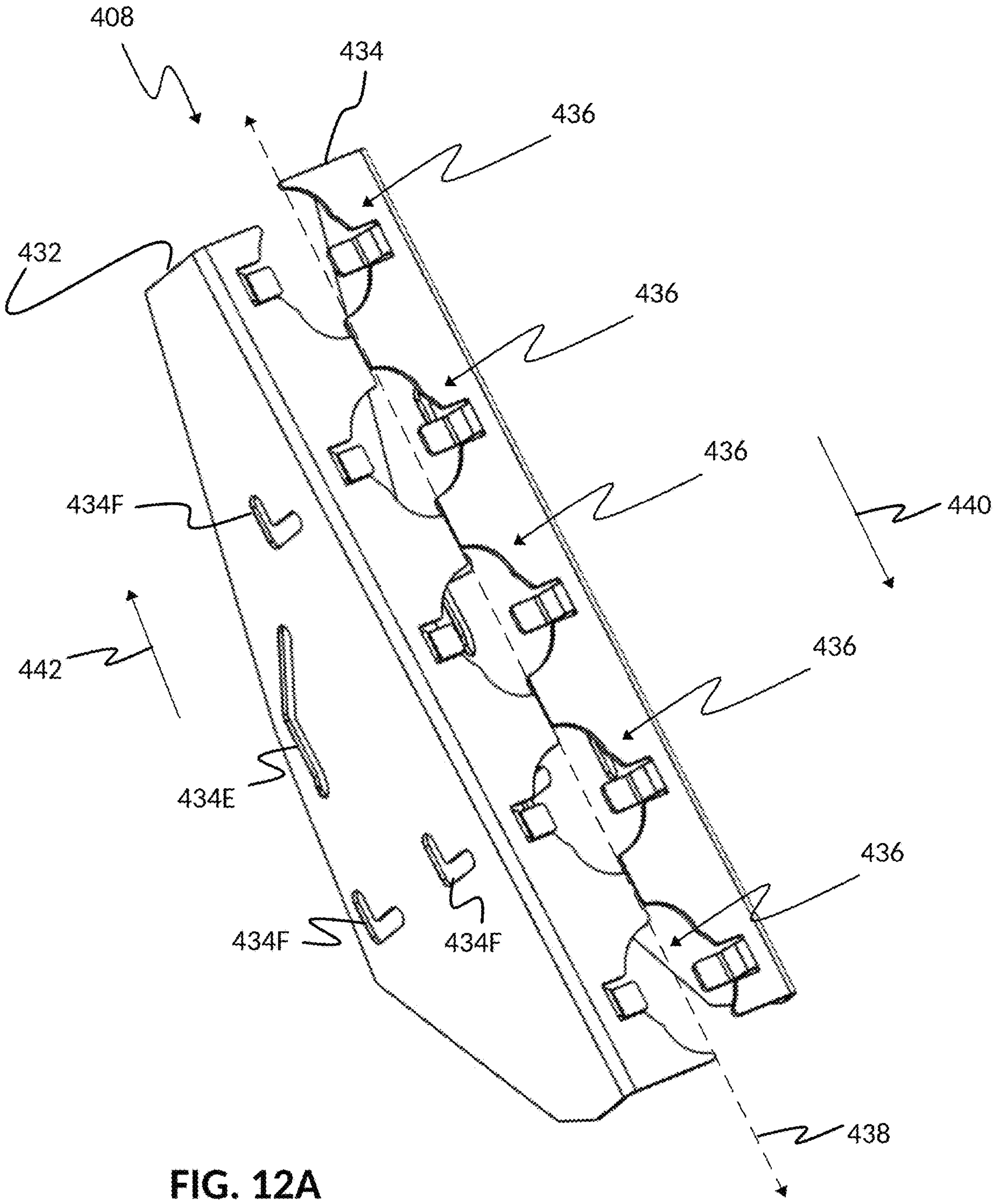
FIG. 12A is a perspective view of a locking plate assembly of the MBC assembly of FIG. 5A having first and second locking plates.
Figure 12B:
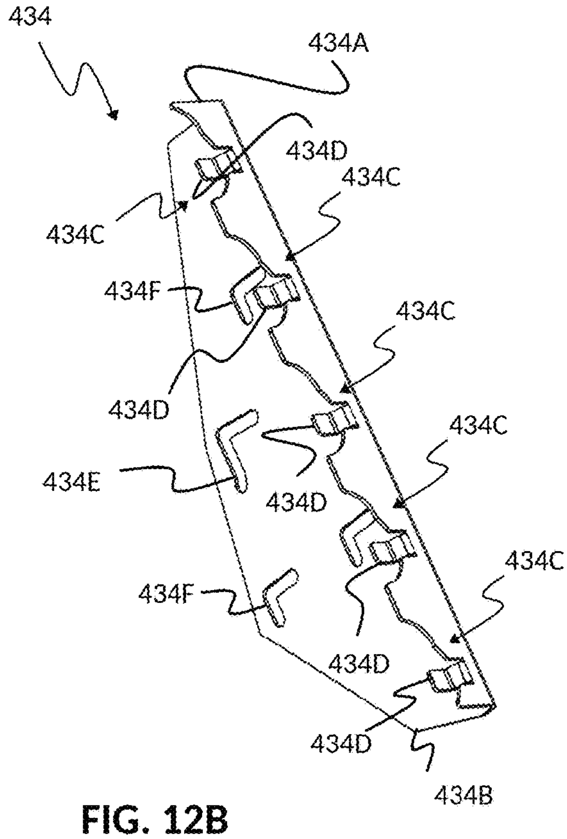
FIG. 12B is a first perspective view of the second locking plate of FIG. 12B.
Figure 12C:
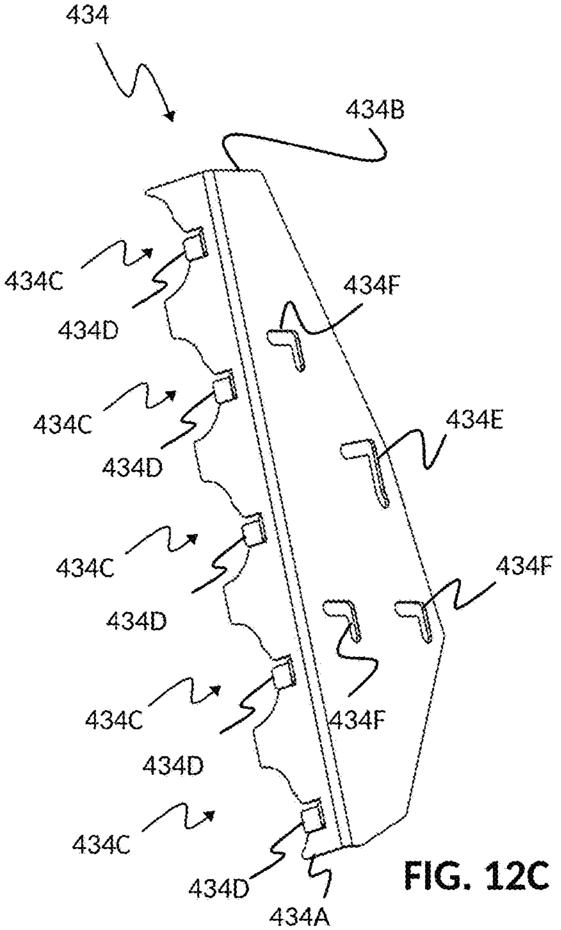
FIG. 12C is a second perspective view of the second locking plate of FIG. 12B.
Figure 12D:
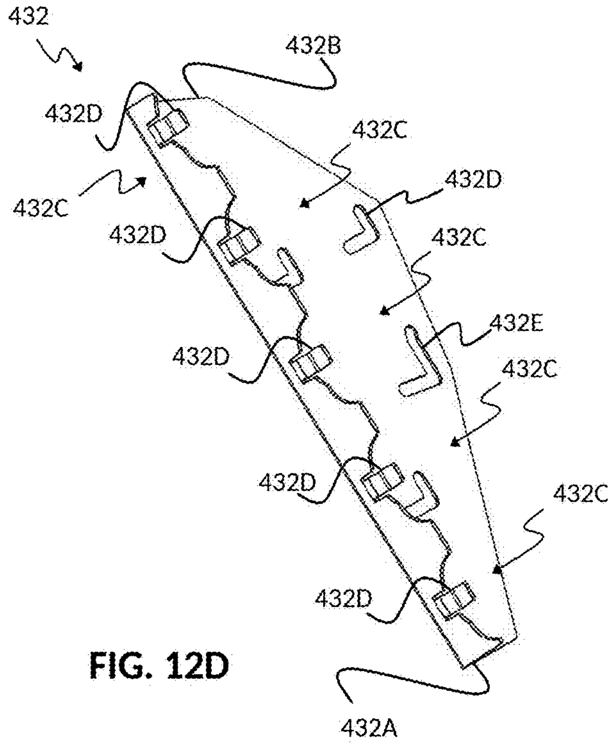
FIG. 12D is a first perspective view of the first locking plate of FIG. 12B.
Figure 12E:
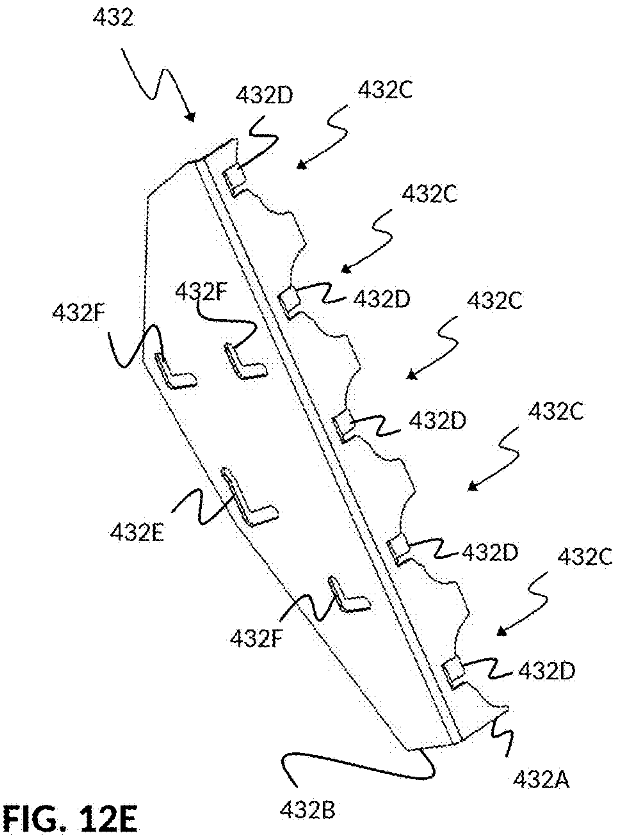
FIG. 12E is a second perspective view of the first locking plate of FIG. 12B.
Figure 12F:
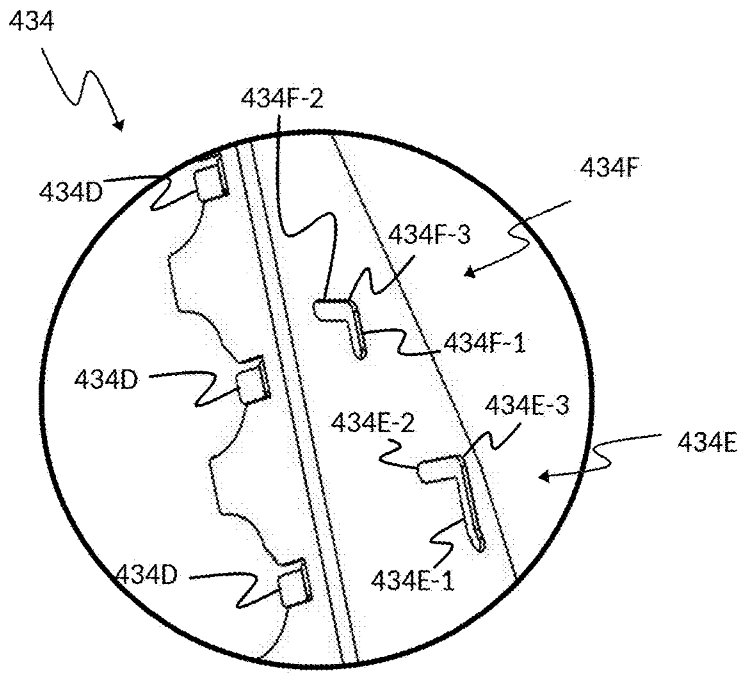
FIG. 12F is a partial enlarged view of the second locking plate of FIG. 12B.
Figure 12G:
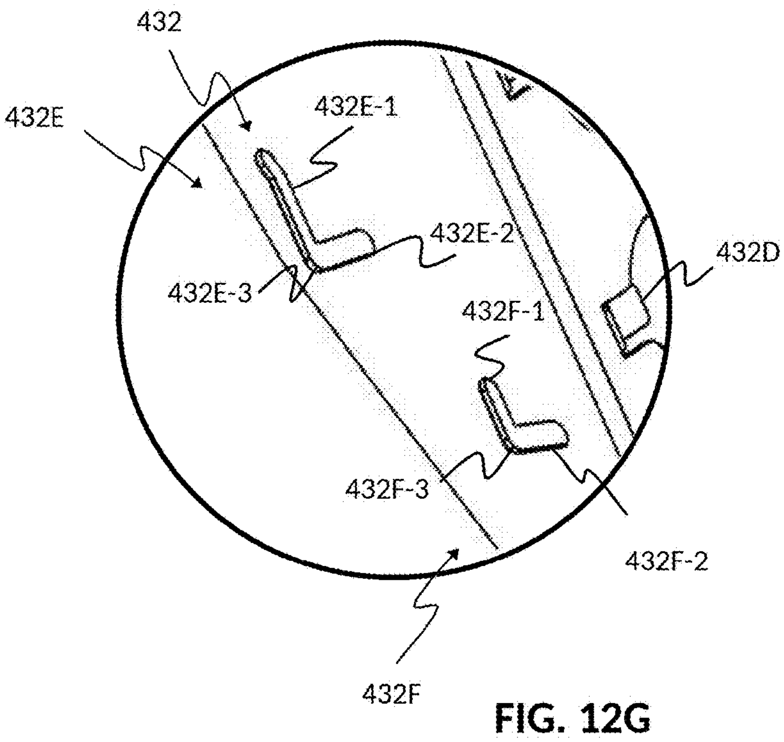
FIG. 12G is a partial enlarged view of the first locking plate of FIG. 12B.

With reference to FIG. 12F, an enlarged portion of the second locking plate 434 is shown illustrating the primary guide track 434E and one of the second guide tracks 434F. The primary guide track 434E of the second locking plate 434 includes a first leg 434E-1 and a second leg 434E-2 joined at an elbow 434E-3. As shown in FIG. 12G, the primary guide track 432E of the first locking plate 432 includes a first leg 432E-1 and a second leg 432E-2 joined at an elbow 432E-3.

When the handle assembly 444 is in the open position, the primary guide pins 446 are located at an end of the first leg 432E-1 (furthest from the elbow 432E-3) on the first locking plate 432 and at end of the first leg 434E-1 (furthest from the elbow 434E-3) on the second plate 434. A detent feature may be located at the end of the first legs 432E-1, 434E-1 to provide slight resistance to movement of the handle assembly 404 away from the open position. Also, when the handle assembly 444 is in the open position the secondary guide pins 448 which are mounted to the back bracket 412 are located at an end of a first leg 432F-1 (furthest from an elbow 43F-3) on the first locking plate 432 and at end of a first leg 434F-1 (furthest from the elbow 434F-3) on the second locking plate 434.

Rotation of the handle assembly 444 from the open position towards the closed position moves the primary guidance pins 446F along the respective first legs 434E-1, 432E-1 towards the respective elbows 434E-3, 432E-3 imparting motion to the first and second locking plates 434, 432. The secondary guidance pins 448 within the secondary guidance tracks 434F, 432F constrain movement of the first and second locking plates 432, 434. As the handles assembly 444 is moved towards the closed position, this arrangement provides movement of the first locking plate 432 upward (arrow 442) and movement of the second locking plate 434 downward (arrow 440) (resulting in decreasing the diameter).

Once the primary guidance pins 446F reach the elbows 434E-3, 432E-3, the handle assembly 444 is in the closed position (see above). Further movement of the handle assembly 444 towards the engaged position causes the primary guide pins 446F to travel from the elbows 434E-3, 432E-3 towards the opposite ends of the second legs 434E-2, 432E-2. Further movement of the handle assembly 444 from the closed position towards the engaged position results in motion of the first and second locking plates 432, 434 towards the back bracket 412 (arrow 441).

Figure 15A:
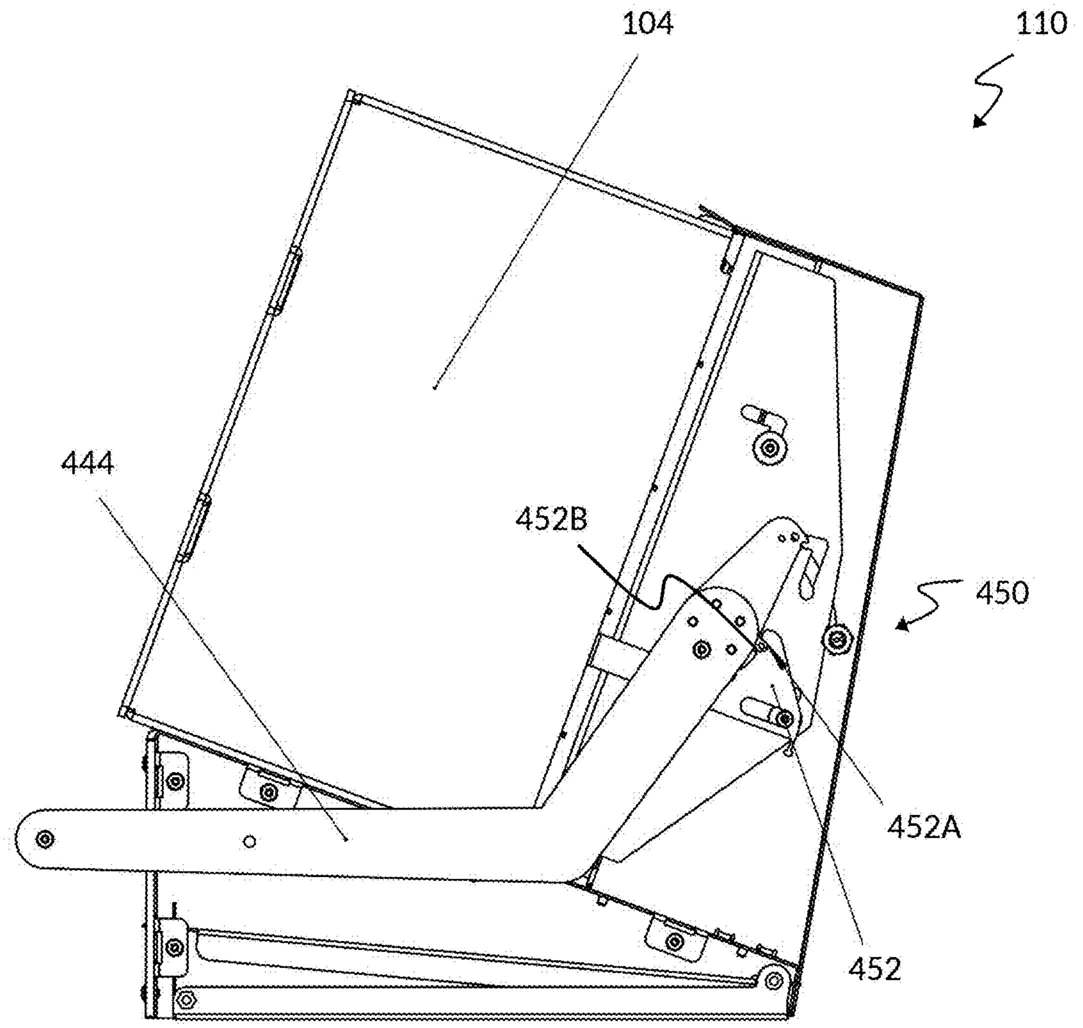
FIG. 15A is a side view of a multi-bag connector (MBC) assembly with a handle assembly in the open position and a locking mechanism in a locked configuration and a box or package partially inserted in the MBC assembly.
Figure 15B:
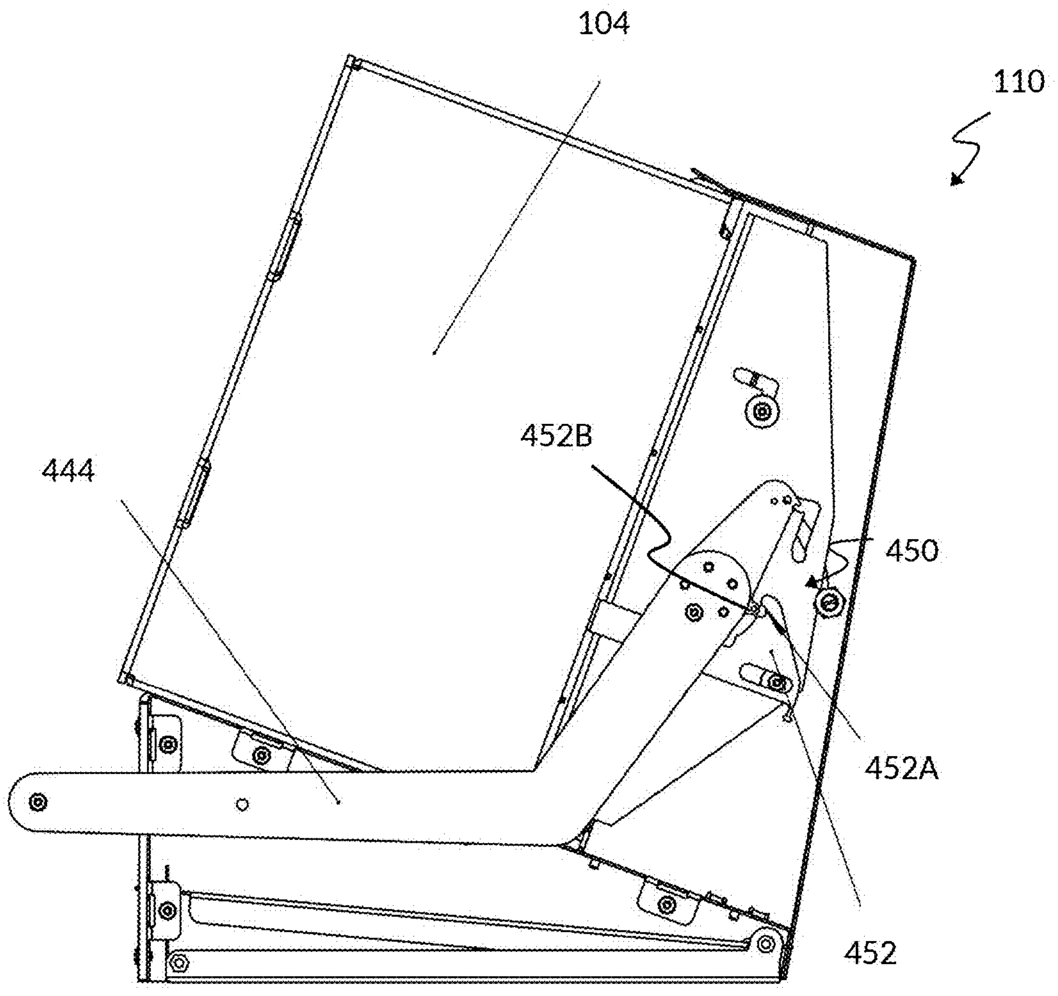
FIG. 15B is a side view of the locking mechanism of FIG. 15A with the handle assembly in the open position and the locking mechanism in an unlocked configuration and a box or package fully inserted in the MBC assembly.
Figure 15C:
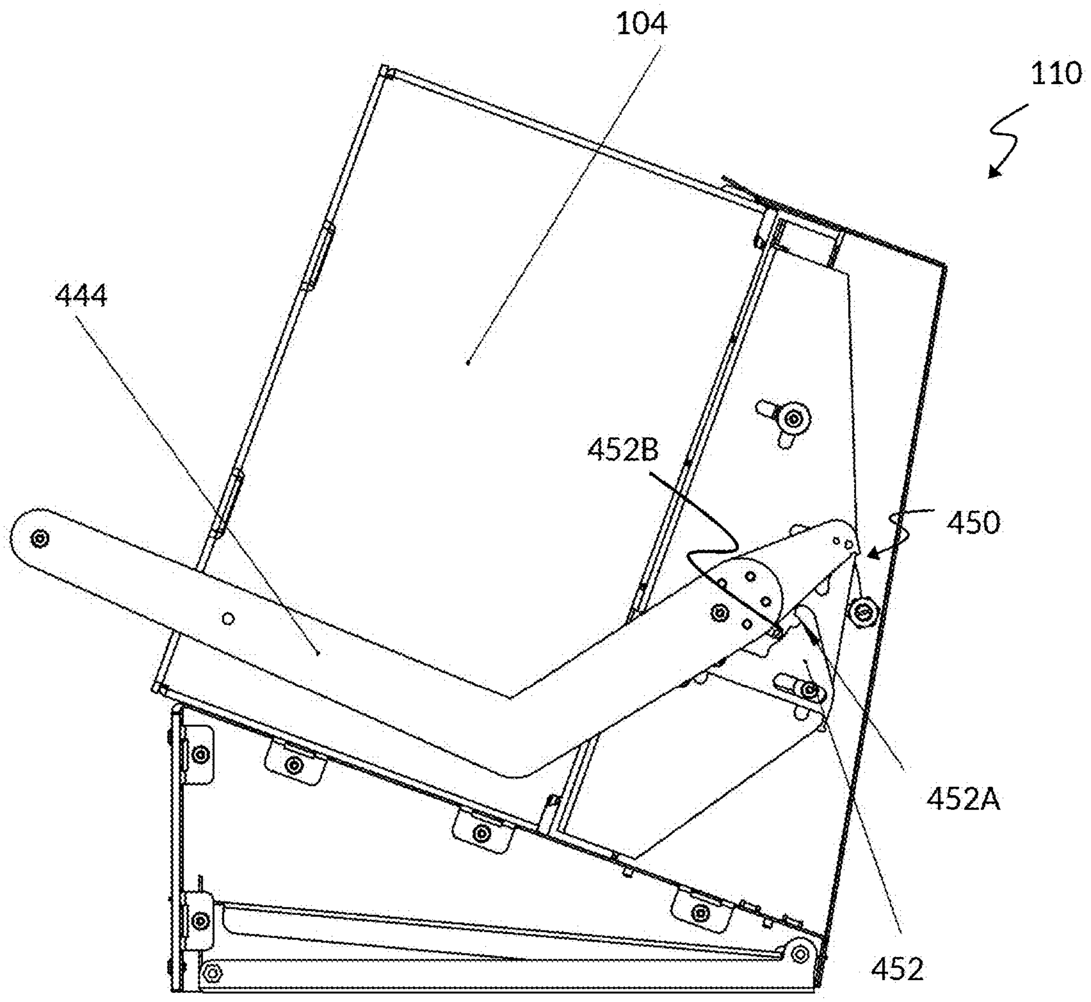
FIG. 15C is a side view of the locking mechanism of FIG. 15A with the handle assembly in the closed position and the locking mechanism in an unlocked configuration.

With reference to FIGS. 15A-15B, the MBC assembly 110 may further include a locking mechanism 450. The locking mechanism 450 is configured to controllably retain the handle position in the open position when there is a box or package 104 is not fully inserted within the recess 402C. The locking mechanism 450 may be moved between a locked and unlocked position. The locking mechanism 450 includes a pair of locking brackets 452 coupled to the first locking plate 432 and the second locking plate 434, respectively. which is moveably coupled to each guide assembly 446. The locking brackets 452 are spring biased forward (away from the back bracket 412. Only one of the locking brackets 452 is shown in FIGS. 15A-15C. Each locking bracket 452 includes a notch 452A that is configured to receive a pin 452B located on the respective guide assembly 446.

When the locking mechanism 450 is in the locked position, the pin 452B is retained within the notch 452A to prevent rotation of the handle assembly 444. When there is not a box or package 104 fully inserted, the locking brackets 452 are biased forward, thereby maintaining the locking mechanism 450 in the locked position.

When a box or package 104 in inserted in the recess 402C, the box or package 104 pushes back on the locking brackets 452 until it is fully inserted and the locking mechanism 450 has been moved from the locked position (shown in FIG. 15A) to an unlocked position (FIG. 15B). When in the unlocked position, the pin 452B is released from the notch 452A allowing the handle assembly 444 to rotate freely.

In a second embodiment, an electrically actuated locking mechanism may be used instead of the mechanical locking mechanism 450 illustrated above. In the second embodiment, a mechanical locking mechanism may be used in conjunction with the electrically actuated locking mechanism as a back-up in case of electrical failure.

Figure 16:
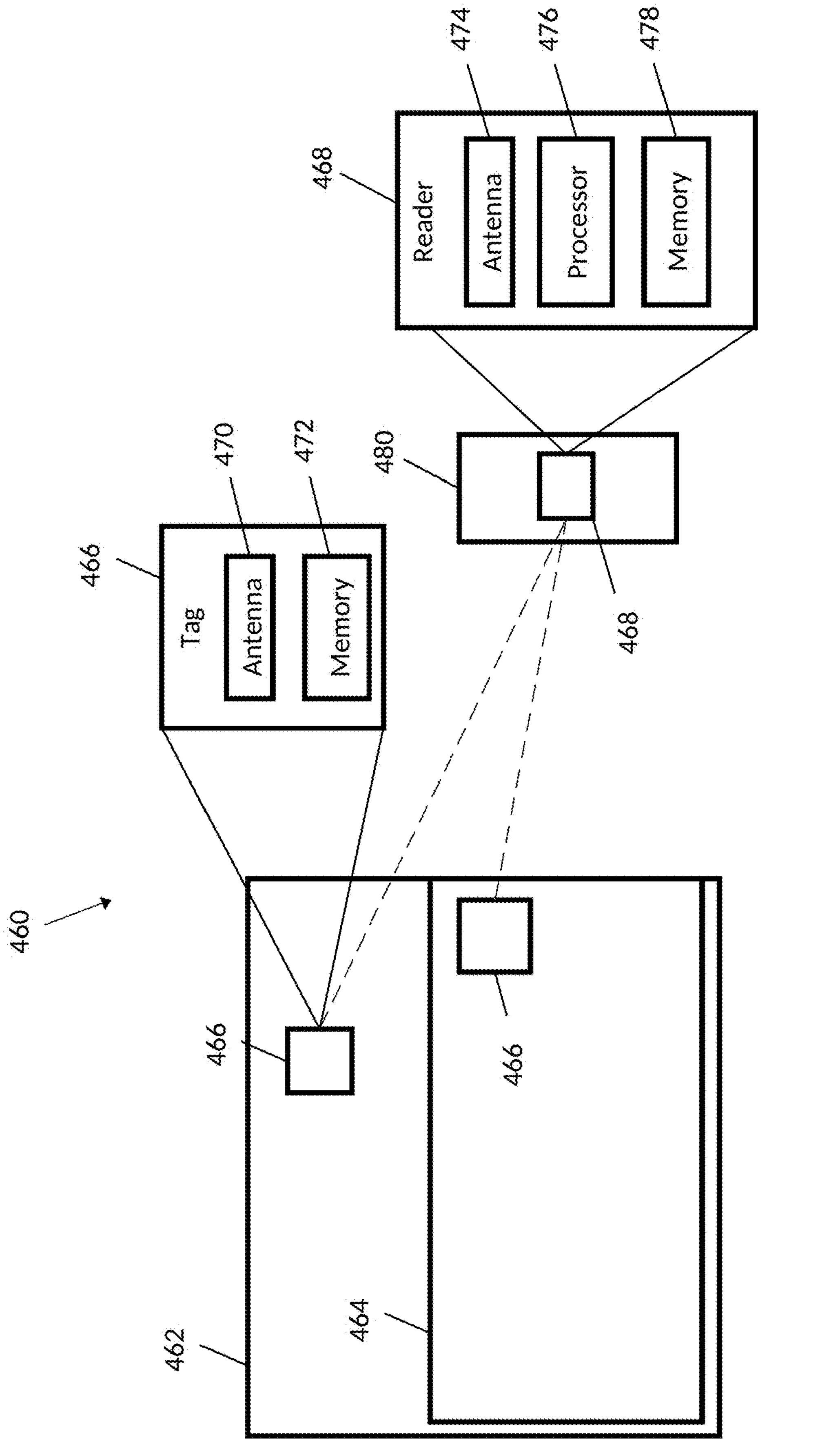
FIG. 16 is a block diagram of an exemplary system that may be used to monitor a multi-bag connector assembly in a beverage dispensing system, according to an embodiment of the present invention.

FIG. 16 is a block diagram of an exemplary system 460 that may be used to monitor an MBC and the functionality of the MBC within a beverage dispensing system. System 460 may be used with any of the beverage dispensing systems described herein.

In the example shown in FIG. 16, system 460 includes a box 462 that includes a plurality of bags 464 similar to the boxes and bags described in the foregoing embodiments. A programmable tag 466 is coupled to box 462 and/or to bags 464 in the exemplary embodiment. Tag 466 may be used to determine the contents of box 462 and/or bags 464 as described more fully herein. In addition, a tag reader 468 is provided that is able to read the contents of each tag 466.

Tag 466 may include an antenna 470 and a memory 472, such as a computer-readable memory. While tag 466 is described herein as a radio frequency identification (RFID) tag 466, it should be recognized that tag 466 may be any suitable tag that is readable by an associated reader. For example, tag 466 may be embodied as a quick response (QR) code, a bar code, a near field communication (NFC) tag, or any other suitable tag.

Antenna 470 is configured to receive signals from tag reader 468 and to provide data stored in memory 472 in response to the signals received from tag reader 468.

Memory 472 stores data related to box 462 or bag 464 to which tag 466 is attached. In an exemplary embodiment, memory 472 is programmed to include profile data for box 462 or bag 464, such as the type of alcoholic beverage (or other liquid) stored in each bag 464, the alcohol content, a brand name, an age, a production date, and/or a batch number of the alcoholic beverage stored in each bag 464. Additionally, or alternatively, the profile data may include a volume of bag 464 and/or a volume of the alcoholic beverage stored in bag 464, a unique identification number of the container (i.e., of bag 464 or box 462), a distributor of the alcoholic beverage, and/or any other suitable data. The profile data may be programmed or stored in memory 472 during a filling process of bag 464. Alternatively, the profile data may be included in pre-printed labels that may be attached to bags 464 or boxes 462 corresponding to the labels.

Still alternatively, a tag 466 may be affixed to, or included within, bags 464 and/or boxes 462 before shipping or transport. Upon receipt of boxes 462 and/or bags 464 by the end user, tag reader 468 scans each tag 466 and assigns the profile of the contents corresponding to each bag 464 or box 462 to the unique identification number of the respective bag 464 or box 462.

While tag reader 468 is described herein as an RFID reader, it should be recognized that tag reader 468 may be any suitable reader that is designed and capable of reading tags 466. In the exemplary embodiment, tag reader 468 includes an antenna 474, a processor 476, and a memory 478.

Antenna 474 is configured to transmit signals to tags 466 to request data from tags 466. In addition, antenna 474 is configured to receive the signals from tags 466 in response to the data request.

Processor 476 is configured to generate the signals to antenna 474 and to receive the signals from antenna 474. In addition, processor 476 may be configured to read data from memory 478 and to store data in memory 478.

Memory 478 is configured to store the data received from tags 466 when tags 466 are "read" (i.e., when signals requesting data from tags 466 are transmitted to tags 466 and when the data responsive to the requests are received).

In one embodiment, tag reader 468 is integrated into a connector assembly 480 to enable connector assembly 480 to read the profile data from tags 466 associated with bags 464 attached to connector assembly 480. For example, tag reader 468 may be integrated into each connector, into the holding plate, into the actuator plate, and/or into any suitable portion of connector assembly 480. Alternatively, tag reader 468 may be integrated into a stand-alone device, such as a handheld computing device or any other suitable device.

When bags 464 and boxes 462 have tags 466 included therein or affixed thereto, significant operational efficiencies can be gained. A tag reader mounted in close proximity to a container (e.g., a bag 464 or box 462) may read the unique identification number of the container.

In one embodiment, tag reader 468 may store data representative of the profiles (or profile data) associated with bags 464 that are intended to be used with the beverage dispensing system. If processor 476 determines that the profile data of a bag 464 connected to connector assembly 480, for example, does not match the expected profile data for the beverage dispensing system, processor 476 may notify a user that bag 464 does not include the expected profile data.

In another embodiment, tag reader 468, or another suitable device or system, may calculate the amount of liquids dispensed from each bag 464 or box 462. The amount of liquid dispensed can be compared to the amount of liquid expected to be inside bag 464 or box 462 based on the profile data of bag 464 or box 462. As a result, tag reader 468 or another suitable device may determine when bag 464 or box 462 is empty or has dispensed a predetermined amount or percentage of its contents. An example of such suitable device is the incorporation of weighting scale as part of the MBC or separately connected to the system 460. A user may then be notified which bag 464 or box 462 needs to be replaced.

When bag 464 or box 462 is replaced, tag reader 468 may read the profile data of the replacement bag 464 or box 462 and determine that the unique identification number is different than the replaced bag 464 or box 462, for example. Accordingly, tag reader 468 or another device or system may determine that a replacement bag or box has been provided, and may reset or begin to recalculate the amount of liquid dispensed by the new bag or box.

Tag reader 468 or another device may also verify that the same type of alcoholic beverage is included in the replacement bag or box as compared to the replaced bag or box. If the type of beverage is different, the beverage dispensing system may be prevented from dispensing the contents of the replacement bag or box unless a user explicitly approves the dispensing, for example.

Tag reader 468 or another device or component of the beverage dispensing system can store the profile data of each tag 466 of each bag 464 or box 462 and may, for example, store the amount of liquid dispensed by each container. In case a previously used container is put back in the beverage dispensing system, tag reader 468 is able to determine whether that container is empty or not. If the container is not empty, the system will continue to keep track of the amount of liquid dispensed by that specific container until the system determines that the container is empty. If the container is determined to be empty, tag reader 468 or another device or component of beverage dispensing system may notify a user and the container will need to be replaced before normal operations can continue. In one embodiment, an acceptable empty tolerance level (or waste level) can be pre-set by the user of tag reader 468 or the beverage dispensing system, thereby allowing containers to be exchanged before they are completely empty.

Tag reader 468 or another device or component of the beverage dispensing system can alert the user about the status of the tagged containers through a light or audible signal, for example, or in any other suitable manner. The status that the user may be notified of may include, for example, that a container needs to be replaced, a container is close to being replaced (falls within the waste tolerance zone), or that a container is still able to dispense its contents. The status can also indicate that the contents of the container have not been assigned to a particular box 462 or to a particular location within the beverage dispensing system, for example. This may help prevent cross-contamination of materials by the beverage dispensing system. The status can prevent the container MBP from being connected to the beverage dispensing system by preventing the connector assembly MBC from closing, for example.

The MPC assembly 110 includes a back bracket 412 (see FIGS. 10A-10B) with a set of holes or orifices 412D in which the valve assembly 500 is mounted. The back bracket also has two identical guide tracks, one on each side, that function to guide the movement of the handle assembly 444 from the open to/from the connected state.

A set of locking plates 432, 434 are positioned on the left and right side of the back bracket 412 and supported via three fixed guides (secondary guide pins) 448 per side that are mounted on the back bracket 412. The movement of the locking plates 432, 434 is determined by a guide assembly device 446 that is controlled by the handle assembly 444. The guide assembly device 446 includes a primary guide pin 446F, a cam 446E, a bearing ring 446D and a disk 446C. The bearing ring 446D and the disk 446C create a hinge for the handle assembly 444. The arms 444A, 444B of the handle assembly 444 are secured on the outside to the disk 446C. Movement of the handle assembly 444 is guided via the primary and second guide tracks 432E, 432F, 434E, 434F on the first and second locking plates 432, 434 (see above) using the primary and secondary guide pins 446F, 448 . . . . The primary guide pins 448 also move the locking plates 432, 434. The movement of the first and second locking plates 432, 434 is choreographed in such a way that in the open position the first or left locking plate 432 is lower than the second or right locking plate 434. Each locking plate 432, 434 has two different carveouts or recess 434C, 434C per fitment 210 (FIG. 2). These carveouts or recesses result in a larger diameter (open position) or smaller diameter (closed and engaged or connected positions).

When the first locking plate 432 is down and the second locking plate 434 is up, the variable diameter ($d_{variable}$) is large enough to allow the flange 210A of the fitments 210 to be inserted. As the handle assembly 444 moves towards the closed position, the first locking plate 432 moves upwards, whilst the second locking plate 434 moves down.

This movement is explained by looking at the primary guide tracks 432E, 434E. The primary guide track 434E on the second locking plate 434 curves slightly upwards when the handle assembly 444 moves from the open position to the closed position which moves the second locking plate 434 downwards. The primary guide track 432E on the second locking plate 432 is sloped downwards which moves the first locking plate 432 upwards during the same lever movement. The secondary guide tracks 432F move downwards along the vertical track section and supports the upwards movement created by the primary guide track 432E. The second guide tracks 434F move upwards along the vertical track section and supports the upwards movement of the first locking plate 432. As the handle assembly 444 moves from the closed position to the connected or engaged positions, both locking plates 432, 434 now move backwards guided by the primary and second guide tracks 432E, 432F, 434E, 434F and the guide pins track 446F, 448.

Movement of the handle assembly 444 into the Connected position, moves both locking plates 432, 434 backwards pulling the MBP 104 towards the valve assembly 500 thereby connecting the fitments 210 to their respective valves in the valve assembly 500. As shown in FIGS. 9A-9F, the valve assembly 500 includes a set of valves, a channel 504 that connects all valves and a single outlet 506. The valve assembly 500 connects all of the fitments 210 together when the handle assembly 444 is in the connected position. When the lever is in the connected position, the fitments 210 are now connected to the valve assembly 500.

As discussed above, the MBC assembly 110 may include a mechanical scale. Alternatively, the MBC assembly 110 may also be fitted with a visible electric or electronic MBC level indicator, using an RFD, NFC, QR code scanner that reads the liquid product within the MBP 104 as it is inserted into the MBC assembly 110. The indicator would not only show liquid level status but also the MBP product alignment to the MBC. In one embodiment, two or more MBCs are aligned and connected in parallel to prevent running out of the liquid product and to allow the replacement of one empty MBP while the other one is in use. Therefore, the ability to ensure that both MBPs have the same type of liquid product is important. This capability also prevents potential issues due to mixing of liquid products which will require distribution hose cleaning, and pump viscosity re-calibration. Level indication will be used for supply management and all the information provided by these sensors can be broadcast over any network, be it wired or wireless to a monitoring and alerting system. The Smart-MBC prevents human errors with product replacement as MBCs are refilled. In one embodiment, an MBC is outfitted with a pump that is remotely controlled thereby a creating stand-alone assembly to feed liquid to any system without the need for additional supporting components.

An additional electronic scale can be attached that allows (i) to precisely determine the fill status of the MBP and (ii) a connection to an ERP system to allow to plan replacement cycles of the MBP and automated ordering of materials that are forecasted to run out of stock.

A cleaning MBP (C-MBP) is available that can be connected to the MBC in the same way as any other MBP. This C-MBP consists of a tank for cleaning material, a fresh water, a grey water tank and a product reservoir. It also consists of an electrical pump, a controller and sensors and a power pack. When inserted into the MBC and switched on, it starts the automatic cleaning process of the MBC's valve assembly. The pump will suck out remaining product into the product reservoir. The C-MBC will then, for a defined period, run the cleaning material through the MBC which is collected in the grey water tank. After this process the C-MBC will rinse the MBC with fresh water which is collected by the grey water tank as well. It will then remove the water from the MBC and refill it with the product from the product reservoir to prevent air in the MBC's valve assembly. To avoid "product contamination" the product reservoir will be flushed with fresh water allowing the C-MBP to be used with another MBP. Internal sensors will measure the required time for the cleaning/rinsing.

INDUSTRIAL APPLICABILITY

With reference to the FIGS., and in operation, in the illustrated embodiment, the present invention provides a connector assembly 110 that includes a controller 116 and a number of components (see above) under control of the controller 116. As discussed above, the connector assembly 110 is configured to receive and controllably connect a beverage dispensing package 104 to a supply line 4. The beverage dispensing package 104 may be configured to receive or hold a plurality of bags 106 in a common package. Such a package may be referred to as a multi-bag package (MBP) and such a connector assembly 110 may be referred to as a smart multi-bag connector (or smart MBC) 110.

In one embodiment, the smart MBC assembly 110 may be moveable between open, closed and engaged positions. The smart MBC assembly 110 may includes a handle assembly (or lever) 444, a valve assembly 500, and an electronic scale 420 for establishing a fill level of the contents of the inserted Multi Bag Packaging (MBP) product (package or box or carton 104). The smart MBC assembly 110 may have three states or positions determined by the movement of the handle assembly 444: the open state, the closed state, and the connected or engaged state. When the handle assembly 444 is down it is in the open state, this indicates that the smart MBC assembly 110 is ready for a MBP 104 to be inserted or removed. When the handle assembly 444 is moved up into the closed state, the MBC assembly 110 locks the MBP 104 in place by grabbing the flange 210A of the fitments 210 with the locking plates 432, 434. When the handle assembly 444 is moved all the way up the MBC assembly moves the MBP 104 towards the valve assembly 500 plugging the fitments 210 into the valve assembly 500 creating the connected or engaged state. When a MBP 104 has been inserted into the MBC assembly 110, the handle assembly 444 may be also locked using a mechanical or electrically/electronically controlled lock (see, e.g., locking mechanism 450 above) to prevent the MBP 104 from being removed by unauthorized personnel preventing unauthorized access to, as well as tampering with, the MBP's content. In another embodiment, the handle assembly 444 may include, or by replaced by, an electric motor 136 under control of the controller 116. As described above, the controller 116 may control the electric motor 136 to controllably move the connector assembly 110 between the open, closed and/or engaged positions or states.

The MBC assembly 110 may also be locked in its open position, handle down, to prevent the wrong liquid to be connected to the line or to ensure that nobody can move the handle while performing maintenance or removing the smart MBC assembly 110 for inspection, cleaning, or re-positioning.

The controller 116 has a series of interfaces that each provide a specific input and/or output. One set of interfaces are a set of tag readers (see above) that collect information. The first reader or tag reader 118 is configured to establish or read product packaging information from the package tag 104A. The second reader or tag reader 124 is configured to establish or reader the staff or person (or operator) operating the smart MBC assembly 110.

The locking mechanism 120 is another interface that has the ability to lock the movement of the mechanical handle assembly 444 to prevent the smart MBC assembly 110 to engage or disengage the beverage dispensing package or box 104. As discussed above, the locking mechanism 120 may include an electric motor, for example, a stepper motor, 136 in replacement of the mechanical handle assembly 444.

The temperature sensor 126 may comprise another interface reads the operating temperature of the smart MBC assembly 110. The electronic scale 420 defines another interface. It should be noted that the electronic scale 420 may be replaced with a flow sensor (not shown) that measures the amount of fluid or liquid that is dispensed and the controller 116 establishes a fill level of the beverage dispensing package 104.

Other interfaces include the pump control 132, the valve control 134, the user interface 128, and the wireless control module 130. The pump control 132 controls the pump 138. The valve control 134 controls the valve mechanism 140. In the illustrated embodiment, the user interface 128 may consist of an interactive display 128B and/or set of buttons and lights or LED indicators 128A to interact with the user or operator. The wireless control module 130 allows wireless communications with a wireless network and with smart devices tablet and phone (not shown), as well as the remote system 50 and the beverage delivery system 100, that can locally collect data from the connector and configure its functions.

In one aspect of the present invention, the controller 116 of the Smart MBC connector assembly 110 is capable of communicating to other computer devices via Wi-Fi, Bluetooth, and Ethernet, to deliver several different functionalities. Each smart MBC controller 116 may have an address that is unique and identifies the Smart MBC assembly 110.

In a first embodiment of the smart MBC assembly 110, a handle assembly 444 that requires manual operation to move it from the open State to the closed State by physically moving the handle and thereby grabbing and connecting the fitments 108 of the beverage dispensing package 104 into the valve assembly 500 of the smart MBC assembly 110. In the first embodiment, the locking mechanism 120 include the locking solenoids 120A, 120B (see FIG. 5H). The first locking solenoid 120A may be positioned such that, when the handle assembly 444 is in the open position, the first locking solenoid 120A may be used to lock the handle assembly 444 in the open position. The second locking solenoid 120B is positioned such that, when the handle assembly 444 is in the closed position, the second locking solenoid may be used to lock the handle assembly 444 in the closed position (when the smart MBC assembly 444 is closed or connected/engaged).

In a second embodiment of the smart MBC assembly 110, the mechanical handle assembly 444 is replaced by the electric motor 136. The user or operator may operate the electric motor 136 using the user interface 128. The smart MBC assembly 110 of the second embodiment, provides may provide a more compact automatic solution that grabs the fitments 108 of the beverage dispensing package 104 and moves them into the valve assembly 550 block to connect to the beverage dispensing package 104 to the supply line 4.

The first and second (tag) readers 118, 124 may be mounted inside the smart MBC assembly 110. The first reader 118 may be mounted in such a location that it can read the MBP product profile data such as type of product distilled spirits (vodka, gin, whiskey, etc.) or other liquids (juices, syrup, water, etc.), brand name, alcohol content, sugar level, production date, fill date, packaging date, batch number, manufacturer, total content volume, the number individual containers within, Unique ID, packing company, distributor, and other relevant data. The MBP profile data may be made available on a package tab 104A. The package tag 104A may include a QR code, a passive RFID tag or any other common readable technology that can present data (BLE, NFC, etc.) and be embedded into packaging. The package tag 104A may be affixed to the outside or the inside of the of the beverage dispensing package 104 (depending on the type of package tag 104A). In other embodiments, the package tag 104A may be positioned inside, but not affixed to, the beverage dispensing package 104.

The second (tag) reader 124 may be mounted to the front of the Smart MBC assembly 110 may be capable of reading a staff/employee badge (or other device) and communicate via an external device capable of authenticating the user like a smartphone, tablet, PC or other suitable device to identify the staff member.

In one aspect of the present invention, each smart MBC assembly 110 may be assigned to a supply line 4 that carries a specific product. When a beverage dispensing package 110 is inserted into a smart MBC assembly 110, the controller 116 detects if the correct product for that supply line 4 has been inserted. If beverage dispensing package 110 does not include the correct product, the controller 116 will prevent the acceptance of the beverage dispensing package 110 by locking the actuator 122. The controller 116 may inform the operator or staff member, using visible or audible ways, of the error using the user interface 128. The operator will be unable to move the handle assembly 444 or the controller 116 will prevent the electric motor 134 to move the actuator 122, thereby contaminating of the supply line 4.

In one configuration of the system 2, access to operate, insert and remove products, may only be allowed through verification of staff access level. The system 2 may have different access privileges for different staff levels allowing certain staff to be able to remove a beverage dispensing package 104 if the beverage dispensing package 104 is not empty, or to insert a cleaning package, and/or enable/disable any other functions deemed appropriate for that level as configured by the remote system 50.

Each smart MBC assembly 110 may display the supply line configured product type/brand on the display 128B mounted on the smart MBC assembly 110 and/or share specific data via the use of a smartphone, tablet or other suitable device that is kept in the proximity of the smart MBC assembly 110 if configured as a standalone unit or obtain from the remote system 50.

In order to ensure continued product supply, smart MBC assemblies 110 may be configured in parallel to allow the replacement of an empty beverage dispensing package 104 while a beverage dispensing package 104 in the other smart MBC assembly 110 is in use. Therefore, the ability to ensure that both beverage dispensing packages 104 have the same type of product is important. This capability also prevents potential issues resulting from switching the type of products being dispensed through the smart MBC assemblies 110 which will require the cleaning of the supply line, and pump viscosity recalibration.

The calibrated electronic scale 420 may be used to determine the fill level of the beverage dispensing package 104. The fill level as determined by the electronic scale 420, may be reported to the remote system 2 for supply management purposes. When the fill level is empty or at a pre-set 'empty' level, the smart MBC assembly 110 may be configured to move itself into an unlocked state so that the beverage dispensing package 104 may be removed. In the case of a mechanical connector assembly 110, an audible or visual signal may be is used to indicate that the beverage dispensing package 104 may be removed.

A smart MBC assembly 110 may automatically unlock the actuator 120 thereby allowing anyone to remove the beverage dispensing package 104. As the operator moves the handle assembly 444 towards the open state or position, the smart MBC assembly 110 may lock the handle assembly 444 in place thereby preventing anyone inserting another beverage dispensing package 104 into the smart MBC assembly 110 that might not be suitable for the supply line 4 or has not been authorized to be inserted.

In the case of an electro-mechanical smart MBC assembly 110, the controller 116 may 'eject' a beverage dispensing package 104 by moving from the closed/locked/engaged state to the open/locked state. The Connector may remain open but locked until authorized to insert a full beverage dispensing package 104 that is verified to be the right product for that supply line 4.

The controller 116 of a smart MBC assembly 110 may be configured to share information on the display 128B mounted on the smart MBC assembly 110 such as the brand and type of product. The indicators 128A of the user interface 128 may used to indicate a specific state of the smart MBC assembly 110 (for example: Green=OK, Yellow=5% (adjustable level), Red=less than 1%).

The user interface 128 may be used by the operator to lock/unlock the beverage dispensing package 104 via the controller 116, control the product dispensing pump controller 132 and/or pump 138 and/or the valve controller 134 and/or the valve mechanism 140, read the electronic scale 420, read the product temperature from the temperature sensor 126, and nay interface to other peripherals connected to the controller 116, the remote system 50 and/or the beverage dispensing system 100 (either through a wired or wireless connection).

All information provided by the smart connector assembly 110 or the interfaces may be be broadcast over any network either wired or wireless to the remote system 50 or other systems. The system can be configured to send relevant message to the staff as. The SmartMBC prevents human errors with product replacement as MBCs are refilled.

The controller 116 of the smart MBC assemblies 110 may be configured to display any of the previously described collected information on the display 128B. The controller(s) may be programmed to display all or some of this information for example, the content of the product within the Multi-Bag Package. The MBC Controller, using previously described read capabilities, identifies the product in the MBP and verifies that the product is the right one for the product supply the SmartMBC is configured. If there is a mismatch, the controller 116 may generate an alarm which may be audible, visual or both. The controller 116 may also generate an alert email which it will send to a designated address(es) via Wi-Fi or Ethernet connectivity. The controller 116 and/or the remote system 50 may store this event with a date and time stamp and email it to a logging computer for tracking and security purposes.

The controller 116 may also determine the fill level of the beverage dispensing package 104 that is inserted into a smart MBC assembly 110 using the built-in scale 420 that is calibrated for that product and/or a flow sensor (not shown). The combination of the scale 420 and the flow sensor provide for even more accurate information of amount of product dispensed. When an beverage dispensing package 104 is inserted into the smart MBC assembly 110, the controller 116 will establish the fill level. If the fill level is full, then the smart MBC assembly 110 may unlock the actuator 122 or the handle assembly 444 so that the actuator 122 or handle assembly 444 may be moved to the closed and locked state. In the case of an electro-mechanical smart MBC assembly 110, the user may press a button or the system can if so configured, to accept the beverage dispensing package 110.

The system 2 may be configured to define the conditions under which a beverage dispensing package 104 that is not full to be inserted. For example if the smart MBC assembly 110 needs to be serviced, the beverage dispensing package 104 must be removed. After the service, the removed beverage dispensing package 104 cannot be re-inserted without warning. However, if an empty beverage dispensing package 104 is removed, the user might only want to accept full beverage dispensing packages 104 and not half full packages 104.

In one aspect, the system 2 may be configured or programmed to define the parameters under which a smart MBC assembly 110 can or cannot accept beverage dispensing packages 104 based on the fill level.

At pre-programmed fill levels, for example at 25% fill level, the controller 116 may generate an alert message, such as an email to a configured email address. At the 10% fill level, the controller 116 may send another email, at a higher alert level.

If a package 104 is emptied before being replaced, the controller 116 may generate an alarm which may be audible, visual, or both.

If a second smart MBC assembly 110 is connected in parallel, the system 2 via one of the controllers 116 or the remote system 50 may be configured to automatically switch over by switching over the valve mechanism 140 or by closing and opening respective valves 142. The remote system 50 may be configured or programmed to plan replacement cycles of the beverage dispensing packages 104 and automated ordering of materials that are forecasted to run out of stock.

Whenever a beverage dispensing package 104 is inserted into a smart MBC assembly 110, the electronic scale 420 will measure the weight or fill level of the beverage dispensing package 104. The controller 116 may compare the weight or fill level of the insert package 104 against a desired or required weight or fill level. If the weight or fill level exceeds or falls short of a defined threshold, the controller 116 may generate an alarm which may be audible, visual or both. The controller 116 may also generate an alert email. This feature will provide the ability to detect potential fraud or faulty deliveries by the supplier. This information will be stored locally and/or in the remote system 50 for further analysis.

The controller 116 may also have temperature reading capabilities. The controller 116 may generate an alert if the programmed ideal temperature of the product in a beverage dispensing package 104, falls outside the required range. The temperature sensor 126 may be used to monitor the temperature of beverage dispensing package 104 to ensure the temperature is within a programmed range. If the temperature changes by an initial configured amount, the controller 116 may send an alarm email sending it to a preconfigured address. If the temperature changes by a second configured amount, the controller 116 may send an alarm email as well generate an audible and/or visual alarm or both.

All the email and alarm notifications generated by the system 2, the controllers 116 and/or the remote system 50 may be configured to be displayed on a display associated with the system 2, the display of one of the smart MBC assemblies 110, and/or a display associated with the remote system 50. All email and alarm notifications may also be sent as SMS messages to any configured mobile phone number(s) or other device capable of receiving the messages.

The controller(s) 116 may communicate with other controllers 116 in what is commonly referred to as a mesh-network, or any cloud-based management system to share information with, act upon instruction from or remotely control another controller 116. As an example, a controller 116 may be able to share the type of product within the beverage dispensing package 104 that is inserted into a smart MBC assembly 110 and the system 2 may be able to validate if that product may be used in that location. Via a visual or audible indicator, the smart MBC assembly 110 may locally indicate if this product is allowed or not. The system 2 may also be able to collect the content level of each installed beverage dispensing package 104 when inserted, replaced and/or reinserted into a smart MBC assembly 110 based on its unique ID.

A smart MBC assembly 110 may communicate and report information between other smart MBC assemblies 110 via a mesh network. In one embodiment, a smart MBC assembly 110 may be outfitted with a pump that is remotely controlled thereby a creating stand-alone assembly to feed liquid to any system without the need for additional supporting components. One example of how this intercommunication and remote-controlled functionality is used, relates to ensuring a continued product supply and preventing air from being sucked into the supply lines. When implemented within a bar, multiple smart MBC assemblies 110 may be set to dispense the same product, for example Vodka. However, only one smart MBC assemblies 110 may be 'active' while the other MBCs also set to dispense vodka will be in "stand-by" mode. When the active controller 116 senses that the beverage dispensing package 104 inserted is empty, the controller 116 will automatically shut off its outflow valve and send a request over the mesh network for a stand-by MBC Controller programmed to dispense vodka, to go from the standby mode to active mode. The use of the controllers 116 in a mesh communications network allows for smart MBC assemblies 110 that are configured to dispense the same product, for example vodka, do not have to be next to each other but can be anywhere within the product distribution space.

When a beverage dispensing package 104 has been inserted into a smart MBC assemblies 110, the actuator 122 may be locked using the locking mechanism 120 to prevent the beverage dispensing package 104 from being removed by unauthorized personnel, preventing unauthorized access to, as well as tampering with, the content of the package 104. The smart MBC assembly 110 may also be locked in its open state to ensure that the actuator 122 or the handle assembly 444 can move the handle while performing maintenance or removing the smart MBC assembly 110 for inspection, cleaning, or repositioning.

In one aspect of the present invention, the smart MBC assemblies 110 have the following states:

Open: the smart MBC assembly 110 can accept a product packaging;

Closed: the smart MBC assembly 110 cannot accept a product packaging

Locked: the smart MBC assembly 110 is locked in either the Open or Closed state Unlocked: the smart MBC assembly 110 can move between Open and Closed or Closed and Open The Open state is defined as that position that allows the insertion of a beverage dispensing package 104 into the he smart MBC assembly 110. The ability to move, manually or electrically, from the Open state to the Closed Locked state is controlled by the controller 116 and depends on a set of conditions the controller 116 identifies and/or as determined by the system 2 or the remote system 50.

When a smart MBC assembly 110 is in the Closed/Locked state, the removal of an installed beverage dispensing package 104 from the smart MBC assembly 110. The smart MBC assembly 110 can either use a mechanical handle to grab the beverage dispensing package 104 and connect the beverage dispensing package 104 or the electrically controlled motor 136 to achieve the same. The movement, whether mechanically performed or electrically controlled, from the Open Unlocked to Closed Locked state or from Closed Locked state to Open Unlocked state is managed by the controller 116 depending on the information established locally provided or obtained by a central system. In the case of a manual mechanical lever, an electrically controlled mechanism, like a solenoid, can prevent the movement of the handle from Unlocked to Locked state or from Locked to Unlocked state (see above). In the case an electronic motor is used, to replace the mechanical lever function, the electric motor 136 is under control of the controller 116 and will allow/prevent insertion of a beverage dispensing package 104 or prevent/allow removal of the beverage dispensing package 104 from the smart MBC assembly 110.

Below are listed several state examples of a smart MBC assembly 110 according to an embodiment of the present invention.

The controller 116 allows a smart MBC assembly 110 to move from Open Unlocked to Closed Locked state when:

the correct product beverage dispending package 104 is inserted, or access is authorized, i.e., an operator has been authorized.

The controller 116 places the smart MBC assembly 110 in the Open Locked state when:

the wrong beverage dispensing package 104 has been inserted, i.e., a beverage dispensing package 104 that is incompatible with the with the supply line 4, or the smart MBC assembly 110 is not connected to a supply line 4 or when a connected supply line 4 is marked as not in use, or, an unauthorized person inserts an MBP, or the smart MBC assembly 110 is placed in service mode.

The controller 116 allows the smart MBC assembly 110 to move from Closed Locked state to Open Locked state when:

the beverage dispensing package 104 is empty, or access is authorized, i.e., an operator has been authorized.

The controller 116 prevents smart MBC assembly 110 to move from Closed Locked state to Open Locked state when:

The beverage dispensing package 104 is not empty,

The operator is not authorized.

The Smart MBC assembly 110 may include an electronic scale that allows the controller 116 to accurately monitor the supply level of the beverage dispensing package 104 and to use that information to prevent the removal of packaging that is not totally empty, to keep the system 2 or remote system 50 informed about the supply level and product usage, provide level indication on the smart MBC assembly 110 via any type of visual and/or audible indication. The smart MBC assembly 110 may also utilize the temperature sensor 126 to monitor the product and environment temperature. This will provide information regarding potential spoilage and use of the product outside its recommended operating environment for health reasons.

Other features of the system are described below.

Communication:

Capable of communicating to other devices via WIFI, Bluetooth, and Ethernet,

Able to network and communicate with other smart MBC assemblies 110 (same or different product), Interact with Smart phone EVO app (preferred to keep costs down).

Tag Readers:

identify the beverage dispensing package 104 or product information (create EVO package profile), To identify user/employee ID (QR, NFC, RFID, BLE, camera, . . . ).

User Interface:

Visible indicator that the smart MBC assembly 110 is due for cleaning/service, audible signal indicator, Interactive display with touch or buttons, Interact with Smart Phone EVO app (preferred to keep MBC cost down), If the smart MBC assembly 110 has a display, the information shown can be configured via a central system. If it does not have a display, a smart tablet or phone can be used as interface. Examples of information shown are:

Product, Brand,

Fill level,

Error messages,

Specific instructions.

In another aspect of the present invention, the system 2 may be used to supply product to the dispensing part of the business. Controlling and managing the supply side is critical. To move the product from the source to the destination (dispensing side), pumps may be used. This requires typically long lines from the source to the pumps to the dispensing solution. The supply can be brought a lot closer to the dispensing solution by combining the smart MBC assemblies 110 with pumps (see above). When product is requested by the dispensing solution, the smart MBC assembly 110 may receive a signal to dispense the product for a certain amount of time. An additional flow sensor can be used to provide more accurate dispensing measurement and/or package fill level.

When a pair of smart MBC assemblies 110 are used in parallel, their output will be controlled by an electrical valve mechanism 140 which may include a single three-way valve or a pair of valves 142. When one beverage dispensing package 104 is empty, the smart MBC assembly 110 may control the valve mechanism to close off the smart MBC assembly 110 with the empty package 104 and open the smart MBC assembly 110 with a full package 104.

In another aspect of the present invention, the system 2 may allow for the remotely controlled dispensing of products using stand-alone a smart MBC assembly 110 with build-in pumps can be remotely controlled to dispense product for standalone solutions. An electrically controlled line outflow valve (not shown) may be used to prevent air in the supply line 4 when a smart MBC assembly 110 needs to be serviced or replaced.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A system for controllably connecting a beverage dispensing package to a supply line, the beverage dispensing package containing a liquid product and having a package tag, the package tag being associated with package information associated with the beverage dispensing package, the supply line having associated supply line information, comprising:

- a connector assembly having a recess and an outlet and being configured to receive the beverage dispensing package, the outlet of the connector assembly being connected to the supply line, the connector assembly being further configured to controllably connect the beverage dispensing package to the outlet;
- a controller associated with the connector assembly; and,
- a reader associated with the connector assembly and being coupled to the controller, the reader being configured to read the package information associated with the package tag of the beverage dispensing package; and,
- a locking mechanism coupled to the connector assembly and the controller, the controller configured to:
  - compare the package information and the supply line information, and,
  - control the locking mechanism to prevent or allow the beverage dispensing package to be connected to the outlet as a function of the comparison of the package information and the supply line information.

2. The system, as set forth in claim 1, wherein the connector assembly includes an actuator, the actuator being moveable between an open position and an engaged position, wherein the beverage dispensing package may be removed or inserted into the recess when the actuator is in the open position.

3. The system, as set forth in claim 2, wherein the beverage dispensing package is connected to the supply line when the beverage dispensing package is in the recess and the actuator is in the engaged position.

4. The system, as set forth in claim 3, wherein the actuator may be manually operated to move the actuator from the open position to the engaged position and from the engaged position to the open position.

5. The system, as set forth in claim 4, wherein the locking mechanism includes at least one electronic solenoid coupled to the actuator for preventing movement to or from the engaged position.

6. The system, as set forth in claim 3, wherein the actuator includes a motor for moving the actuation from the open position to the engaged position and from the engaged position to the open position.

7. The system, as set forth in claim 1, wherein the package information includes one or more of the following: type of liquid, brand name, alcohol content, sugar level, production date, fill date, packing date, batch number, manufacturer, total content volume, number of individual containers within the beverage dispensing package, a unique package identifier, packing company, distributor and other relevant information.

8. The system, as set forth in claim 1, wherein the package tag includes a bar code and the reader is a bar code reader.

9. The system, as set forth in claim 1, wherein the package tag is an RFID tag and the reader is a RFID reader.

10. The system, as set forth in claim 1, further including a second reader associated with the connector assembly and being coupled to the controller, the second reader being configured to establish identification information related to an operator.

11. The system, as set forth in claim 10, wherein the controller is further configured to prevent movement of the actuator, via the locking mechanism, if the operator is not authorized.

12. The system, as set forth in claim 1, wherein the controller is configured to communicate with an external system.

13. The system, as set forth in claim 1, wherein the connector assembly includes a scale for establishing a fill level associated with the beverage dispensing package.

14. The system, as set forth in claim 1, wherein the connector assembly includes a flow sensor for establishing a fill level associated with the beverage dispensing package.

15. The system, as set forth in claim 1, further comprising a display mounted to the connector assembly and coupled to the controller, the display being configured to display data related to the beverage dispensing package, the connector assembly and/or the supply line.

16. The system, as set forth in claim 13, wherein the fill level associated with the beverage dispensing package is communicated to the external system via the controller.

17. The system, as set forth in claim 13, wherein the controller is configured to utilize the locking mechanism to permit or prevent removal of the beverage dispensing package if the fill level associated with the beverage dispensing package is at a predetermined empty level.

18. The system, as set forth in claim 1, further including a pump connected to the supply line and being coupled to the controller, the controller being configured to controllably operate the pump to supply the liquid through the supply line.

19. The system, as set forth in claim 1, further including a second connector assembly having a second recess and a second outlet and being configured to receive a second beverage dispensing package, the connector assembly being further configured to controllably connect the second beverage dispensing package to the second outlet.

20. The system, as set forth in claim 19, further including a valve assembly positioned between the outlet of the connector assembly and the supply line and between the second outlet of the second connector assembly and the supply line.

21. The system, as set forth in claim 20, wherein the valve assembly includes a first valve positioned between the outlet of the connector assembly and the supply line and a second valve positioned between the second outlet of the second connector assembly and the supply line.

22. The system, as set forth in claim 20, wherein the valve assembly is connected to the controller for selectively coupling one of the beverage dispensing package and the second beverage dispensing package to the supply line.

23. The system, as set forth in claim 20, further including a pump connected to the supply line and being coupled to the controller, the controller being configured to controllably operate the pump.

* * * * *